(12) United States Patent
Karr et al.

(10) Patent No.: US 11,947,968 B2
(45) Date of Patent: Apr. 2, 2024

(54) EFFICIENT USE OF ZONE IN A STORAGE DEVICE

(71) Applicant: PURE STORAGE, INC., Mountain View, CA (US)

(72) Inventors: Ronald Karr, Palo Alto, CA (US); Mark McAuliffe, San Francisco, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 6 days.

(21) Appl. No.: 17/649,396

(22) Filed: Jan. 31, 2022

(65) Prior Publication Data

US 2022/0156087 A1    May 19, 2022

Related U.S. Application Data

(63) Continuation-in-part of application No. 17/522,714, filed on Nov. 9, 2021, which is a continuation of application No. 16/401,369, filed on May 2, 2019, now Pat. No. 11,169,817, which is a continuation of application No. 14/602,052, filed on Jan. 21, 2015, now Pat. No. 10,296,354.

(51) Int. Cl.
| | |
|---|---|
| *G06F 9/00* | (2006.01) |
| *G06F 9/4401* | (2018.01) |
| *G06F 12/02* | (2006.01) |
| *G06F 15/177* | (2006.01) |

(52) U.S. Cl.
CPC .......... *G06F 9/4401* (2013.01); *G06F 9/4408* (2013.01); *G06F 12/02* (2013.01)

(58) Field of Classification Search
CPC .............................. G06F 9/4401; G06F 9/4408
See application file for complete search history.

(56) References Cited

U.S. PATENT DOCUMENTS

| | | | |
|---|---|---|---|
| 4,970,648 | A | 11/1990 | Capots |
| 5,208,813 | A | 5/1993 | Stallmo |
| 5,403,639 | A | 4/1995 | Belsan et al. |
| 5,940,838 | A | 8/1999 | Schmuck et al. |
| 6,263,350 | B1 | 7/2001 | Wollrath et al. |
| 6,412,045 | B1 | 6/2002 | DeKoning et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "Fundamentals of Garbage Collection", Retrieved Aug. 30, 2013 via the WayBack Machine, 11 pages.

(Continued)

*Primary Examiner* — Mohammed H Rehman

(57) ABSTRACT

A system and method for efficient use of zones in a storage system. The method includes: building a frontier set comprising one or more zones of one or more storage devices for writing to; writing data to at least one zone of the one or more zones included in the frontier set; and during a bootup sequence: accessing a frontier set list to identify the one or more zones in the frontier set; and scanning the one or more zones to identify the at least one zone that data was written to.

20 Claims, 29 Drawing Sheets

(56) References Cited

U.S. PATENT DOCUMENTS

| | | | |
|---|---|---|---|
| 6,580,786 B1 * | 6/2003 | Yarlagadda | H04M 3/533 379/88.22 |
| 6,718,448 B1 | 4/2004 | Ofer | |
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 | 7/2005 | Kuroda et al. | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |
| 7,783,682 B1 | 8/2010 | Patterson | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,086,652 B1 | 12/2011 | Bisson et al. | |
| 8,117,464 B1 | 2/2012 | Kogelnik | |
| 8,200,887 B2 | 6/2012 | Bennett | |
| 8,205,065 B2 | 6/2012 | Matze | |
| 8,352,540 B2 | 1/2013 | Anglin et al. | |
| 8,402,226 B1 | 3/2013 | Faibish et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,700,875 B1 | 4/2014 | Barron et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | LeCrone et al. | |
| 9,081,713 B1 | 7/2015 | Bennett | |
| 9,189,334 B2 | 11/2015 | Bennett | |
| 9,311,182 B2 | 4/2016 | Bennett | |
| 9,323,671 B1 | 4/2016 | Harvey et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 9,632,870 B2 | 4/2017 | Bennett | |
| 10,296,354 B1 | 5/2019 | Sanvido et al. | |
| 11,169,817 B1 | 11/2021 | Sanvido et al. | |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2003/0028740 A1 * | 2/2003 | Challenger | G06F 3/0611 711/170 |
| 2003/0126201 A1 * | 7/2003 | Hoang | G11B 20/1217 |
| 2003/0140209 A1 | 7/2003 | Testardi | |
| 2004/0049572 A1 | 3/2004 | Yamamoto et al. | |
| 2005/0066095 A1 | 3/2005 | Mullick et al. | |
| 2005/0216535 A1 | 9/2005 | Saika et al. | |
| 2005/0223154 A1 | 10/2005 | Uemura | |
| 2006/0010293 A1 * | 1/2006 | Schnapp | G06F 12/0871 711/119 |
| 2006/0074940 A1 | 4/2006 | Craft et al. | |
| 2006/0133362 A1 | 6/2006 | Stein et al. | |
| 2006/0136365 A1 | 6/2006 | Kedem et al. | |
| 2006/0155946 A1 | 7/2006 | Ji | |
| 2006/0161700 A1 | 7/2006 | Boyd et al. | |
| 2007/0067585 A1 | 3/2007 | Ueda et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 | 9/2007 | Katsuragi et al. | |
| 2007/0245090 A1 | 10/2007 | King et al. | |
| 2007/0266179 A1 | 11/2007 | Chavan et al. | |
| 2008/0040570 A1 | 2/2008 | Challenger et al. | |
| 2008/0059699 A1 | 3/2008 | Kubo et al. | |
| 2008/0065852 A1 | 3/2008 | Moore et al. | |
| 2008/0134174 A1 | 6/2008 | Sheu et al. | |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0285083 A1 | 11/2008 | Aonuma | |
| 2008/0307270 A1 | 12/2008 | Li | |
| 2009/0006587 A1 | 1/2009 | Richter | |
| 2009/0037662 A1 | 2/2009 | Frese et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077205 A1 | 3/2010 | Ekstrom et al. | |
| 2010/0082879 A1 | 4/2010 | McKean et al. | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 | 7/2010 | Zhang et al. | |
| 2010/0250802 A1 | 9/2010 | Waugh et al. | |
| 2010/0250882 A1 | 9/2010 | Hutchison et al. | |
| 2010/0281225 A1 | 11/2010 | Chen et al. | |
| 2010/0287327 A1 | 11/2010 | Li et al. | |
| 2011/0072300 A1 | 3/2011 | Rousseau | |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0117029 A1 | 5/2012 | Gold | |
| 2012/0151135 A1 | 6/2012 | Crawford et al. | |
| 2012/0198175 A1 | 8/2012 | Atkisson | |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 | 8/2013 | Kettner | |
| 2013/0219125 A1 | 8/2013 | Kusters et al. | |
| 2013/0227236 A1 | 8/2013 | Flynn et al. | |
| 2013/0275391 A1 | 10/2013 | Batwara et al. | |
| 2013/0275656 A1 | 10/2013 | Talagala et al. | |
| 2013/0283058 A1 | 10/2013 | Fiske et al. | |
| 2013/0290648 A1 | 10/2013 | Shao et al. | |
| 2013/0318132 A1 | 11/2013 | Basu et al. | |
| 2013/0318314 A1 | 11/2013 | Markus et al. | |
| 2013/0339303 A1 | 12/2013 | Potter et al. | |
| 2014/0052946 A1 | 2/2014 | Kimmel | |
| 2014/0068791 A1 | 3/2014 | Resch | |
| 2014/0089730 A1 | 3/2014 | Watanabe et al. | |
| 2014/0101361 A1 | 4/2014 | Gschwind | |
| 2014/0143517 A1 | 5/2014 | Jin et al. | |
| 2014/0172929 A1 | 6/2014 | Sedayao et al. | |
| 2014/0181620 A1 | 6/2014 | Kotzur | |
| 2014/0201150 A1 | 7/2014 | Kumarasamy et al. | |
| 2014/0215129 A1 | 7/2014 | Kuzmin et al. | |
| 2014/0229131 A1 | 8/2014 | Cohen et al. | |
| 2014/0229452 A1 | 8/2014 | Serita et al. | |
| 2014/0281308 A1 | 9/2014 | Lango et al. | |
| 2014/0281336 A1 * | 9/2014 | Solihin | G06F 12/0223 711/170 |
| 2014/0325115 A1 | 10/2014 | Ramsundar et al. | |
| 2014/0325177 A1 * | 10/2014 | Winn | G06F 12/023 711/170 |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2015/0293822 A1 | 10/2015 | Chun et al. | |
| 2015/0310580 A1 | 10/2015 | Kumar | |
| 2016/0019114 A1 | 1/2016 | Han et al. | |
| 2016/0098191 A1 | 4/2016 | Golden et al. | |
| 2016/0098199 A1 | 4/2016 | Golden et al. | |
| 2017/0351606 A1 * | 12/2017 | Chakrabarti | G06F 16/00 |

(56) References Cited

U.S. PATENT DOCUMENTS

2018/0081562 A1     3/2018  Vasudevan
2022/0066786 A1*    3/2022  Sanvido .............. G06F 12/0246

FOREIGN PATENT DOCUMENTS

| CN | 104025010 B   | 11/2016 |
|----|---------------|---------|
| EP | 3066610 A1    | 9/2016  |
| EP | 3082047 A1    | 10/2016 |
| EP | 3120235 A     | 1/2017  |
| JP | 2007087036 A  | 4/2007  |
| JP | 2007094472 A  | 4/2007  |
| JP | 2008250667 A  | 10/2008 |
| JP | 2010211681 A  | 9/2010  |
| WO | 1995002349 A1 | 1/1995  |
| WO | 1999013403 A1 | 3/1999  |
| WO | 2008102347 A1 | 8/2008  |
| WO | 2010071655 A1 | 6/2010  |

OTHER PUBLICATIONS

Microsoft Corporation, "GCSettings.IsServerGC Property", Retrieved Oct. 27, 2013 via the WayBack Machine, 3 pages.

* cited by examiner

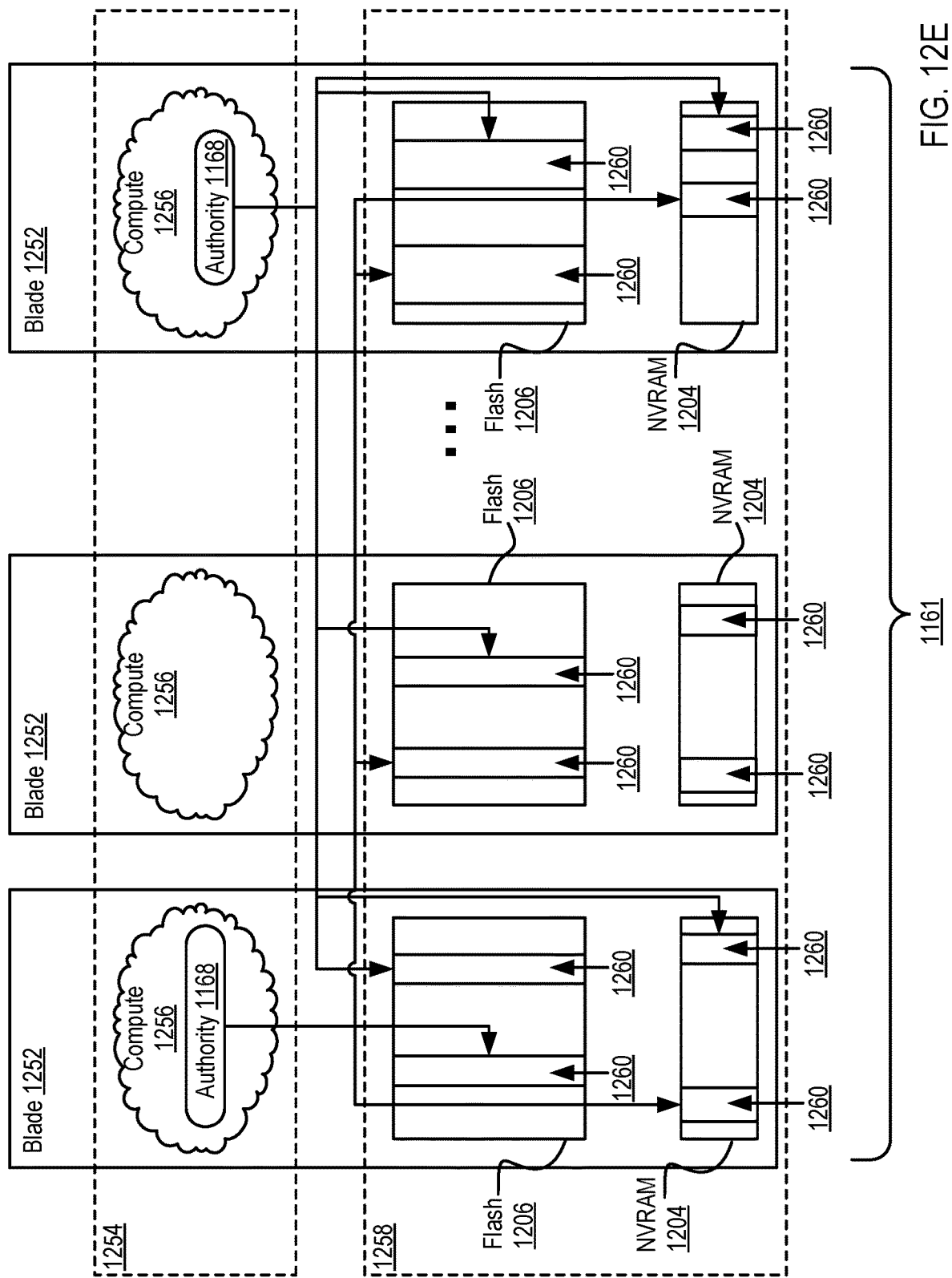

EFFICIENT USE OF ZONE IN A STORAGE DEVICE

CROSS-REFERENCE TO RELATED APPLICATIONS

This is a continuation in-part application for patent entitled to a filing date and claiming the benefit of earlier-filed U.S. patent application Ser. No. 17/522,714, filed Nov. 9, 2021, herein incorporated by reference in its entirety, which is a continuation of U.S. Pat. No. 11,169,817, issued Nov. 9, 2021, which is a continuation of U.S. Pat. No. 10,296,354, issued May 21, 2019.

FIELD OF THE INVENTION

This invention relates to computer networks and, more particularly, to efficiently boot and management of a storage system.

SUMMARY OF THE INVENTION

Various embodiments of a computer system and methods for efficiently starting up a plurality of solid-state storage devices after storage operation are disclosed.

In various embodiments, a computing system is contemplated that includes one or more storage devices configured to store data in multiple allocation units (AUs). The data storage controller maintains an identification if AUs in the system that are available for allocation. Such an identification may be in the form of a "free list", table, tree(s), or any other suitable data structure. Responsive to a request to allocate storage, the data storage controller selects an available AU for allocation. Additionally, in various embodiments, the storage controller is configured to maintain a subset (or "free sublist") of AUs that are available for allocation. This subset represents less than all available AUs. In response to a request for an AU, an AU is selected from this subset. At various times, the storage controller stores an identification of the subset of AUs in the free sublist to persistent storage. There may be times when the identification of the subset of AUs that is persisted is not up to date with the AUs actually available for allocation in the system. In various embodiments, the persistent storage location corresponds to a boot region. In addition, the controller maintains a database that identifies AUs currently allocated within the system. This database further provides an identifier associated with allocated AUs that indicates when the AU was allocated relative to other allocated AUs. This database is updated in persistent storage at various times and may not always represent an up to date indication of AUs currently allocated within the system.

In various embodiments, during a boot sequence the previously persisted free sublist is accessed in the boot region to identify a subset of free AUs on the storage devices. In addition, the persisted database is accessed to determine a most recently allocated AU as identified by the database. Each AU identified by the free sublist is then accessed to determine whether it is in fact available or allocated. If one of these AUs is allocated, an identifier associated with the allocated AU is obtained and compared to the most recently allocated AU identified by the database. If the AU was allocated after the indication by the database, then the database is updated to reflect this information. After completing review of the AUs in the free sublist and updating the database, a comparison of all AU (allocated or free) in the system is compared to those identified as allocated by the database. The difference based on the comparison provides an indication of all free AUs in the system and processing may proceed.

In some embodiments, the free sublist represents only a portion of a larger AU management set that is maintained. In such embodiments, the AU management set identifies a subset of free AUs, AUs that have been selected for allocation but are not yet in use, and AUs that are currently allocated but whose identification has not yet been persisted to non-volatile storage. During a boot sequence, AUs identified by the AU management set are scanned to identify allocated AUs. Based on the scan, the allocated and unallocated AUs are identified and a new AU management set created for use in processing.

These and other embodiments will become apparent upon consideration of the following description and accompanying drawings.

BRIEF DESCRIPTION OF THE DRAWINGS

FIG. 12E is a blade hardware block diagram, showing a control plane, compute and storage planes, and authorities interacting with underlying physical resources, in accordance with some embodiments.

Figure 1:
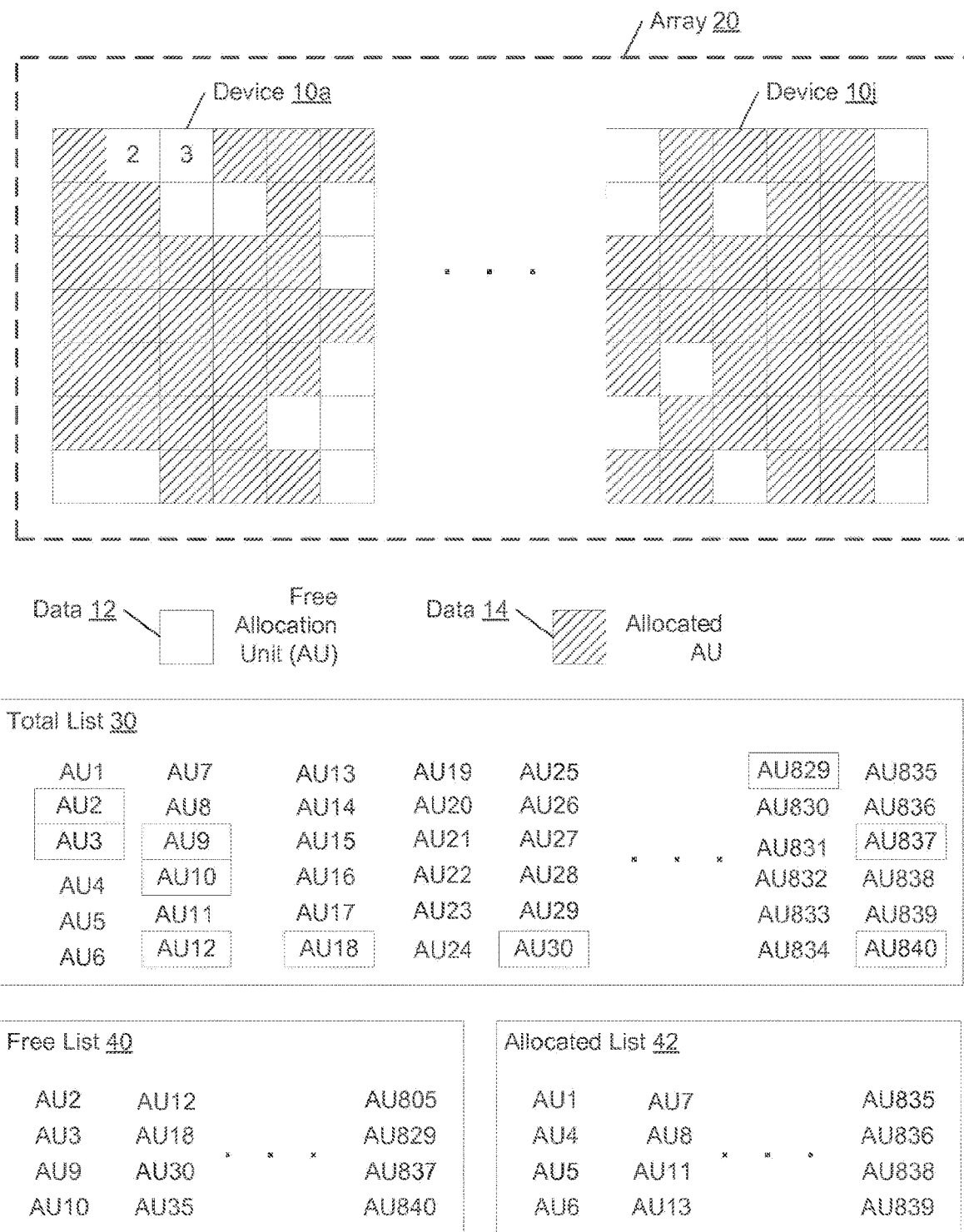
FIG. 1 is a generalized block diagram illustrating one embodiment of maintaining allocation status in a storage subsystem.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of maintaining allocation status in a storage subsystem is shown. While any type of storage system is contemplated, redundant arrays of inexpensive/independent disks (RAID) based or otherwise, a RAID based system is depicted for purposes of discussion. In the example shown, an array 20 is depicted that includes multiple devices 10a-10j configured to store data. As used herein, reference numerals followed by a letter or other designation may be referred to by the reference number alone for ease of discussion. For example, devices 10a-10j may simply be referred to as devices 10. Each of the blocks within the devices 10 illustrates an allocation unit. In various embodiments, each of the allocation units has a same size. In other embodiments, the allocation units have varying size based on factors such as the device, the type of data to store, the amount of data to store from a received request, the amount of data to store from a received request after deduplication, and so forth.

When identified as being allocated for data storage, a given allocated unit (AU) is not currently available for allocation. A given allocated unit may store valid data as shown by data 14. Alternatively, an allocated AU may not store valid data but may not yet be identified as being free for allocation. Stored data may be user data, inter-device RAID (redundant arrays of inexpensive/independent disks) information, log information, intra-device protection data, metadata for one or more other allocation units, and so forth. In the example shown, free allocation units are identified as such by the pattern Data 12 (blank). Allocated units are identified with the pattern Data 14. In some embodiments, data may be stored in the devices 10 in a random access manner. In other embodiments, data may be stored in a particular manner as desired by a given algorithm. All such embodiments are contemplated.

In various embodiments, each of the allocation units may have an associated unique allocation unit identifier (AU ID). In various embodiments, such identifiers may be unique to a given device, a given array, a given logical storage unit, or otherwise. In some embodiments, the AU ID is unique within a given device of the devices 20a-20j and a device ID is combined with the AU ID to provide a unique identifier for the array 20. In the example shown in FIG. 1, only the AU IDs are used as unique identifiers for ease of illustration. In the embodiment shown, the total list 30 identifies all AUs in the system. For example, an AU ID for each of the allocation units in the devices 10 may be identified. The AU IDs that are boxed in the total list 30 indicate AUs currently available for allocation (i.e., free AUs). For example, the top row of device 10a has 2 free AUs. For purposes of discussion, if the top row of device 10a has assigned AU IDs 1 to 6 from left to right, the free AUs are AU ID 2 and AU ID 3. These AU IDs are boxed in the total list 30. Although the AU IDs are assigned sequentially in this example, other assignments and methods for assigning the AU IDs are possible and contemplated. In addition, the AU IDs may start over with an initial value within each one of the devices 10. Therefore, as described earlier, a corresponding device ID may be included with the AU IDs in order to create unique identifiers. It is noted that the total list 30 is merely a logical representation of AUs in the system. It is not necessarily that case that there is a list of all AUs, as such, per so. Those skilled in the art will appreciate that identification of AUs in the system may take many forms, and may be determined by reference to multiple tables, data structures, or otherwise.

In FIG. 1, the free list 40 identifies all AUs available for allocation. In this example, AU IDs identifying unallocated (free) AUs are identified by the free list 40. As can be seen, each of the free (boxed) AU IDs in the total list 30 is included in the free list 40. For example, the free list 40 is shown to include at least AU IDs 2, 3, 9, 10, 12, 18, 30, 35, 805, 829, 837 and 840. The Allocated list 42 includes AU IDs identifying allocated AUs. Each of the allocated (unboxed) AU IDs in the total list 30 is included in the Allocated list 42. For example, the free list 40 is shown to include at least AU IDs 1, 4-8, 11, 13, 835, 836, 838 and 839. A data storage controller (not shown) may maintain each of the free list 40 and the Allocated list 42 as operations are processed in the storage subsystem. It is noted that the total list 30, free list 40, and allocated list 42 are logical representations of AUs in the system. It is not necessarily the case that there are lists of AUs, per se. Those skilled in the art will appreciate that identification of AUs in the system may take many forms, and may be determined by reference to multiple tables, data structures, or otherwise. In some embodiments, one or more of the lists 30, 40, 42 is completely accurate. In other embodiments, there may be some margin of error. For example, the total list 30 could identify AUs that are failed or otherwise not usable. Similarly, during operation, one or more of the lists may temporarily be out of sync with a status of the AUs due to a latency associated with updating a list, otherwise. Whichever the case, it may generally be a goal to keep these lists as close to up to date and accurate as possible during normal operation.

A variety of operations within the system may cause an AU to be allocated or unallocated. For example, a given AU may be allocated responsive to the processing of a write request, responsive to garbage collection processes, or other processes that require allocation of storage. In some cases, the data to be stored includes user data to store on one or more of the devices 10. Alternatively, the data may include inter-device RAID information, log information, intra-device protection data, metadata for one or more other allocation units, and so forth. Processes requiring allocation of AUs may be generated by a client computer, a data storage controller (not shown) performing a deduplication operation, garbage collection operations, defragmentation operations, etc. For example, a deduplication operation may determine that user data received as part of a write request does not need to be stored as a copy already exists. However, a deduplication mapping table may be updated which does cause allocation of storage. These and other scenario are possible and are contemplated.

In various embodiments, state transitions of a given AU from free to allocated, and vice-versa, may not be immediately reflected in persistent storage. Rather, an in-memory representation may reflect changes to one or more AUs that have not been stored to persistent storage. For example, in one embodiment, a database is maintained in persistent storage that identifies allocation units currently in use in the storage system. In effect, this database may be seen to identify where valid data is currently stored in the storage system. The identification of AUs currently allocated may take many forms and various tables or other data structure may be used for storing such data. In various embodiments, the database may further identify when a given AU was allocated relative to other AUs. Deallocation of AUs may likewise be reflected in the database. For example, in one embodiment the allocation of an AU may be associated with a time stamp. In other embodiments, other types of identifiers are used to indicate an ordering. For example, in one embodiment, a strictly increasing identifier (e.g., each successive identifier is incremented) is used to determine whether an AU was allocated after another. Various such approaches are possible and are contemplated. Additionally, in various embodiments allocated AUs in the storage system may themselves store such an identifier and or otherwise be associated with such an identifier. In this manner, reading data stored within a given AU (e.g., as part of a header or user data itself) may provide an indication as to whether the AU is currently allocated and when the AU was allocated vis-à-vis another AU.

It is noted that the example shown in FIG. 1 is small for illustrative purposes. In some examples, a data storage controller supports hundreds of thousands of volumes, each volume includes hundreds of thousands of allocation units. The total number of AUs in the data storage subsystem may reach tens of millions. In response to a reboot of the system, determining which AUs are currently allocated in the system and which are not may require reading each AU in the system to determine whether it is currently allocated. Consequently, the reboot process may be relatively time consuming. Delays caused by such a process may be unacceptable (or at least undesirable) for critical applications in business, medicine, entertainment and so forth.

Figure 2:
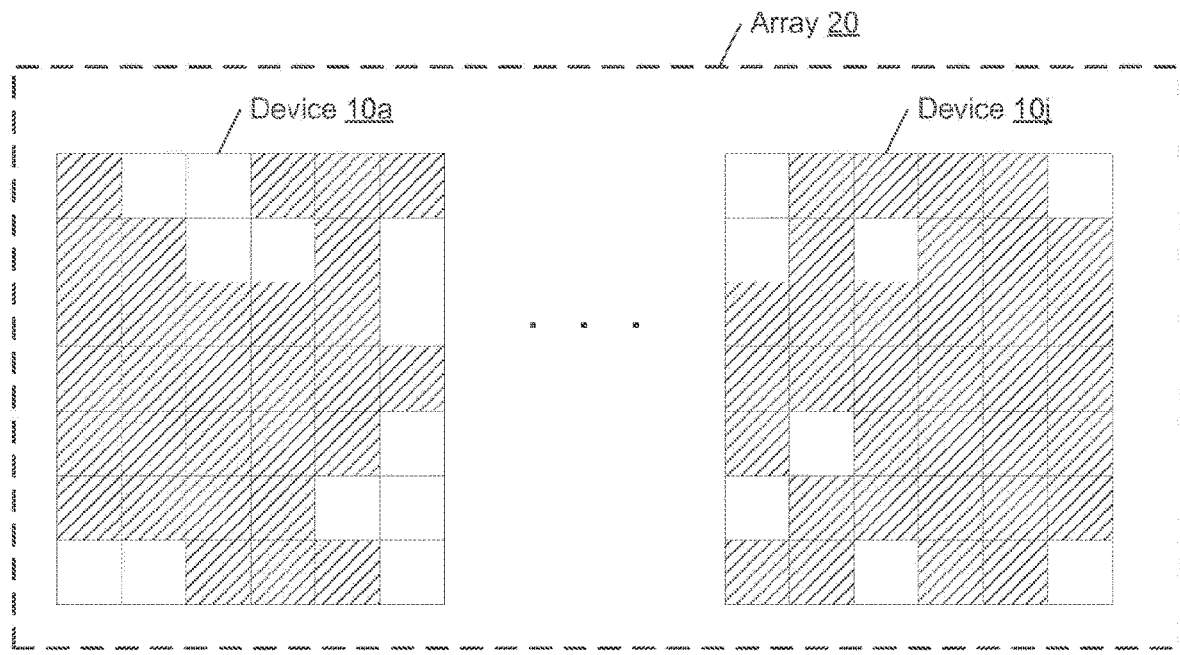
FIG. 2 is a generalized block diagram illustrating one embodiment of maintaining pre-scan data in a storage subsystem.
Figure 2:
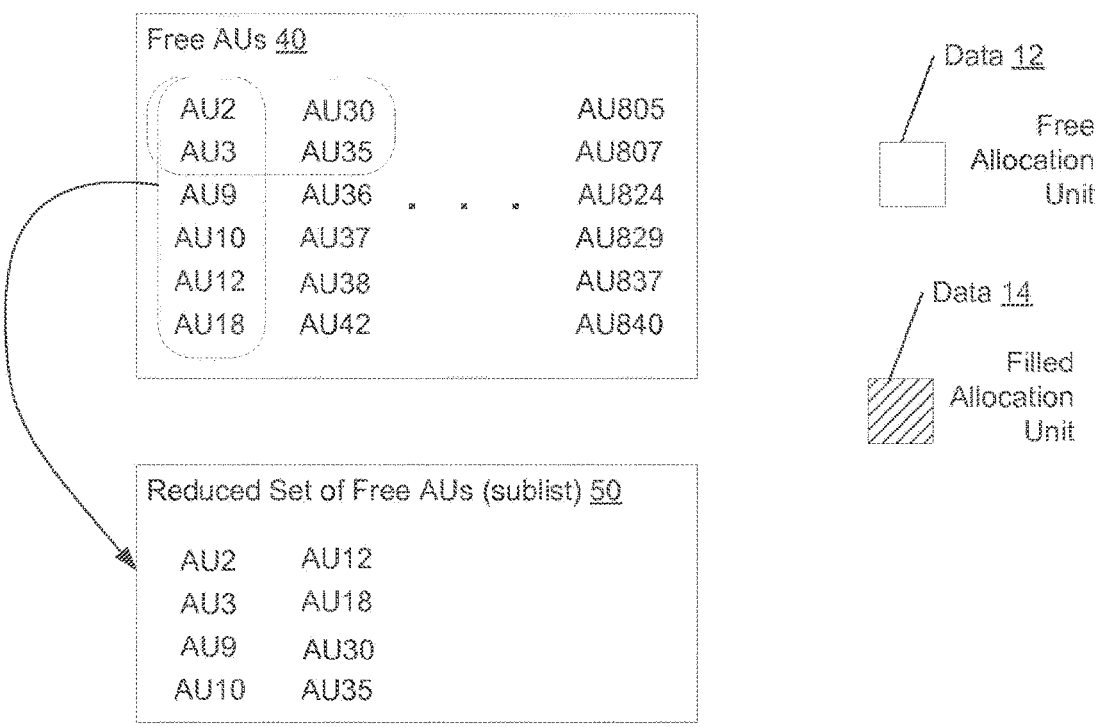

Turning to FIG. 2, improved methods and mechanisms are discussed that may generally reduce the boot time for a storage system. FIG. 1 illustrates a generalized block diagram of one embodiment of a system configured to maintain data in a storage subsystem. As in FIG. 1, an array 20 with devices 10 is shown. Also shown is the free list 40. In addition to these, a subset of the free list 40, free sublist 50 is maintained. For example, the free sublist 50 stores information identifying a subset of the free AUs identified by the free list 40. As an example, the free list 40 may store information identifying tens of millions of AUs. The free sublist 50 may store information identifying hundreds of thousands of AUs, or some other fraction of the information in the free list 40. For illustrative purposes, the free sublist 50 includes a subset of the AU IDs in the free list 40 identifying unallocated (free) AUs. For example, the free sublist 50 is shown to include at least AU IDs 2, 3, 9, 10, 12, 18, 30 and 35. A data storage controller and/or some other controller (not shown here) may maintain one or more of each of the free list 40, free sublist 50 as operations are processed in the storage subsystem.

The selection of AUs identified by the free sublist 50 may be performed in any of a variety of ways. For example, if a data structure used for the free list 40 that is amenable to ordering AU IDs is used then a range of AU IDs from the free list 40 may be used. For example, in an ordered tree structure, a portion of the tree could be used. In other embodiments, AUs may be selected based upon other criteria, such as frequency of use, how recently used, number of errors detected, location, and so on. These and other approaches are possible and contemplated.

In various embodiments, when an AU is to be allocated within the system, the AU is selected from the free sublist 50—rather than the free list 40 as a whole. As noted above, allocation of an AU may be associated with a particular ID that is usable to indicate it was allocated before and/or after other AUs that have been allocated. Such an indication could be a strictly increasing identifier, time stamp, or otherwise. This identifier is then stored in association with the allocated AU (e.g., in a header associated with the AU or otherwise). When an AU is allocated, the AU is chosen from the free sublist 50 and that AU is now removed from the free sublist 50. Removal of the AU from the free sublist 50 may include actually removing an identification of the AU from the free sublist 50 or otherwise providing an indication in the free sublist 50 that it is no longer available for allocation. As noted above, some indication of AUs that have been allocated may be stored to persistent storage in a database of otherwise (e.g., on one or more of the devices 10 or elsewhere). However, storing this indication may not generally occur upon each allocation. Rather, storing such indications to persistent storage may occur on a periodic basis, at times of relatively low system load, time of day, or at some other time that may be determined programmatically, dynamically based on system or other conditions, or a combination of the two.

Additionally, in various embodiments, when a new sublist 50 is created, an identification of AUs in the sublist 50 may be stored to persistent storage before AUs may be allocated. For example, at system start an identification of all free AUs 40 may be determined. Based on this, the sublist 50 may be created and an identification of AU in the sublist 50 stored to persistent storage before AUs are allocated from the free sublist 50. During operation, at various times, a current state of the free sublist 50 is stored to persistent storage. Such times may be on a periodic basis, at times of relatively low system load, or at some other time that may be determined programmatically, dynamically based on system or other conditions, or a combination of the two. In various embodiments, when the free sublist 50 reaches a particular size (e.g., there only remain a given number of AUs available for allocation in the free sublist 50), it may be replenished with new AUs from the free list 40. In other embodiments, replenishment may be chosen on that basis of an opportune time. For example, when the system is idle or otherwise experiencing a low load, replenishment of the free sublist 50 may be performed. These and other embodiments are possible and are contemplated. When the free sublist 40 is replenished to include new AUs not previously included in the free sublist 50, an identification of AUs in the free sublist 50 may be stored in persistent storage before allocating AUs from the newly replenished free sublist 50. In some embodiments, the processing of write requests and other processes requiring allocation of an AU may be delayed while the free sublist 50 is being replenished. After it is replenished and an identification of the AUs identified by the newly replenished free sublist 50 are stored to persistent storage, the processes may resume.

In various embodiments, the free sublist 50, or some other identification of AUs included in the free sublist 50, may be stored in a location accessible during a boot process. For example, in one embodiment, a boot region of a storage device may be used. Similarly, data associated with the above described database that identifies allocated AUs in the system may be stored in such a location. During a boot process, this free sublist related data and database related data are used to speed the boot process as described below.

Figure 3:
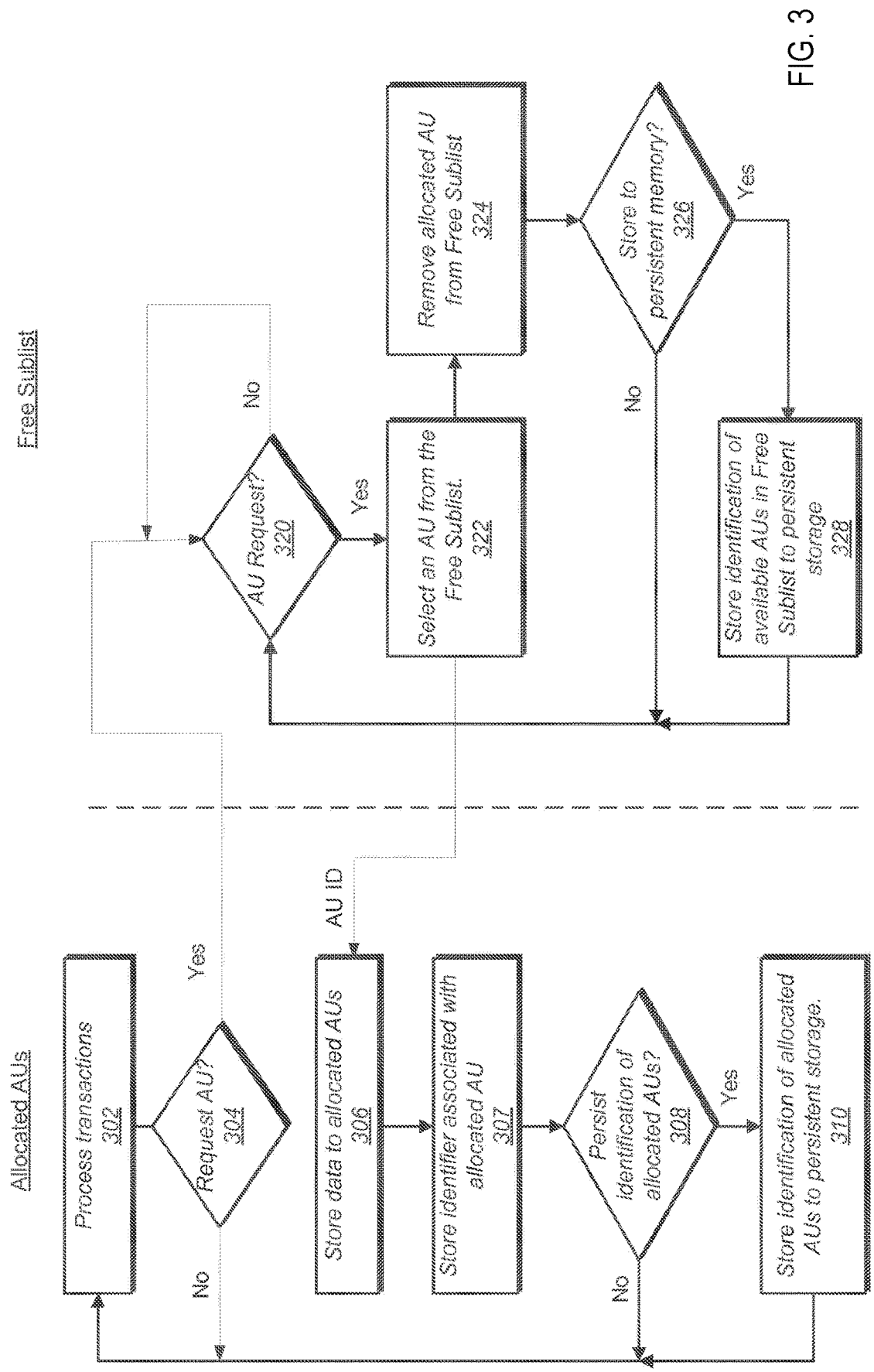
FIG. 3 is a generalized flow diagram illustrating one embodiment of a method for processing transactions with an Allocated list and a free sublist.

Turning now to FIG. 3, a generalized flow diagram of one embodiment of a method for maintaining allocation unit related information in a storage system is shown. For purposes of discussion, the steps in this embodiment are shown in sequential order. However, some steps may occur in a different order than shown, some steps may be performed concurrently, some steps may be combined with other steps, and some steps may be absent in another embodiment.

An overview of two processes are depicted in FIG. 3, Allocated AUs and Free Sublist. In various embodiments, these processes may occur simultaneously during system operation. In some embodiments, the processes are largely independent. In other embodiments, an event in one process may trigger an event in the other. Various such embodiments are possible and are contemplated. The first process depicted, Allocated AUs, generally illustrates handling of requests for allocation of AUs and persisting an identification of allocated AUs to persistent storage. The second process depicted, Free Sublist, generally illustrates allocation of AUs from a free sublist.

In block 302, transactions targeting the data storage subsystem are processed. Such transactions may be externally generated or internally generated. For example, I/O transactions from a client or other device may be received that target the storage system. Alternatively, transactions may be internally generated responsive to administrative or maintenance tasks such as garbage collection, replication, deduplication, or otherwise. Responsive to such transactions, if there is no request for allocation of an AU (block 1304), then processing may simply continue (block 302). However, a request for allocation of an AU may be generated (block 304). In various embodiments, the request is detected (block 320) by a process associated with the Free Sublist. In response, an AU is selected from the Free Sublist (block 322) and provided to a process associated with the requestor.

In block 306, the data is stored in the allocated AU(s). Additionally, an identification of the allocated AU is maintained (e.g., in volatile memory) (block 307).

If an event or a condition is satisfied for persisting the Allocated list (conditional block 308), then in block 310, the updated copy of the Allocated list is stored in persistent memory. Subsequently, control flow returns to block 302 for processing more transactions. Subsequently, a determination may be made as to whether an identification of allocated AUs is to be persisted (i.e., stored to non-volatile storage) (block 308). If not, then processing may simply resume (block 302). However, if it is determined that an identification of allocated AUs is to be persisted, then such an identification is stored to persistent storage (block 310). In various embodiments, the identification is stored to a database such as is discussed above. As already noted, the decision to persist (block 308) be based on any of a number of factors. For example, persisting may be performed periodically. The periodic time may be a programmable value stored in a configuration register. Alternatively, an idle time of the computing system is detected, a number of AUs to update in the Allocated list reaches a threshold, whereas the threshold may be programmable. Other events and conditions for qualifying the updated copy of the Allocated list to persistent memory are possible and contemplated.

In parallel with the Allocated AUs process, the free sublist is maintained. As shown, if a request for allocation of an AU is detected (block 320), then in block 322 an AU is selected from the free sublist and provided to a process associated with the requestor. In block 324, the selected AU is removed from the free lists or otherwise marked as no longer available for allocation. For example, a copy of the free sublist may be maintained in a RAM or other volatile memory and the selected AU has a state transition from free to allocate within the copy.

If an event or a condition is satisfied for persisting the free sublist (conditional block 326), then in block 328, the updated copy of the free sublist is stored in persistent memory. In some embodiments, the updated copy of the free sublist (or other information indicating which AUs are available in the free sublist) is sent to persistent storage when a periodic time duration is met. The periodic time may be a programmable value and the periodic time may differ from a similar value used for the Allocated list. Alternatively, an idle time of the computing system is detected and the updated copy of the free sublist is sent to persistent storage. Another condition may be a number of AUs to update in the free sublist reaches a threshold, whereas the threshold may be programmable. Other events and conditions for qualifying the updated copy of the Allocated list to persistent memory are possible and contemplated. If the information is not to be persisted (block 326), then processing may return to block 320.

Figure 4:
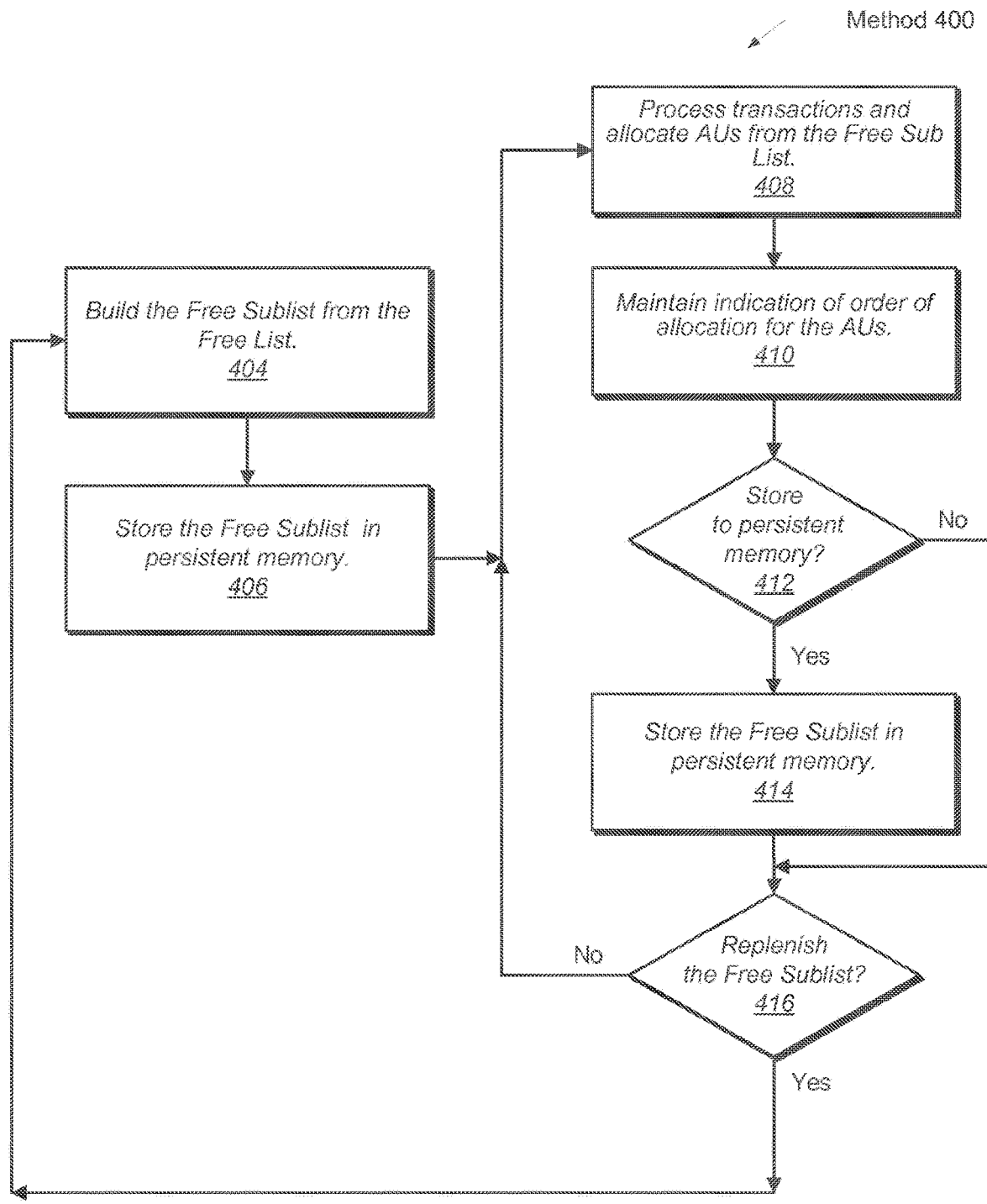
FIG. 4 is a generalized flow diagram illustrating one embodiment of a method for efficiently maintaining pre-scan data in a storage subsystem.

Turning now to FIG. 4, a generalized flow diagram of one embodiment of a method 400 for maintaining a free sublist in a storage system is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 404, a free sublist is built from a free list that generally identifies all AUs available for allocation in the system. In various embodiments, the free list may identify millions of AUs, while the free sublist is selected to only include a fraction of these AUs. Selection of which AUs to include in the free sublist may be performed in any of a variety of ways. For example, if a data structure used for the free list 40 that is amenable to ordering AU IDs is used then a range of AU IDs from the free list 40 may be used. For example, in an ordered tree structure a portion of the tree could be used. In other embodiments, AUs may be selected based upon other criteria, such as frequency of use, how recently used, number of errors detected, location, and so on. These and other approaches are possible and contemplated.

In various embodiments, selection of AUs to be allocated are taken from the free sublist and not the larger free list. In various embodiments, allocation of AUs may not be performed until the free sublist has been created. Still further, in some embodiments allocation of AUs from the free sublist may not be performed until an identification of AUs in the free sublist has been persisted by storing the identification to persistent storage (block 406). In block 408, transactions are processed as described earlier, wherein various operations may generate the transactions. The free sublist is accessed to determine which AUs to allocate for the transactions.

In block 410, as transactions that allocate AUs are processed, an indication as to an order in which AUs are allocated is maintained. In some embodiments, a corresponding time stamp may be maintained for each transaction. In other embodiments, a respective monotonically increasing sequence number is assigned to transactions that allocate AUs. The time stamp or sequence number may be stored with an indication that a corresponding AU is allocated. For example, in some embodiments, the time stamp or sequence number may be stored with the indication in a header of the corresponding AU. Alternatively, the time-order information and the indication of being allocated are stored in a table or a device header. Other locations for storing the time-order information and the allocation indication are possible.

As described earlier for block 326 in FIG. 3, multiple events or conditions may be used for determining when to persistently store the free sublist information. If an event or a condition is satisfied for persisting the free sublist (conditional block 412), then in block 414, the updated copy of the free sublist is stored in persistent memory (or simply information related to the free sublist that identifies AUs). In addition, at various times the free sublist is also replenished responsive to particular events occur or particular conditions being met. For example, the free sublist may be replenished responsive to detecting the free sublist is empty of available (free) AUs. The free sublist may be replenished responsive to the number of AU IDs of remaining free AUs in the free sublist falling below a threshold. Such a threshold may be a programmable value. In various embodiments, the threshold may be a percentage of a newly built free sublist, a number of free AUs used during an effective boot sequence or other startup processing. Other values for the threshold are possible and contemplated. Further, replenishment may occur based on a rate of AUs being allocated during the processing of transactions, a detected idle time, or otherwise. If an event or a condition is satisfied for replenishing the free sublist (conditional block 416), then control flow of method 400 returns to block 404. Otherwise, control flow of method 400 returns to block 408.

Figure 5:
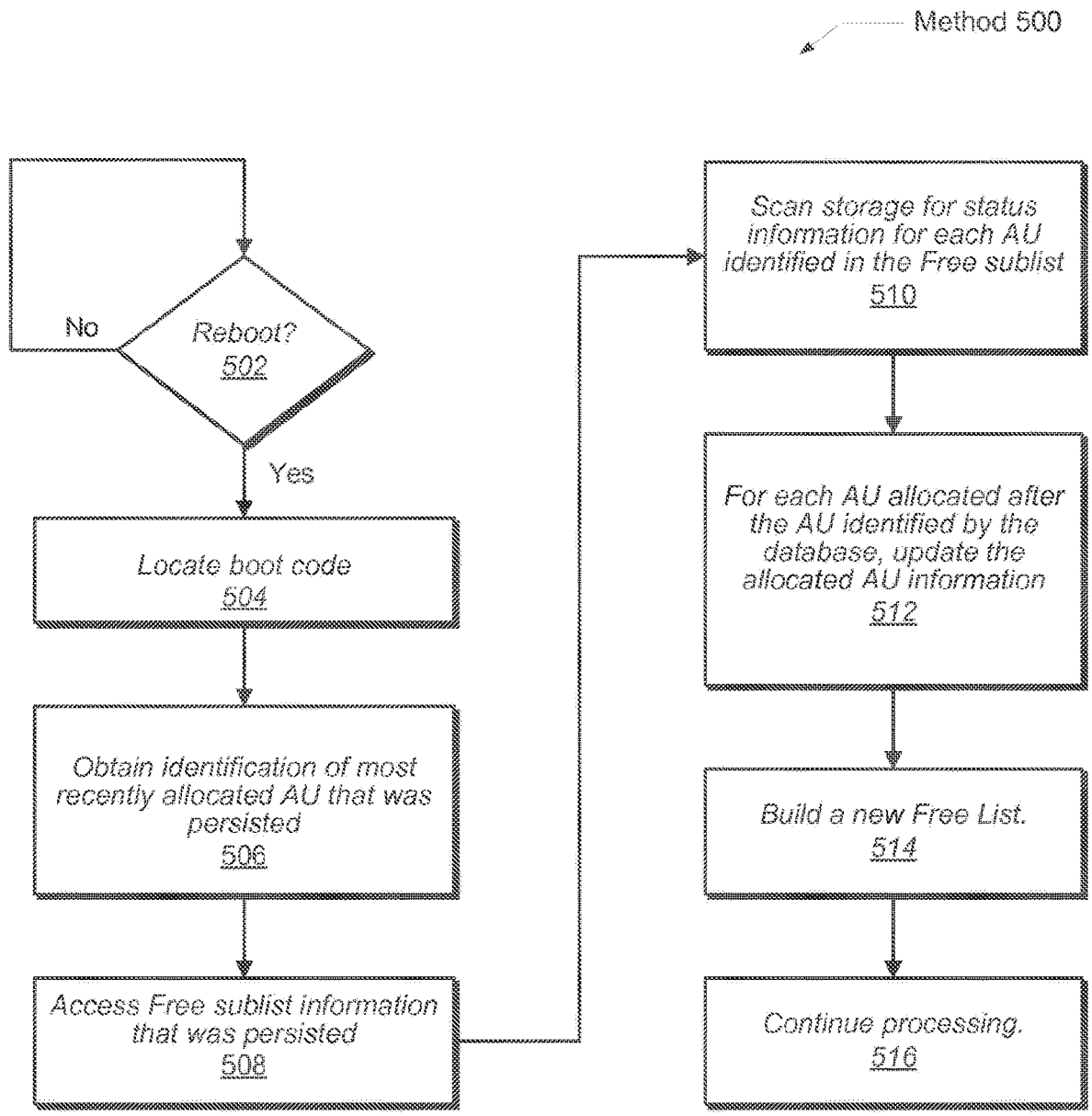
FIG. 5 is a generalized flow diagram illustrating one embodiment of a method for efficiently booting up a storage subsystem.

Turning now to FIG. 5, a generalized flow diagram of one embodiment of a method 500 for efficiently booting up a storage subsystem is shown. For purposes of discussion, the steps in this embodiment are shown in sequential order. However, some steps may occur in a different order than shown, some steps may be performed concurrently, some steps may be combined with other steps, and some steps may be absent in another embodiment.

Responsive to a reboot (conditional block 502), in block 504 boot related code may be located and accessed. For example, a designated boot location may be accessed. In various embodiments, multiple locations may be accessed based on a priority. For example, boot related code and/or circuitry may follow a priority list of locations to search for a boot region. The boot region may include machine code to be loaded by the firmware into RAM. The machine code may be a first phase of boot code that also locates a larger second phase of boot code to be later loaded. Numerous such embodiments are possible and are contemplated.

In block 506, an identification of a most recently allocated AU is retrieved. In various embodiments, the database discussed above is accessed to obtain such information. As already described, the identifier may be a time stamp, a sequence number, or any other identifying data that can be used to determine if an AU was allocated after another AU. In addition, information related to the free sublist that was persisted is retrieved from storage (508). As discussed above, when a free sublist is created an identification of AUs in the free sublist may be persisted. Additionally, an identification of available AUs in the free sublist could be persisted at other times. Having obtained this free sublist information regarding AUs available for allocation, each AU identified by the information may be accessed in the storage system to determine whether or not it is in fact free. It is noted that in an embodiment where AUs are only allocable from the free sublist, any AU that might be allocated in the system that isn't identified by the information obtained in block 506 must be an AU identified in the free sublist information obtained in block 508. Therefore, by determining which of the AUs identified by the persisted free sublist information are actually allocated, we may determine all allocated AUs in the system.

Therefore, a scan of each AU identified by the free sublist information obtained in block 506. As described above, state information associated with each AU may indicate whether or not it is allocated. Such information may be stored in the header of the AU, a user data area of the AU, or a combination of the two. Alternatively, the state information may be stored in a device header or another table within another AU. In addition, for allocated AUs the information includes an indication usable to determine whether the AU was allocated after another allocated AU (e.g., time stamp, sequence number, or otherwise as previously discussed).

By comparing an indication as to when an AU was allocated to the most recently allocated AU identified by the database in block 506, it can be determined that the AU represents an allocated AU not reflected by the database. In other words, an AU was allocated within the system whose identification was not persisted to the database. For each AU identified in the free sublist and determined to be allocated after the AU identified in block 506, information corresponding to the AU may be used to update the information regarding allocated AUs in the system. For example, the database may be updated.

Subsequent to identifying allocated AUs in the system (e.g., by updating the database), in block 514 list of free AUs in the system may be determined. This may be determined by comparing all allocated AUs identified by the database to AUs in the system. The difference between these represents AUs that are not allocated. Having identified unallocated AUs in the system (Free List), a new free sublist may be created as discussed above and used for allocation of AUs. In block 516, the remainder of the reboot process continues prior to further processing of transactions.

Figure 6:
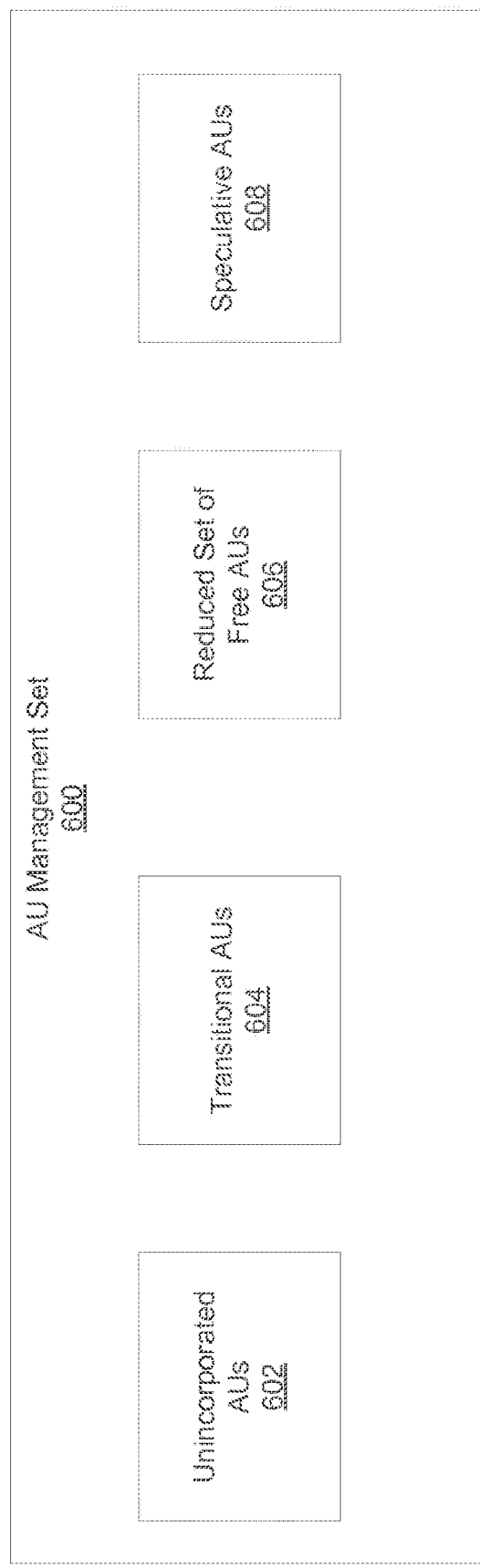
FIG. 6 illustrates one embodiment of AUs that may be tracked within a system.

In the discussion above, allocation units are described as generally being in one of two states—allocated or free. In the above described embodiments, a free sublist was tracked and persisted at various times. In such embodiments, the free sublist is the AU management set as described below. However, in various embodiments, AUs may exist in other states as well. FIG. 6 depicts one embodiment in of an AU management set 600 that tracks various AUs in a system. In the example shown, a reduced set of free AUs 606 is shown which generally corresponds to the above described free sublist. However, in addition to these, various embodiments may also include one or more of unincorporated AUs 602, transitional AUs 604, and speculative AUs 608.

Generally speaking, unincorporated AUs 602 represent AUs within the storage system that have been allocated and are currently in use. However, information indicating that these unincorporated AUs 602 have been allocated and are in use has not yet been persisted. Transitional AUs 604 generally correspond to AUs that are in the process of being allocated for use but are not yet in use. For example, when an AU is selected for allocation from a free list, that AU may be (effectively) marked in some way as no longer being free. However between the time the AU is marked as not being free and the time it actually is in use storing data, the AU is considered to be transitional (it is in a transition period in which it is no longer free for allocation, but is not yet in active use). In addition to unincorporated AUs 602 and transitional AUs 604, in some embodiments an identification of speculative AUs 608 may also be maintained.

Speculative AUs 608 generally represent AUs that are currently in use but are believed will be free in the near future. For example, in some embodiments the system may be able to monitor garbage collection processes and identify one or more AUs that are scheduled for garbage collection. These identified AUs may be added to the list of speculative AUs 608. In other embodiments, the system may be configured to predict that one or more AUs may be garbage collected in the near future and add these AUs to the list of speculative AUs 608 as well. Other methods of predicting and/or otherwise anticipating an AU may be soon freed are possible and are contemplated. Further, while the above discussion described unincorporated AUs 602, transitional AUs 604, free AUs 606, and speculative AUs 608, those skilled in the art will appreciated that AUs may have different states depending on the particular processes involved in moving from free to allocated, and vice-versa. In such embodiments, these AUs with other states may also be tracked and all such embodiments are contemplated.

Figure 7:
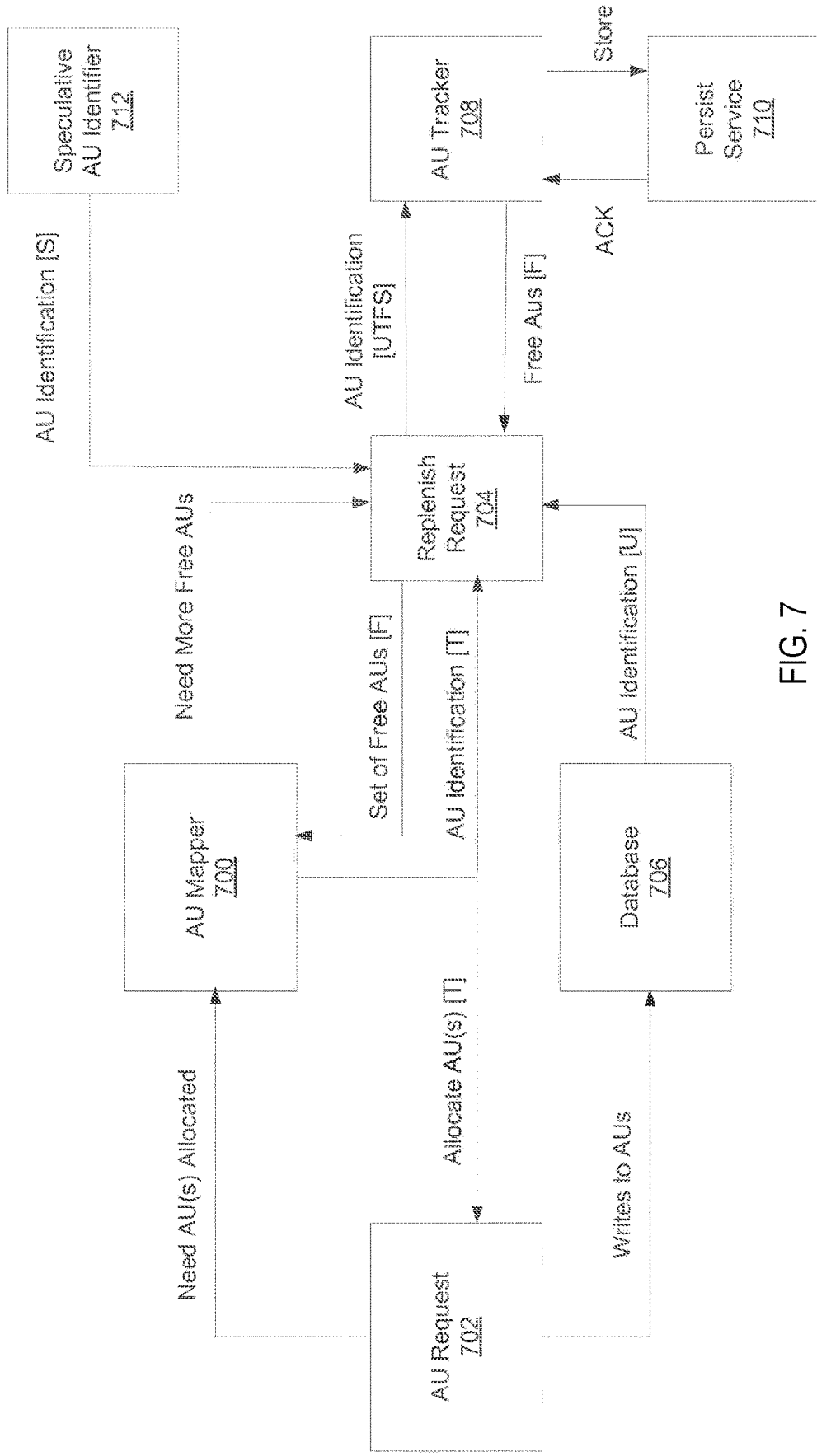
FIG. 7 illustrates one embodiment of processes that may be involved in the allocation of AUs and transition of AUs between different states.

Turning now to FIG. 7, one embodiment of processes used in managing AUs is shown. It is noted that while various processes are depicted, in various embodiments different processes may perform similar functions, some functions may be performed by other processes not depicted, and so on. In various embodiments, each of the blocks may correspond to a given process, particular program code, a hardware component, or otherwise. The illustrated embodiment is provided for purposes of discussion. In the embodiment shown, an AU request 702 process is shown that is configured to generate requests for allocation of AUs (Need AU(s) Allocated). Such requests may be generated responsive to received write requests, garbage collection processes, or otherwise. Responsive to such requests, an AU mapper 700 may allocate one or more AUs responsive to a request (Allocate AU(s)). These allocated AUs may generally correspond to transitional [T] AUs as discussed above. In addition to allocating such AUs, an identification of these allocated AUs may also be provided to replenish request process 704 (shown by the dashed line). This indication may explicitly or implicitly indicate these AUs correspond to AUs in a transitional [T] state. In various embodiments, AUs selected by mapper 700 are chosen from a reduced set of free AUs such as the free sublist discussed above. At various times, mapper 700 may request more AUs for use in servicing requests for allocation of AUs. For example, as discussed above in relation to the free sublist, when the free sublist reaches a particular threshold (e.g., some minimum number), the mapper 700 may request replenishment (Need more Free AUs) of its free sublist. As described above, whether and when a request for replenishment is generated may be programmable, may be dynamic based on various conditions, and so on as previously discussed. Responsive to this request, a replenish process 704 will provide identification of one or more free AUs (Set of Free AUs [F]) to the mapper 700. At this point in time, process 704 may identify these AUs as free [F] AUs.

In addition to the above, database 706 may at various times provide an identification of AUs that have been allocated and are in use (Allocated AUs) to process 704. Database 706 may generally correspond to an identification of AUs that have been allocated and are in use, but whose identification has not yet been persisted. Accordingly, these AUs identified by database 706 may generally correspond to the unincorporated [U] AUs discussed above. For example, request process 702 may provide an indication to database 706 when an AU that has been allocated is now in use (e.g., as indicated by the dashed arrow Writes to AUs). In other embodiments, this indication that an AU is in use and corresponds to an unincorporated AU may be provided by some other process or determined in some other way. It is noted that while FIG. 7 depicts an identification of various types of AUs being provided to request process 704, in various embodiments the identification of one or more of these AUs (or types of AUs) may be performed when recomputation of the AU management set is done. For example, at the time the AU management set is recomputed, a process (e.g., such as process 704, or process 708) may access data in memory and/or stored at one or more other locations to determine a state of various AUs in the system. In this manner, the AU management set is recomputed and may be persisted at that time.

Still further, in some embodiments AUs which are believed will become free are tracked or otherwise identified. For example, as discussed above, garbage collection processes may schedule AU for reclamation and this information may be accessible or determinable by a speculative AU identifier process 712 as shown in FIG. 7. Having identified such AUs, this identification of speculative AUs [S] may be provided or otherwise made available to process 704. In some embodiments, an identification of AUs corresponding to an unincorporated [U], free [F], transitional [T], and/or speculative [S] state may be provided or other made available to AU tracker 708. At various times, information corresponding to this AU management set may be persisted by storing (Store) the information on non-volatile storage. Responsive to such a store operation, an acknowledgement (ACK) may be provided to confirm the store has been successfully completed. In various embodiments, tracker 708 may be configured to store the information each time the AU management set is recomputed. In some embodiments, if a newly recomputed AU management list is determined to be a subset of a previously persisted AU management set, a store of the information may be bypassed or skipped (as it would duplicate previous information already stored).

Figure 8:
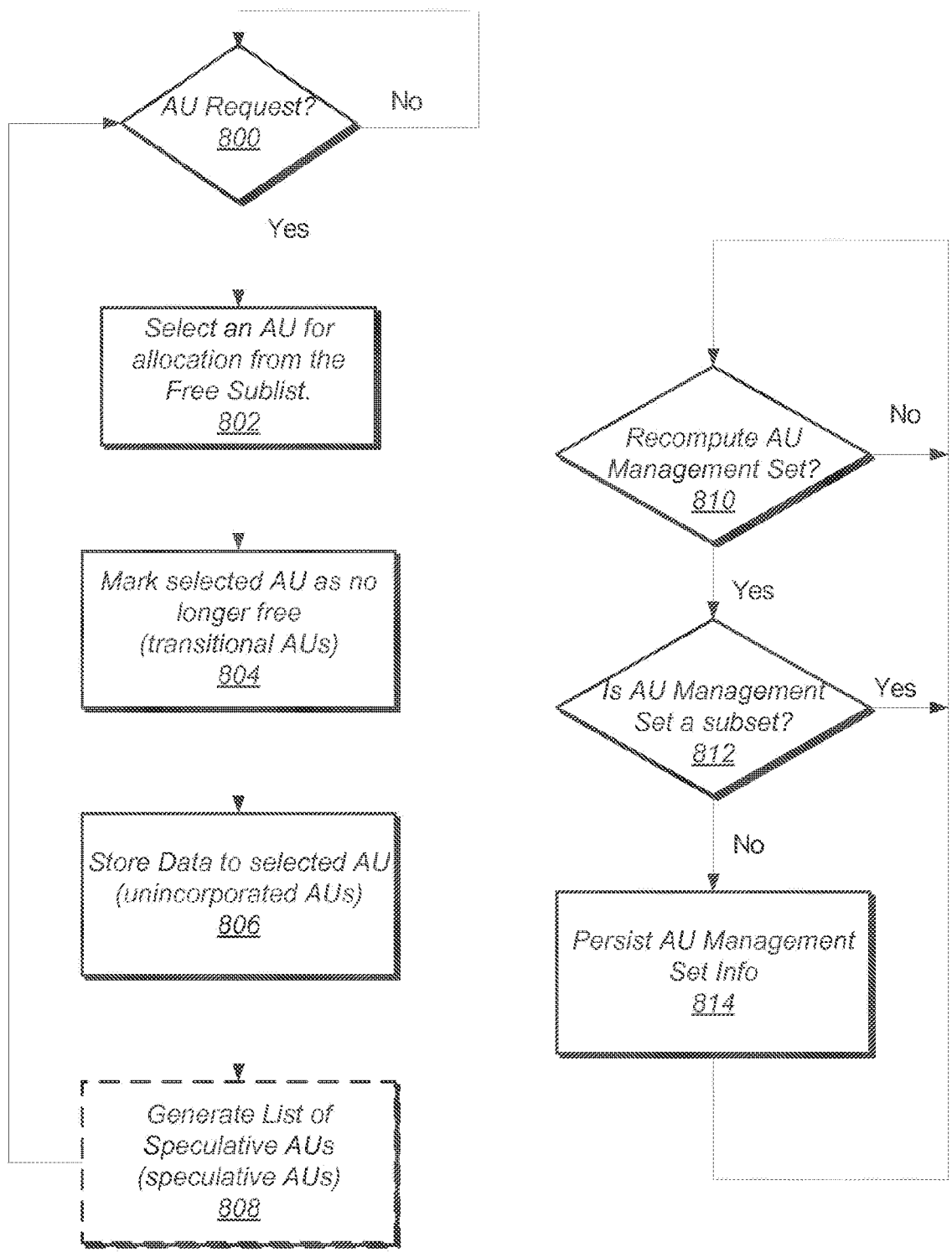
FIG. 8 illustrates one embodiment of a method for managing AUs in a system.

FIG. 8 illustrates one embodiment of a method for managing AUs. In the example shown, two flowcharts are depicted which may operate independent of one another. In other embodiments, events in one may trigger events in the other. As shown, a request for allocation of an AU may be detected (block 800). In response to the request, one or more AUs are selected for allocation from a reduced free list as discussed above (block 802). Responsive to selecting AUs for allocation from the reduced list, an indication may be stored to indicate the selected AUs are no longer available for allocation (block 804). The selected AUs which have been marked or are otherwise identified as such correspond to transitional AUs. Subsequently, the allocated AUs will in fact enter use and store data (block 806). At this time, the AU are no longer transitional AUs and are now identified as unincorporated AUs. In some embodiments, speculative AUs may be identified (block 808) as discussed above and an identification of these speculative AUs maintained. The identification of the reduced set of free AUs, transitional AUs, unincorporated AUs, and/or speculative AUs collectively form the AU management set.

In addition to the above, at various times the AU management set may be computed/recomputed as discussed above (block 810). If such a recomputation is performed, information corresponding to the AUs identified in the AU management set may be persisted (block 814). As noted, in some embodiments, if the newly computed AU management set is a subset of information already persisted, then the persisting step may be skipped.

Figure 9:
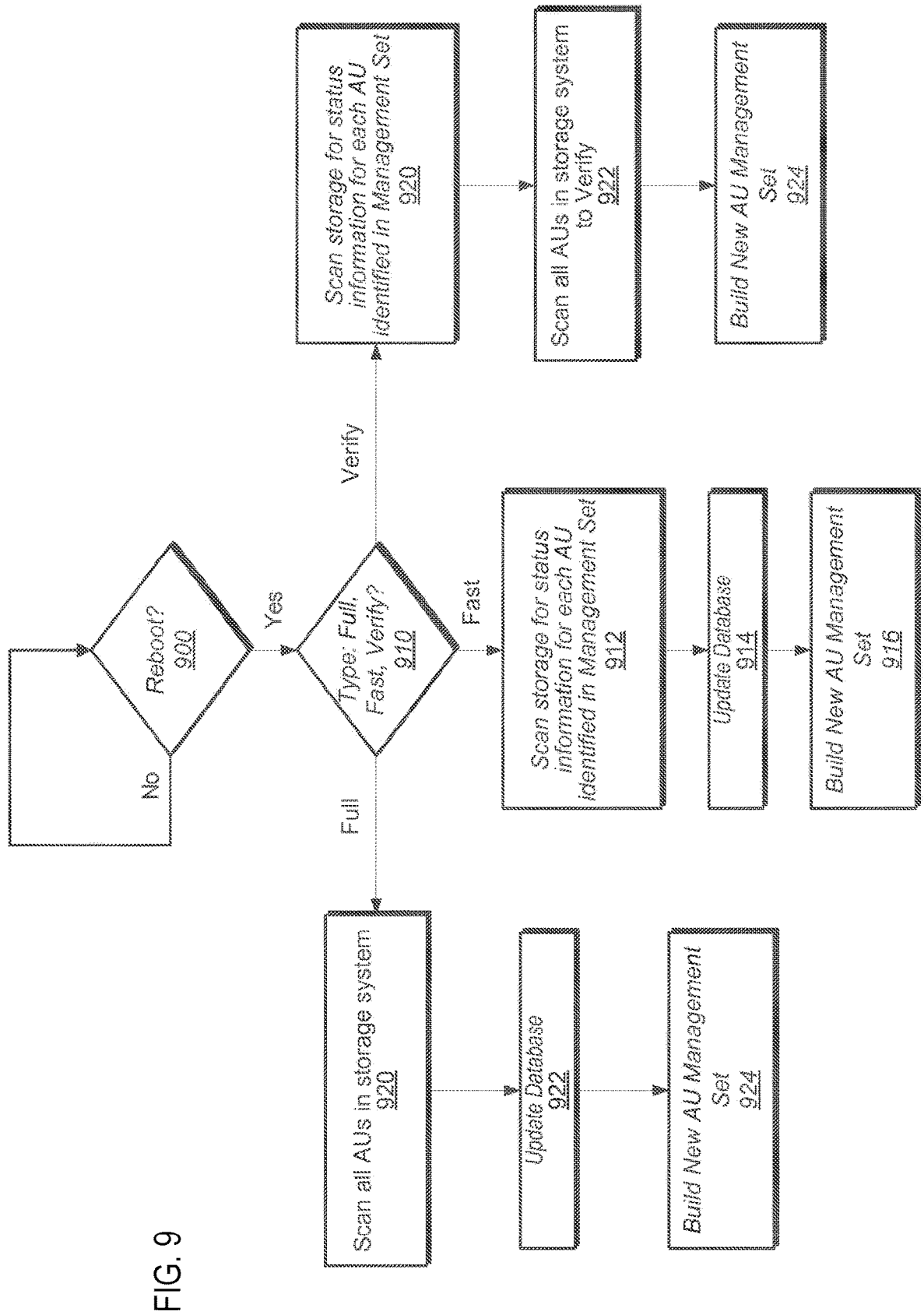
FIG. 9 illustrates one embodiment of a method for rebooting a storage system.

FIG. 9 depicts one embodiment of a method for rebooting (or simply booting) a storage system. In the example shown, responsive to a reboot (block 900) a determination may be made as to what type of reboot process is to be performed. In various embodiments, two or more types of reboot may be available. Selection of a type of reboot may be programmable in advance or selectable at the time of reboot (either explicitly or by default in the absence of a different selection). In one embodiment, three type of reboot are available: Full, Fast, and Verify. If a full reboot type is selected, then a scan of all AUs in the storage system may be performed to determine a state of AUs in the system. As described above, in various embodiments each AU stores information that may be used to identify information regarding the AU. In some embodiments, the first two pages of each AU contain such information and are scanned during the scanning process. These two pages may be referred to as the AU head. It is noted that such information need not be in the first two pages of the AU, rather the information may be stored elsewhere within a given AU or outside the AU in a determinable location. As already described, such information may include an indication as to whether the AU is allocated or not. Additionally, if allocated, the information may include an indication as to when the AU was allocated relative to other AUs (e.g., a monotonically increasing identifier, time stamp, or otherwise).

Having scanned all AUs in the storage system, AUs may be identified as allocated or free. As may be appreciated, some AUs may have been marked as defective or otherwise not usable. In such a case, they may essentially be removed from consideration. Based upon the information from the scan, a database may be updated to reflect identify (at least) the allocated AUs. This database may then be persisted. The remaining usable AUs may be identified as free. Subsequently, a new AU management set may be computed and processing may continue. Immediately subsequent to building the AU management set (block 924), the management set may only include a reduced free set of AUs as none have yet transitioned to a transitional or unincorporated state.

If the reboot type is determined to be of type Fast (block 910), then a process similar to that of FIG. 5 may be performed. However, in this case, rather than just scanning AUs that were persisted as being part of the free sublist, a scan of each AU persisted as part of the AU management set is performed (block 912). As noted that may include AUs including free AUs in the reduced free list, transitional AUs, unincorporated AUs, and speculative AUs. Various embodiments may not include all of these types. Upon scanning these AUs, it can be determined which are allocated and were allocated after a last allocated AU identified by a persisted database. This is similar to the steps 506 and 512 of FIG. 5. Based on this information, the database may be updated, a new AU management set created/computed, and processing may continue.

In the case where the reboot is of type Verify, the Fast reboot type is performed and a full scan is used to verify the correctness of the resulting database. As depicted in FIG. 9, AUs identified by the persisted AU management set (information) are scanned (block 920), then all AUs are scanned (block 922) as part of a verification process, and a new AU management set created/computed.

It is noted that each of the above described methods and mechanisms may be combined in various ways. In addition, in various embodiments the AU management set may be managed in such a way that it has a relatively fixed size. In other words, the AU management set may be "set" (e.g., programmed) to identify a given number of AUs. In this manner, a reboot using the Fast reboot type will require scan of a relatively consistent number of AUs. This in turn may provide a relatively consistent, and perhaps predictable, reboot time.

Given an embodiment where the AU management set is configured to maintain some particular number of AUs, various processes described above may be managed in a particular way. For example, each time the AU management set is recomputed, the number of free AUs to include as part of a reduced set of free AUs may depend on the number of other types of AUs. As an example, if the AU management set is programmed to maintain identification of an integer number N AUs, then on recomputation of the management set L AUs may be determined to be unincorporated, M AUs may be determined to be transitional, and P AUs may be determined to be speculative. In order to maintain the management set to a total of N AUs, the number X of free AUs to include as part of the reduced set is X=N−L−M−P. Therefore, in one example, when the AU management set is first created (at boot) it contains an identification of N free AUs (in some embodiments the initial set may include some number of speculative AUs which would then reduce the number of free AUs identified). During processing some portion of these AUs will change state to transitional or unincorporated. However, in various embodiments the total number of AUs identified does not change. At the time of recomputation of the AU management set, the number and type of each AU may change in the set, but the total number may remain fixed. In some embodiments, recomputation may result in a change in the total number of AUs identified in the AU management set. Such a change could be programmable or dynamically determined responsive to system conditions. These and other embodiments are possible and are contemplated.

Figure 10:
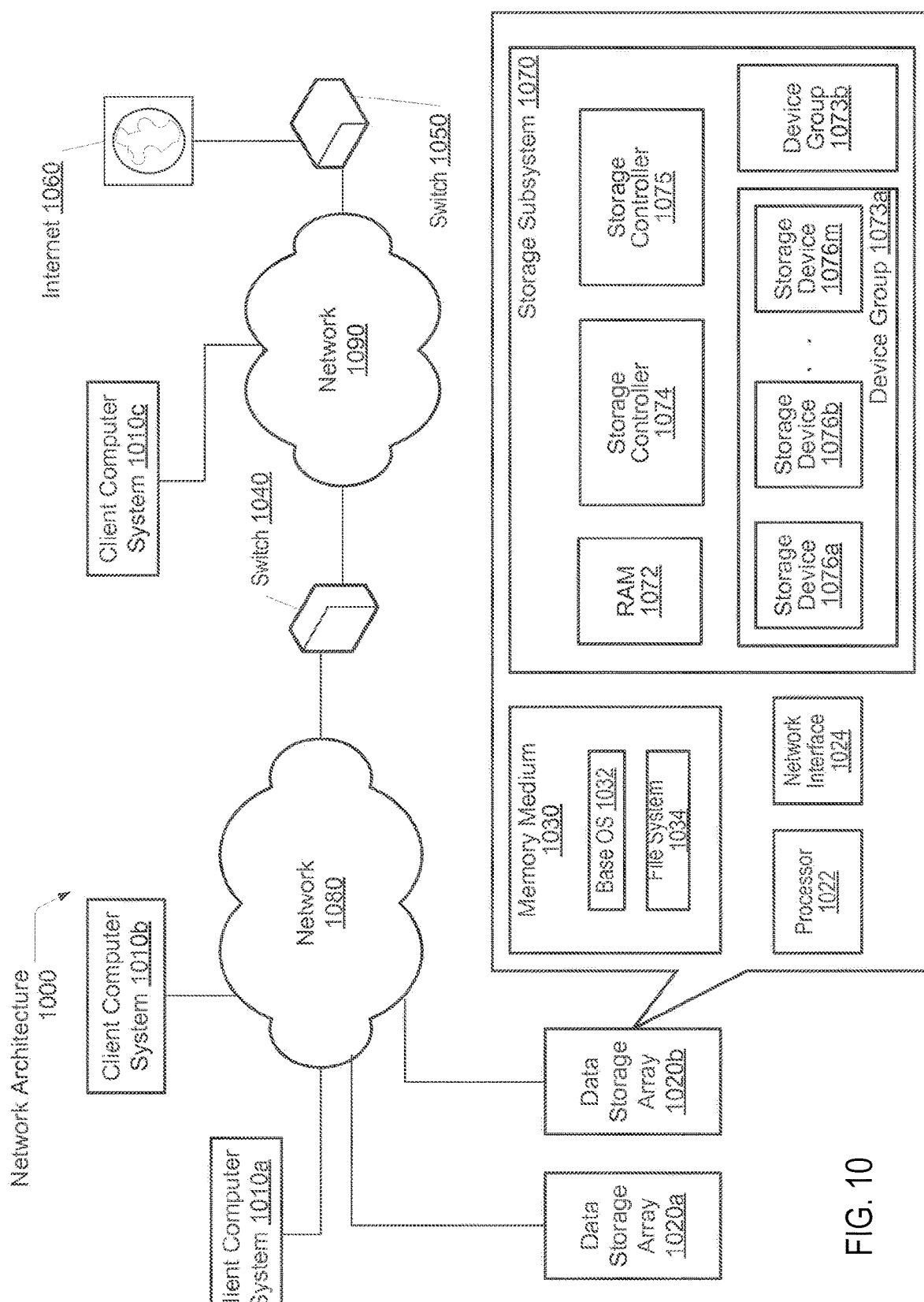
FIG. 10 is a generalized block diagram illustrating one embodiment of a network architecture.

Referring to FIG. 10, a generalized block diagram of one embodiment of a network and system that may incorporate the methods and mechanisms described above. In various embodiments, client computer systems 1010a-1010b are interconnected to one another through a network 1080 and to data storage arrays 1020a-1020b. Network 1080 may be coupled to a second network 1090 through a switch 1040. Client computer system 1010c is coupled to client computer systems 1010a-1010b and data storage arrays 1020a-1020b via network 1090. In addition, network 1090 may be coupled to the Internet 1060 or otherwise outside network through switch 1050.

In the network architecture 1000, each of the data storage arrays 1020a-1020b may be used for the sharing of data among different servers and computers, such as client computer systems 1010a-1010c. In addition, the data storage arrays 1020a-1020b may be used for disk mirroring, backup and restore, archival and retrieval of archived data, and data migration from one storage device to another. In an alternate embodiment, one or more client computer systems 1010a-1010c may be linked to one another through fast local area networks (LANs) in order to form a cluster. Such clients may share a storage resource, such as a cluster shared volume residing within one of data storage arrays 1020a-1020b.

Each of the data storage arrays 1020a-1020b includes a storage subsystem 1070 for data storage. Storage subsystem 1070 may comprise one or more storage devices 1076a-1076m. These storage devices 1076a-1076m may provide data storage services to client computer systems 1010a-1010c. Each of the storage devices 1076a-1076m uses a particular technology and mechanism for performing data storage. The type of technology and mechanism used within each of the storage devices 1076a-1076m may at least in part be used to determine the algorithms used for controlling and scheduling read and write operations to and from each of the storage devices 1076a-1076m. For example, the algorithms may locate particular physical locations corresponding to the operations. In addition, the algorithms may perform input/output (I/O) redirection for the operations, removal of duplicate data in the storage subsystem 1070, and support one or more mapping tables used for address redirection and deduplication.

The logic used in the above algorithms may be included in one or more of a base operating system (OS) 1032, a volume manager 1034, within each of the storage subsystem controllers 1074 and 1075, control logic within each of the storage devices 1076a-1076m, or otherwise. Additionally, the logic, algorithms, and control mechanisms described herein may comprise hardware and/or software.

In some embodiments, each of the storage devices 1076a-1076m may include or be further coupled to storage consisting of solid-state memory to store persistent data. In one embodiment, the included solid-state memory comprises solid-state drive (SSD) technology. A Solid-State Disk (SSD) may also be referred to as a Solid-State Drive. Storage array efficiency may be improved by creating a storage virtualization layer between user storage and physical locations within storage devices 1076a-1076m. In one embodiment, a virtual layer of a volume manager is placed in a device-driver stack of an operating system (OS), rather than within storage devices or in a network. A volume manager or a disk array manager is used to support device groups 1073a-1073m.

The controllers 1074 and 1075 may comprise logic for handling received read/write requests. In some embodiments, each of the data storage arrays 1020a-1020b includes multiple controllers, such as controllers 1074 and 1075. For example, when the original controller 1074 fails, a failover process transfers control to the secondary controller 1075. The base OS 1032, the volume manager 1034 (or disk array manager 1034), any OS drivers (not shown) and other software stored in memory medium 1030 may provide functionality providing access to files and the management of these functionalities. The base OS 1032 and the OS drivers may comprise program instructions stored on the memory medium 1030 and executable by processor 122 to perform one or more memory access operations in storage subsystem 1070 that correspond to received requests. Each of the data storage arrays 1020a-1020b may use a network interface 1124 to connect to network 1080. Similar to client computer systems 1010a-1010c, in one embodiment, the functionality of network interface 1124 may be included on a network adapter card.

Figure 11A:
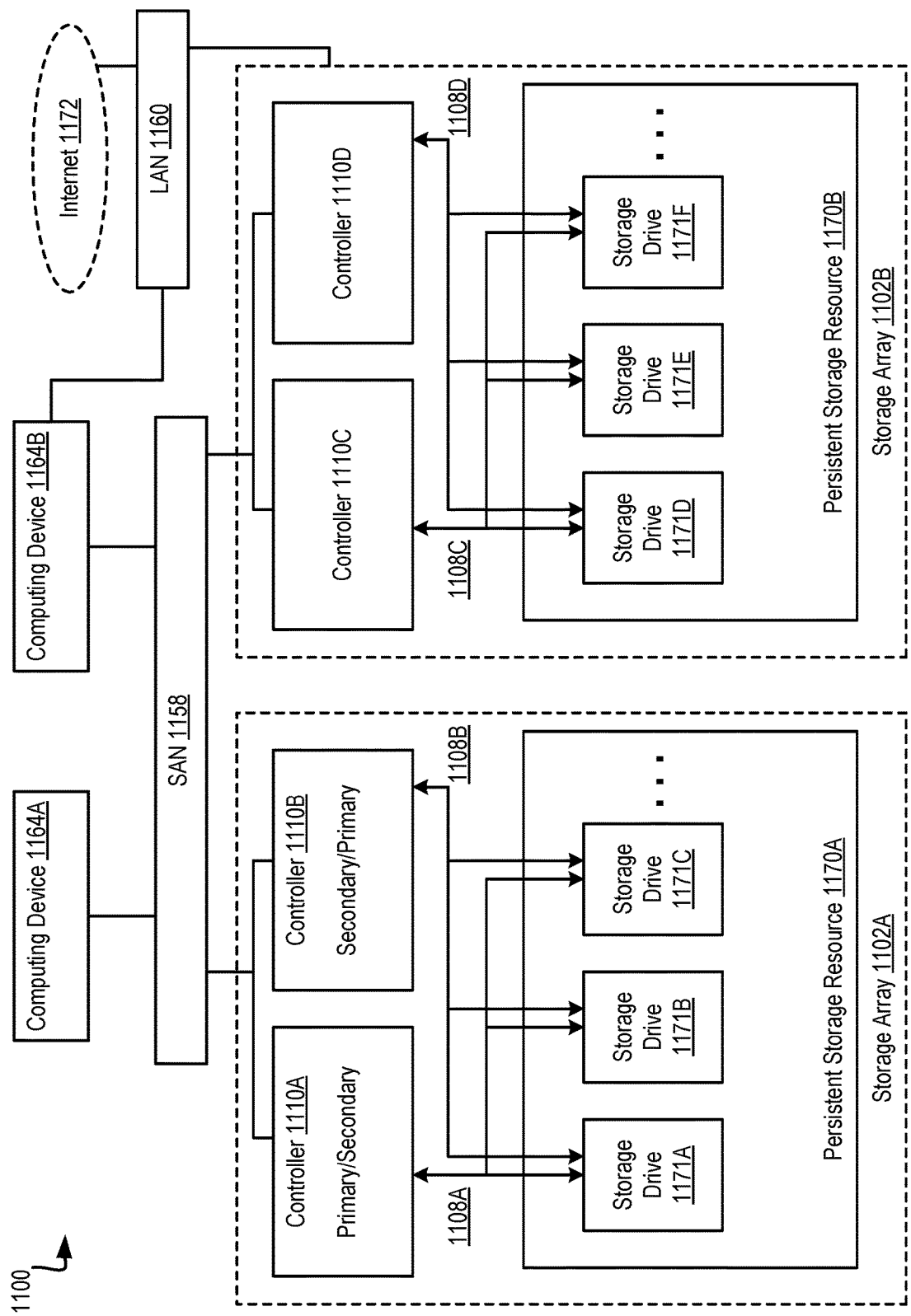
FIG. 11A illustrates a first example system for data storage in accordance with some implementations.

For further explanation, FIG. 11A illustrates an example system for data storage, in accordance with some implementations. System 1100 (also referred to as "storage system" herein) includes numerous elements for purposes of illustration rather than limitation. It may be noted that system 1100 may include the same, more, or fewer elements configured in the same or different manner in other implementations.

System 1100 includes a number of computing devices 1164A-B. Computing devices (also referred to as "client devices" herein) may be embodied, for example, a server in a data center, a workstation, a personal computer, a notebook, or the like. Computing devices 1164A-B may be coupled for data communications to one or more storage arrays 1102A-B through a storage area network ('SAN') 1158 or a local area network ('LAN') 1160.

The SAN 1158 may be implemented with a variety of data communications fabrics, devices, and protocols. For example, the fabrics for SAN 1158 may include Fibre Channel, Ethernet, Infiniband, Serial Attached Small Computer System Interface ('SAS'), or the like. Data communications protocols for use with SAN 1158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 1158 is provided for illustration, rather than limitation. Other data communication couplings may be implemented between computing devices 1164A-B and storage arrays 1102A-B.

The LAN 1160 may also be implemented with a variety of fabrics, devices, and protocols. For example, the fabrics for LAN 1160 may include Ethernet (802.3), wireless (802.11), or the like. Data communication protocols for use in LAN 1160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 1102A-B may provide persistent data storage for the computing devices 1164A-B. Storage array 1102A may be contained in a chassis (not shown), and storage array 1102B may be contained in another chassis (not shown), in implementations. Storage array 1102A and 1102B may include one or more storage array controllers 1110A-D (also referred to as "controller" herein). A storage array controller 1110A-D may be embodied as a module of automated computing machinery comprising computer hardware, computer software, or a combination of computer hardware and software. In some implementations, the storage array controllers 1110A-D may be configured to carry out various storage tasks. Storage tasks may include writing data received from the computing devices 1164A-B to storage array 1102A-B, erasing data from storage array 1102A-B, retrieving data from storage array 1102A-B and providing data to computing devices 1164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 1110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 1110A-D may include, for example, a data communications adapter configured to support communications via the SAN 1158 or LAN 1160. In some implementations, storage array controller 1110A-D may be independently coupled to the LAN 1160. In implementations, storage array controller 1110A-D may include an I/O controller or the like that couples the storage array controller 1110A-D for data communications, through a midplane (not shown), to a persistent storage resource 1170A-B (also referred to as a "storage resource" herein). The persistent storage resource 1170A-B main include any number of storage drives 1171A-F (also referred to as "storage devices" herein) and any number of non-volatile Random Access Memory ('NVRAM') devices (not shown).

In some implementations, the NVRAM devices of a persistent storage resource 1170A-B may be configured to receive, from the storage array controller 1110A-D, data to be stored in the storage drives 1171A-F. In some examples, the data may originate from computing devices 1164A-B. In some examples, writing data to the NVRAM device may be carried out more quickly than directly writing data to the storage drive 1171A-F. In implementations, the storage array controller 1110A-D may be configured to utilize the NVRAM devices as a quickly accessible buffer for data destined to be written to the storage drives 1171A-F. Latency for write requests using NVRAM devices as a buffer may be improved relative to a system in which a storage array controller 1110A-D writes data directly to the storage drives 1171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 1171A-F.

In implementations, storage drive 1171A-F may refer to any device configured to record data persistently, where "persistently" or "persistent" refers as to a device's ability to maintain recorded data after loss of power. In some implementations, storage drive 1171A-F may correspond to non-disk storage media. For example, the storage drive 1171A-F may be one or more solid-state drives ('SSDs'), flash memory based storage, any type of solid-state non-volatile memory, or any other type of non-mechanical storage device. In other implementations, storage drive 1171A-F may include mechanical or spinning hard disk, such as hard-disk drives ('HDD').

In some implementations, the storage array controllers 1110A-D may be configured for offloading device management responsibilities from storage drive 1171A-F in storage array 102A-B. For example, storage array controllers 1110A-D may manage control information that may describe the state of one or more memory blocks in the storage drives 1171A-F. The control information may indicate, for example, that a particular memory block has failed and should no longer be written to, that a particular memory block contains boot code for a storage array controller 1110A-D, the number of program-erase ('PIE') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 1171A-F may be stored in one or more particular memory blocks of the storage drives 1171A-F that are selected by the storage array controller 1110A-D. The selected memory blocks may be tagged with an identifier indicating that the selected memory block contains control information. The identifier may be utilized by the storage array controllers 1110A-D in conjunction with storage drives 1171A-F to quickly identify the memory blocks that contain control information. For example, the storage controllers 1110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 1171A-F.

In implementations, storage array controllers 1110A-D may offload device management responsibilities from storage drives 1171A-F of storage array 1102A-B by retrieving, from the storage drives 1171A-F, control information describing the state of one or more memory blocks in the storage drives 1171A-F. Retrieving the control information from the storage drives 1171A-F may be carried out, for example, by the storage array controller 1110A-D querying the storage drives 1171A-F for the location of control information for a particular storage drive 1171A-F. The storage drives 1171A-F may be configured to execute instructions that enable the storage drive 1171A-F to identify the location of the control information. The instructions may be executed by a controller (not shown) associated with or otherwise located on the storage drive 1171A-F and may cause the storage drive 1171A-F to scan a portion of each memory block to identify the memory blocks that store control information for the storage drives 1171A-F. The storage drives 1171A-F may respond by sending a response message to the storage array controller 1110A-D that includes the location of control information for the storage drive 1171A-F. Responsive to receiving the response message, storage array controllers 1110A-D may issue a request to read data stored at the address associated with the location of control information for the storage drives 1171A-F.

In other implementations, the storage array controllers 1110A-D may further offload device management responsibilities from storage drives 1171A-F by performing, in response to receiving the control information, a storage drive management operation. A storage drive management operation may include, for example, an operation that is typically performed by the storage drive 1171A-F (e.g., the controller (not shown) associated with a particular storage drive 1171A-F). A storage drive management operation may include, for example, ensuring that data is not written to failed memory blocks within the storage drive 1171A-F, ensuring that data is written to memory blocks within the storage drive 1171A-F in such a way that adequate wear leveling is achieved, and so forth.

In implementations, storage array 1102A-B may implement two or more storage array controllers 1110A-D. For example, storage array 1102A may include storage array controllers 1110A and storage array controllers 1110B. At a given instance, a single storage array controller 1110A-D (e.g., storage array controller 1110A) of a storage system 1100 may be designated with primary status (also referred to as "primary controller" herein), and other storage array controllers 1110A-D (e.g., storage array controller 1110A) may be designated with secondary status (also referred to as "secondary controller" herein). The primary controller may have particular rights, such as permission to alter data in persistent storage resource 1170A-B (e.g., writing data to persistent storage resource 1170A-B). At least some of the rights of the primary controller may supersede the rights of the secondary controller. For instance, the secondary controller may not have permission to alter data in persistent storage resource 1170A-B when the primary controller has the right. The status of storage array controllers 1110A-D may change. For example, storage array controller 1110A may be designated with secondary status, and storage array controller 1110B may be designated with primary status.

In some implementations, a primary controller, such as storage array controller 1110A, may serve as the primary controller for one or more storage arrays 1102A-B, and a second controller, such as storage array controller 1110B, may serve as the secondary controller for the one or more storage arrays 1102A-B. For example, storage array controller 1110A may be the primary controller for storage array 1102A and storage array 1102B, and storage array controller 1110B may be the secondary controller for storage array 1102A and 1102B. In some implementations, storage array controllers 1110C and 1110D (also referred to as "storage processing modules") may neither have primary or secondary status. Storage array controllers 1110C and 1110D, implemented as storage processing modules, may act as a communication interface between the primary and secondary controllers (e.g., storage array controllers 1110A and 1110B, respectively) and storage array 1102B. For example, storage array controller 1110A of storage array 1102A may send a write request, via SAN 1158, to storage array 1102B. The write request may be received by both storage array controllers 1110C and 1110D of storage array 1102B. Storage array controllers 1110C and 1110D facilitate the communication, e.g., send the write request to the appropriate storage drive 1171A-F. It may be noted that in some implementations storage processing modules may be used to increase the number of storage drives controlled by the primary and secondary controllers.

In implementations, storage array controllers 1110A-D are communicatively coupled, via a midplane (not shown), to one or more storage drives 1171A-F and to one or more NVRAM devices (not shown) that are included as part of a storage array 1102A-B. The storage array controllers 1110A-D may be coupled to the midplane via one or more data communication links and the midplane may be coupled to the storage drives 1171A-F and the NVRAM devices via one or more data communications links. The data communications links described herein are collectively illustrated by data communications links 1108A-D and may include a Peripheral Component Interconnect Express ('PCIe') bus, for example.

Figure 11B:
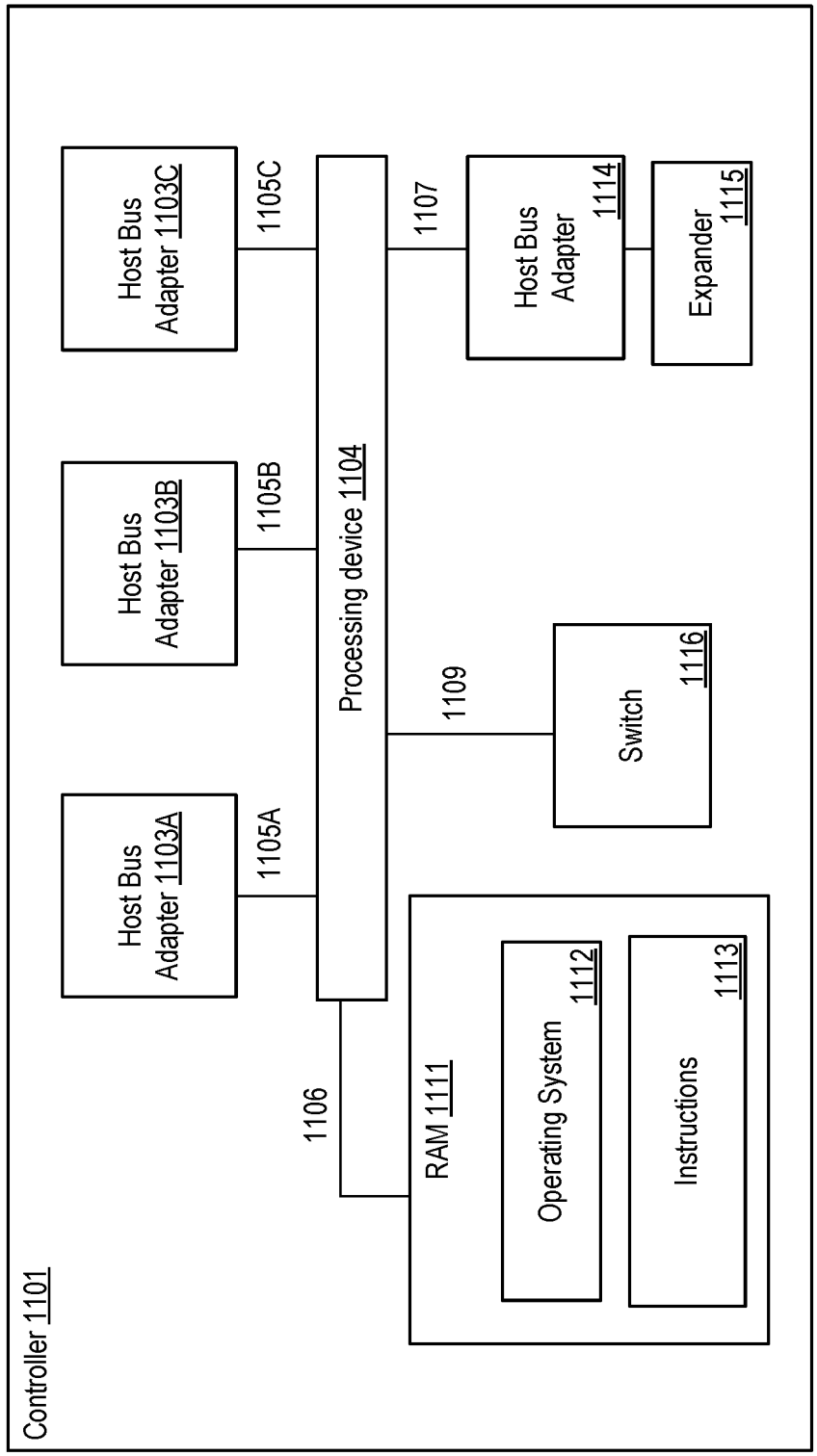
FIG. 11B illustrates a second example system for data storage in accordance with some implementations.

FIG. 11B illustrates an example system for data storage, in accordance with some implementations. Storage array controller 1101 illustrated in FIG. 11B may be similar to the storage array controllers 1110A-D described with respect to FIG. 11A. In one example, storage array controller 1101 may be similar to storage array controller 1110A or storage array controller 1110B. Storage array controller 1101 includes numerous elements for purposes of illustration rather than limitation. It may be noted that storage array controller 1101 may include the same, more, or fewer elements configured in the same or different manner in other implementations. It may be noted that elements of FIG. 11A may be included below to help illustrate features of storage array controller 1101.

Storage array controller 1101 may include one or more processing devices 1104 and random access memory ('RAM') 1111. Processing device 1104 (or controller 1101) represents one or more general-purpose processing devices such as a microprocessor, central processing unit, or the like. More particularly, the processing device 1104 (or controller 1101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 1104 (or controller 1101) may also be one or more special-purpose processing devices such as an ASIC, an FPGA, a digital signal processor ('DSP'), network processor, or the like.

The processing device 1104 may be connected to the RAM 1111 via a data communications link 1106, which may be embodied as a high speed memory bus such as a Double-Data Rate 4 ('DDR4') bus. Stored in RAM 1111 is an operating system 1112. In some implementations, instructions 1113 are stored in RAM 1111. Instructions 1113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 1101 includes one or more host bus adapters 1103A-C that are coupled to the processing device 1104 via a data communications link 1105A-C. In implementations, host bus adapters 1103A-C may be computer hardware that connects a host system (e.g., the storage array controller) to other network and storage arrays. In some examples, host bus adapters 1103A-C may be a Fibre Channel adapter that enables the storage array controller 1101 to connect to a SAN, an Ethernet adapter that enables the storage array controller 1101 to connect to a LAN, or the like. Host bus adapters 1103A-C may be coupled to the processing device 1104 via a data communications link 1105A-C such as, for example, a PCIe bus.

In implementations, storage array controller 1101 may include a host bus adapter 1114 that is coupled to an expander 1115. The expander 1115 may be used to attach a host system to a larger number of storage drives. The expander 1115 may, for example, be a SAS expander utilized to enable the host bus adapter 1114 to attach to storage drives in an implementation where the host bus adapter 1114 is embodied as a SAS controller.

In implementations, storage array controller 1101 may include a switch 1116 coupled to the processing device 1104 via a data communications link 1109. The switch 1116 may be a computer hardware device that can create multiple endpoints out of a single endpoint, thereby enabling multiple devices to share a single endpoint. The switch 1116 may, for example, be a PCIe switch that is coupled to a PCIe bus (e.g., data communications link 1109) and presents multiple PCIe connection points to the midplane.

In implementations, storage array controller 1101 includes a data communications link 107 for coupling the storage array controller 1101 to other storage array controllers. In some examples, data communications link 1107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 1171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 11C:
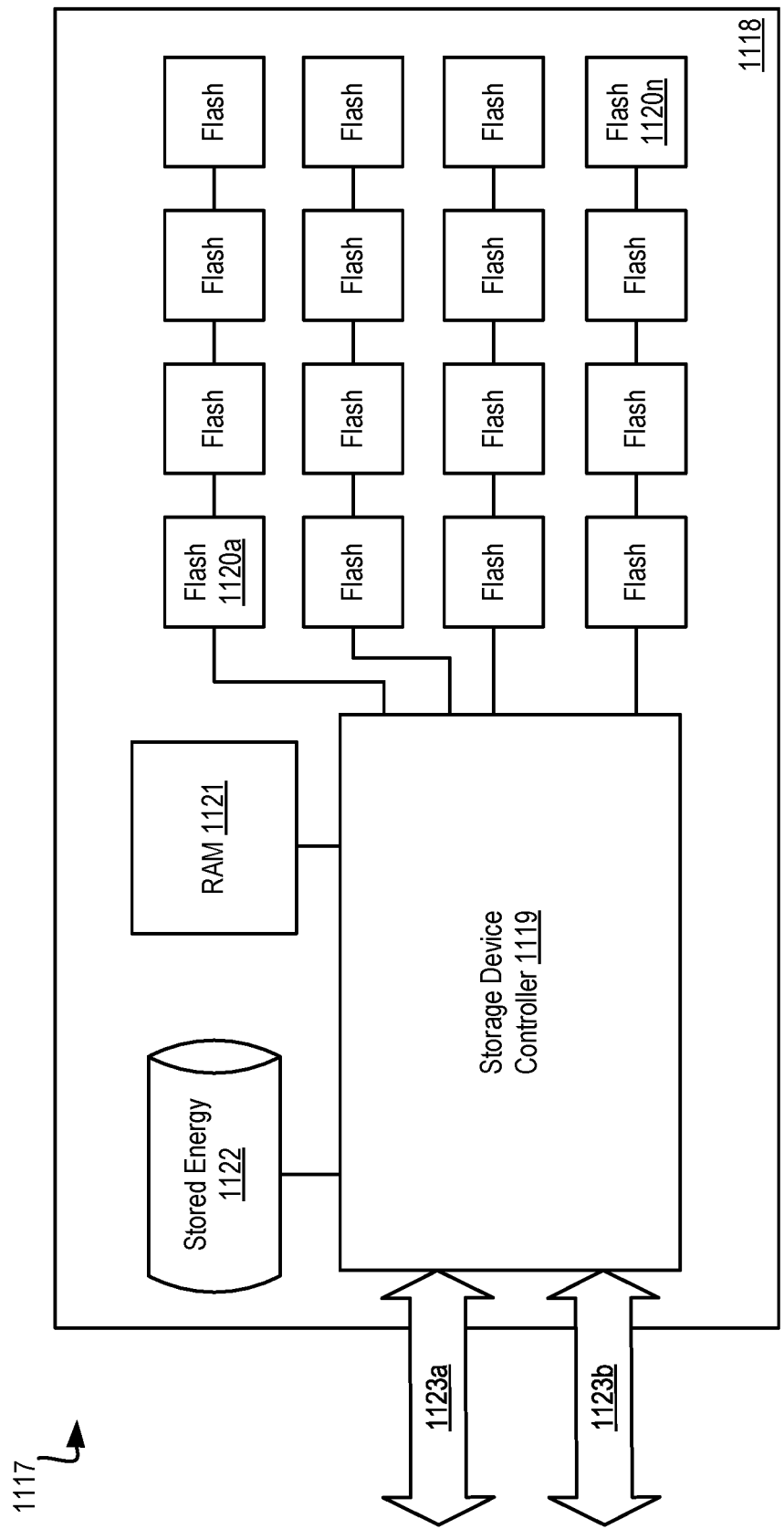
FIG. 11C illustrates a third example system for data storage in accordance with some implementations.

FIG. 11C illustrates a third example system 1117 for data storage in accordance with some implementations. System 1117 (also referred to as "storage system" herein) includes numerous elements for purposes of illustration rather than limitation. It may be noted that system 1117 may include the same, more, or fewer elements configured in the same or different manner in other implementations.

In one embodiment, system 1117 includes a dual Peripheral Component Interconnect ('PCI') flash storage device 1118 with separately addressable fast write storage. System 1117 may include a storage device controller 1119. In one embodiment, storage device controller 1119A-D may be a CPU, ASIC, FPGA, or any other circuitry that may implement control structures necessary according to the present disclosure. In one embodiment, system 1117 includes flash memory devices (e.g., including flash memory devices 1120a-n), operatively coupled to various channels of the storage device controller 1119. Flash memory devices 1120a-n, may be presented to the controller 1119A-D as an addressable collection of Flash pages, erase blocks, and/or control elements sufficient to allow the storage device controller 1119A-D to program and retrieve various aspects of the Flash. In one embodiment, storage device controller 1119A-D may perform operations on flash memory devices 1120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 1117 may include RAM 1121 to store separately addressable fast-write data. In one embodiment, RAM 1121 may be one or more separate discrete devices. In another embodiment, RAM 1121 may be integrated into storage device controller 1119A-D or multiple storage device controllers. The RAM 1121 may be utilized for other purposes as well, such as temporary program memory for a processing device (e.g., a CPU) in the storage device controller 1119.

In one embodiment, system 1117 may include a stored energy device 1122, such as a rechargeable battery or a capacitor. Stored energy device 1122 may store energy sufficient to power the storage device controller 1119, some amount of the RAM (e.g., RAM 1121), and some amount of Flash memory (e.g., Flash memory 1120a-1120n) for sufficient time to write the contents of RAM to Flash memory. In one embodiment, storage device controller 1119A-D may write the contents of RAM to Flash Memory if the storage device controller detects loss of external power.

In one embodiment, system 1117 includes two data communications links 1123a, 1123b. In one embodiment, data communications links 1123a, 1123b may be PCI interfaces. In another embodiment, data communications links 1123a, 1123b may be based on other communications standards (e.g., HyperTransport, InfiniBand, etc.). Data communications links 1123a, 1123b may be based on non-volatile memory express ('NVMe') or NVMe over fabrics ('NVMf') specifications that allow external connection to the storage device controller 1119A-D from other components in the storage system 1117. It should be noted that data communications links may be interchangeably referred to herein as PCI buses for convenience.

System 1117 may also include an external power source (not shown), which may be provided over one or both data communications links 1123*a*, 1123*b*, or which may be provided separately. An alternative embodiment includes a separate Flash memory (not shown) dedicated for use in storing the content of RAM 1121. The storage device controller 1119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 1121. On power failure, the storage device controller 1119A-D may write stored content associated with the addressable fast-write logical storage to Flash memory (e.g., Flash memory 1120*a-n*) for long-term persistent storage.

In one embodiment, the logical device may include some presentation of some or all of the content of the Flash memory devices 1120*a-n*, where that presentation allows a storage system including a storage device 1118 (e.g., storage system 1117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 1122 may be sufficient to ensure completion of in-progress operations to the Flash memory devices 1120*a*-120*n* stored energy device 1122 may power storage device controller 1119A-D and associated Flash memory devices (e.g., 1120*a-n*) for those operations, as well as for the storing of fast-write RAM to Flash memory. Stored energy device 1122 may be used to store accumulated statistics and other parameters kept and tracked by the Flash memory devices 1120*a-n* and/or the storage device controller 1119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 1122 to measure corresponding discharge characteristics, etc. If the available energy decreases over time, the effective available capacity of the addressable fast-write storage may be decreased to ensure that it can be written safely based on the currently available stored energy.

Figure 11D:
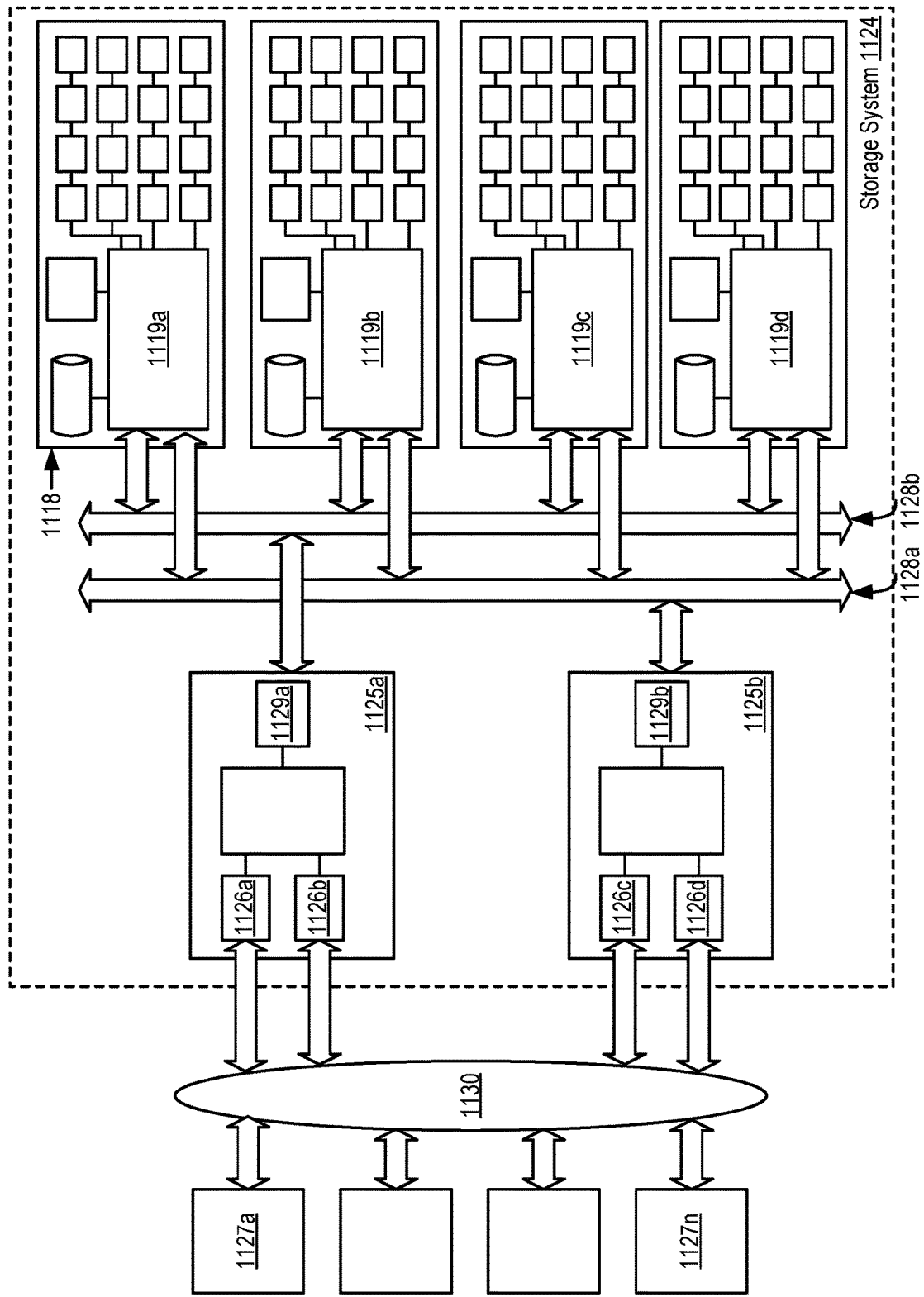
FIG. 11D illustrates a fourth example system for data storage in accordance with some implementations.

FIG. 11D illustrates a third example storage system 1124 for data storage in accordance with some implementations. In one embodiment, storage system 1124 includes storage controllers 1125*a*, 1125*b*. In one embodiment, storage controllers 1125*a*, 1125*b* are operatively coupled to Dual PCI storage devices. Storage controllers 1125*a*, 1125*b* may be operatively coupled (e.g., via a storage network 1130) to some number of host computers 1127*a-n*.

In one embodiment, two storage controllers (e.g., 1125*a* and 1125*b*) provide storage services, such as a SCS block storage array, a file server, an object server, a database or data analytics service, etc. The storage controllers 1125*a*, 1125*b* may provide services through some number of network interfaces (e.g., 1126*a-d*) to host computers 1127*a-n* outside of the storage system 1124. Storage controllers 1125*a*, 1125*b* may provide integrated services or an application entirely within the storage system 1124, forming a converged storage and compute system. The storage controllers 1125*a*, 1125*b* may utilize the fast write memory within or across storage devices 1119*a-d* to journal in progress operations to ensure the operations are not lost on a power failure, storage controller removal, storage controller or storage system shutdown, or some fault of one or more software or hardware components within the storage system 1124.

In one embodiment, storage controllers 1125*a*, 1125*b* operate as PCI masters to one or the other PCI buses 1128*a*, 1128*b*. In another embodiment, 1128*a* and 1128*b* may be based on other communications standards (e.g., Hyper-Transport, InfiniBand, etc.). Other storage system embodiments may operate storage controllers 1125*a*, 1125*b* as multi-masters for both PCI buses 1128*a*, 1128*b*. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 1119*a* may be operable under direction from a storage controller 1125*a* to synthesize and transfer data to be stored into Flash memory devices from data that has been stored in RAM (e.g., RAM 1121 of FIG. 11C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 1128*a*, 1128*b*) from the storage controllers 1125*a*, 1125*b*. In one embodiment, a recalculation may include compressing data, attaching indexing or other metadata, combining multiple data segments together, performing erasure code calculations, etc.

In one embodiment, under direction from a storage controller 1125*a*, 1125*b*, a storage device controller 1119*a*, 119*b* may be operable to calculate and transfer data to other storage devices from data stored in RAM (e.g., RAM 1121 of FIG. 11C) without involvement of the storage controllers 1125*a*, 1125*b*. This operation may be used to mirror data stored in one storage controller 1125*a* to another storage controller 1125*b*, or it could be used to offload compression, data aggregation, and/or erasure coding calculations and transfers to storage devices to reduce load on storage controllers or the storage controller interface 1129*a*, 1129*b* to the PCI bus 1128*a*, 1128*b*.

A storage device controller 1119A-D may include mechanisms for implementing high availability primitives for use by other parts of a storage system external to the Dual PCI storage device 1118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 1125*a*, 1125*b* may initiate the use of erase blocks within and across storage devices (e.g., 1118) in accordance with an age and expected remaining lifespan of the storage devices, or based on other statistics. The storage controllers 1125*a*, 1125*b* may initiate garbage collection and data migration data between storage devices in accordance with pages that are no longer needed as well as to manage Flash page and erase block lifespans and to manage overall system performance.

In one embodiment, the storage system 1124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 12A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 12A:
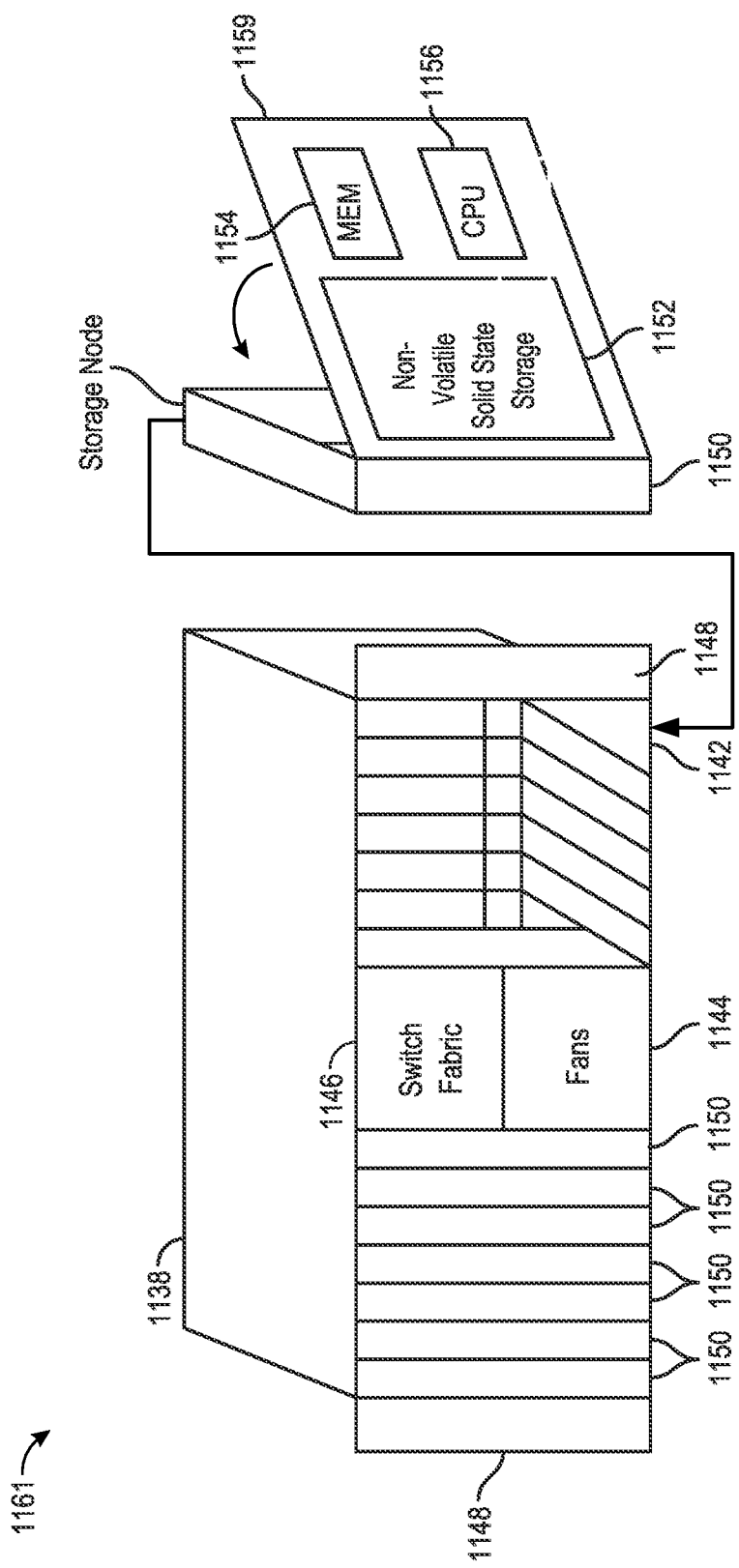
FIG. 12A is a perspective view of a storage cluster with multiple storage nodes and internal storage coupled to each storage node to provide network attached storage, in accordance with some embodiments.

FIG. 12A is a perspective view of a storage cluster 1161, with multiple storage nodes 1150 and internal solid-state memory coupled to each storage node to provide network attached storage or storage area network, in accordance with some embodiments. A network attached storage, storage area network, or a storage cluster, or other storage memory, could include one or more storage clusters 1161, each having one or more storage nodes 1150, in a flexible and reconfigurable arrangement of both the physical components and the amount of storage memory provided thereby. The storage cluster 1161 is designed to fit in a rack, and one or more racks can be set up and populated as desired for the storage memory. The storage cluster 1161 has a chassis 1138 having multiple slots 1142. It should be appreciated that chassis 1138 may be referred to as a housing, enclosure, or rack unit. In one embodiment, the chassis 1138 has fourteen slots 1142, although other numbers of slots are readily devised. For example, some embodiments have four slots, eight slots, sixteen slots, thirty-two slots, or other suitable number of slots. Each slot 1142 can accommodate one storage node 1150 in some embodiments. Chassis 1138 includes flaps 1148 that can be utilized to mount the chassis 1138 on a rack. Fans 144 provide air circulation for cooling of the storage nodes 1150 and components thereof, although other cooling components could be used, or an embodiment could be devised without cooling components. A switch fabric 1146 couples storage nodes 1150 within chassis 1138 together and to a network for communication to the memory. In an embodiment depicted in herein, the slots 1142 to the left of the switch fabric 1146 and fans 1144 are shown occupied by storage nodes 1150, while the slots 1142 to the right of the switch fabric 1146 and fans 1144 are empty and available for insertion of storage node 1150 for illustrative purposes. This configuration is one example, and one or more storage nodes 1150 could occupy the slots 1142 in various further arrangements. The storage node arrangements need not be sequential or adjacent in some embodiments. Storage nodes 1150 are hot pluggable, meaning that a storage node 1150 can be inserted into a slot 1142 in the chassis 1138, or removed from a slot 1142, without stopping or powering down the system. Upon insertion or removal of storage node 1150 from slot 1142, the system automatically reconfigures in order to recognize and adapt to the change. Reconfiguration, in some embodiments, includes restoring redundancy and/or rebalancing data or load.

Each storage node 1150 can have multiple components. In the embodiment shown here, the storage node 1150 includes a printed circuit board 1159 populated by a CPU 1156, i.e., processor, a memory 1154 coupled to the CPU 1156, and a non-volatile solid state storage 1152 coupled to the CPU 1156, although other mountings and/or components could be used in further embodiments. The memory 1154 has instructions which are executed by the CPU 1156 and/or data operated on by the CPU 1156. As further explained below, the non-volatile solid state storage 1152 includes flash or, in further embodiments, other types of solid-state memory.

Referring to FIG. 12A, storage cluster 1161 is scalable, meaning that storage capacity with non-uniform storage sizes is readily added, as described above. One or more storage nodes 1150 can be plugged into or removed from each chassis and the storage cluster self-configures in some embodiments. Plug-in storage nodes 1150, whether installed in a chassis as delivered or later added, can have different sizes. For example, in one embodiment a storage node 1150 can have any multiple of 4 TB, e.g., 8 TB, 12 TB, 16 TB, 32 TB, etc. In further embodiments, a storage node 1150 could have any multiple of other storage amounts or capacities. Storage capacity of each storage node 1150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 1152 units or storage nodes 1150 within the chassis.

Figure 12B:
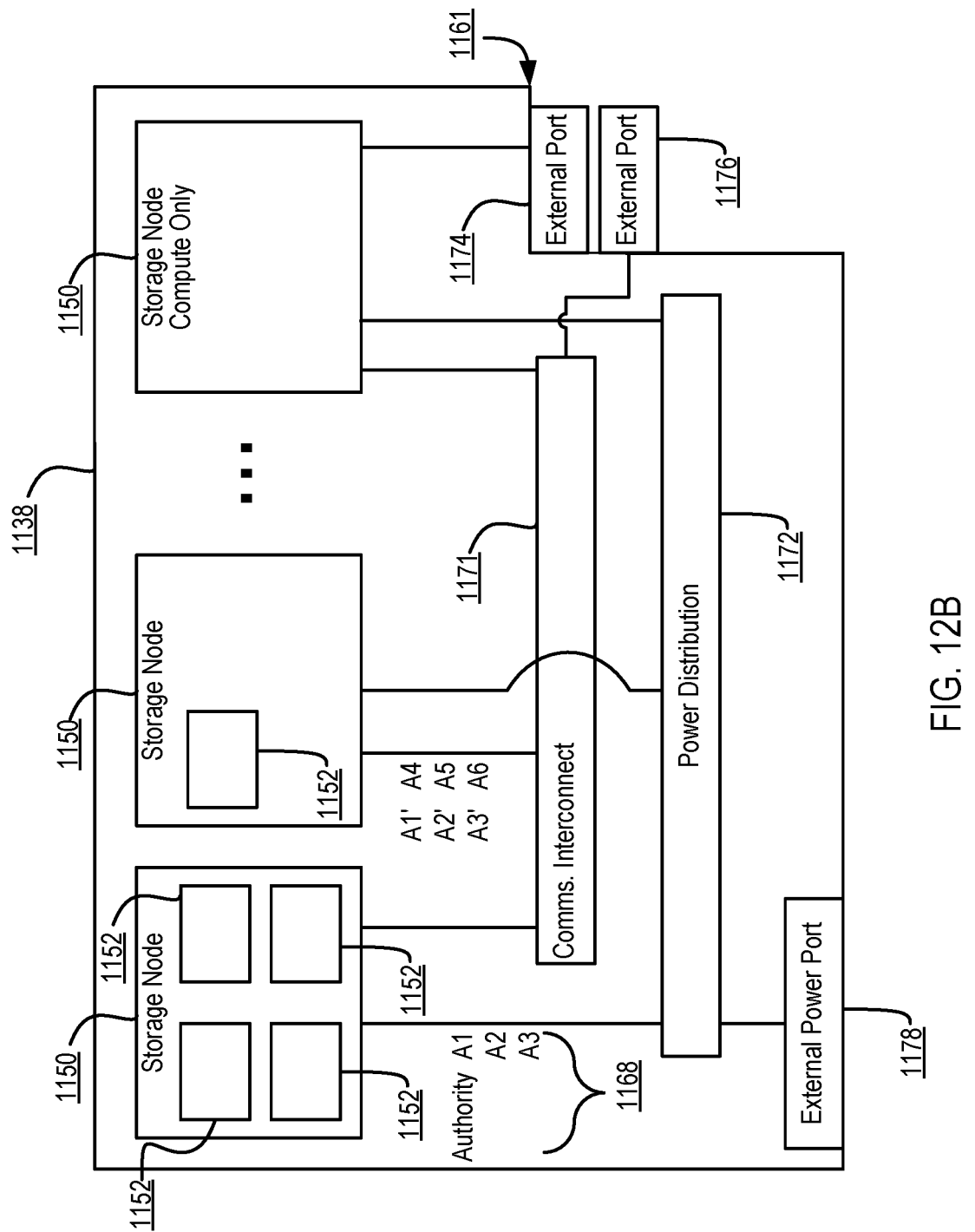
FIG. 12B is a block diagram showing an interconnect switch coupling multiple storage nodes in accordance with some embodiments.

FIG. 12B is a block diagram showing a communications interconnect 1173 and power distribution bus 1172 coupling multiple storage nodes 1150. Referring back to FIG. 12A, the communications interconnect 1173 can be included in or implemented with the switch fabric 1146 in some embodiments. Where multiple storage clusters 1161 occupy a rack, the communications interconnect 1173 can be included in or implemented with a top of rack switch, in some embodiments. As illustrated in FIG. 12B, storage cluster 1161 is enclosed within a single chassis 1138. External port 1176 is coupled to storage nodes 1150 through communications interconnect 1173, while external port 1174 is coupled directly to a storage node. External power port 1178 is coupled to power distribution bus 1172. Storage nodes 1150 may include varying amounts and differing capacities of non-volatile solid state storage 1152 as described with reference to FIG. 12A. In addition, one or more storage nodes 1150 may be a compute only storage node as illustrated in FIG. 12B. Authorities 1168 are implemented on the non-volatile solid state storage 1152, for example as lists or other data structures stored in memory. In some embodiments the authorities are stored within the non-volatile solid state storage 1152 and supported by software executing on a controller or other processor of the non-volatile solid state storage 1152. In a further embodiment, authorities 1168 are implemented on the storage nodes 1150, for example as lists or other data structures stored in the memory 1154 and supported by software executing on the CPU 1156 of the storage node 1150. Authorities 1168 control how and where data is stored in the non-volatile solid state storage 1152 in some embodiments. This control assists in determining which type of erasure coding scheme is applied to the data, and which storage nodes 1150 have which portions of the data. Each authority 1168 may be assigned to a non-volatile solid state storage 1152. Each authority may control a range of inode numbers, segment numbers, or other data identifiers which are assigned to data by a file system, by the storage nodes 1150, or by the non-volatile solid state storage 1152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 1168. Authorities 1168 have a relationship to storage nodes 1150 and non-volatile solid state storage 1152 in some embodiments. Each authority 1168, covering a range of data segment numbers or other identifiers of the data, may be assigned to a specific non-volatile solid state storage 1152. In some embodiments the authorities 1168 for all of such ranges are distributed over the non-volatile solid state storage 1152 of a storage cluster. Each storage node 1150 has a network port that provides access to the non-volatile solid state storage(s) 1152 of that storage node 1150. Data can be stored in a segment, which is associated with a segment number and that segment number is an indirection for a configuration of a RAID (redundant array of independent disks) stripe in some embodiments. The assignment and use of the authorities 1168 thus establishes an indirection to data. Indirection may be referred to as the ability to reference data indirectly, in this case via an authority 1168, in accordance with some embodiments. A segment identifies a set of non-volatile solid state storage 1152 and a local identifier into the set of non-volatile solid state storage 1152 that may contain data. In some embodiments, the local identifier is an offset into the device and may be reused sequentially by multiple segments. In other embodiments the local identifier is unique for a specific segment and never reused. The offsets in the non-volatile solid state storage 1152 are applied to locating data for writing to or reading from the non-volatile solid state storage 1152 (in the form of a RAID stripe). Data is striped across multiple units of non-volatile solid state storage 1152, which may include or be different from the non-volatile solid state storage 1152 having the authority 1168 for a particular data segment.

If there is a change in where a particular segment of data is located, e.g., during a data move or a data reconstruction, the authority 1168 for that data segment should be consulted, at that non-volatile solid state storage 1152 or storage node 1150 having that authority 1168. In order to locate a particular piece of data, embodiments calculate a hash value for a data segment or apply an inode number or a data segment number. The output of this operation points to a non-volatile solid state storage 1152 having the authority 1168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 1152, which may be done through an explicit mapping. The operation is repeatable, so that when the calculation is performed, the result of the calculation repeatably and reliably points to a particular non-volatile solid state storage 1152 having that authority 1168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 1152 for an authority in the presence of a set of non-volatile solid state storage 1152 that are reachable and constitute the same cluster. The calculation also determines an ordered set of peer non-volatile solid state storage 1152 that will also record the authority to non-volatile solid state storage mapping so that the authority may be determined even if the assigned non-volatile solid state storage is unreachable. A duplicate or substitute authority 1168 may be consulted if a specific authority 1168 is unavailable in some embodiments.

With reference to FIGS. 12A and 12B, two of the many tasks of the CPU 1156 on a storage node 1150 are to break up write data, and reassemble read data. When the system has determined that data is to be written, the authority 1168 for that data is located as above. When the segment ID for data is already determined the request to write is forwarded to the non-volatile solid state storage 1152 currently determined to be the host of the authority 1168 determined from the segment. The host CPU 1156 of the storage node 1150, on which the non-volatile solid state storage 1152 and corresponding authority 1168 reside, then breaks up or shards the data and transmits the data out to various non-volatile solid state storage 1152. The transmitted data is written as a data stripe in accordance with an erasure coding scheme. In some embodiments, data is requested to be pulled, and in other embodiments, data is pushed. In reverse, when data is read, the authority 1168 for the segment ID containing the data is located as described above. The host CPU 1156 of the storage node 1150 on which the non-volatile solid state storage 1152 and corresponding authority 1168 reside requests the data from the non-volatile solid state storage and corresponding storage nodes pointed to by the authority. In some embodiments the data is read from flash storage as a data stripe. The host CPU 1156 of storage node 1150 then reassembles the read data, correcting any errors (if present) according to the appropriate erasure coding scheme, and forwards the reassembled data to the network. In further embodiments, some or all of these tasks can be handled in the non-volatile solid state storage 1152. In some embodiments, the segment host requests the data be sent to storage node 1150 by requesting pages from storage and then sending the data to the storage node making the original request.

In embodiments, authorities 1168 operate to determine how operations will proceed against particular logical elements. Each of the logical elements may be operated on through a particular authority across a plurality of storage controllers of a storage system. The authorities 1168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 1168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 1152 coupled to the host CPUs 1156 (See FIGS. 12E and 12G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 1152 unit may be assigned a range of address space. Within this assigned range, the non-volatile solid state storage 1152 is able to allocate addresses without synchronization with other non-volatile solid state storage 1152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 12C:
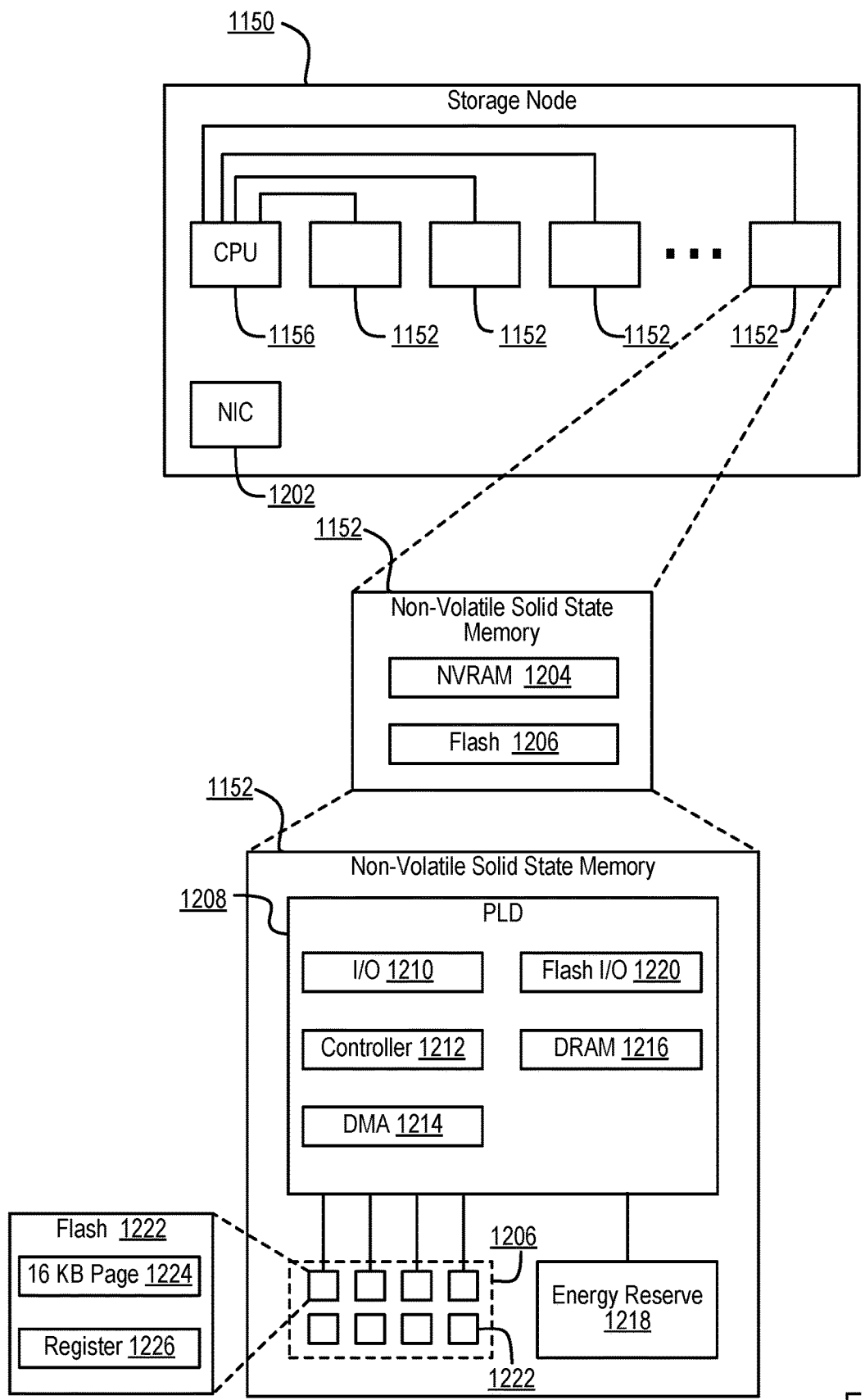
FIG. 12C is a multiple level block diagram, showing contents of a storage node and contents of one of the non-volatile solid state storage units in accordance with some embodiments.

FIG. 12C is a multiple level block diagram, showing contents of a storage node 1150 and contents of a non-volatile solid state storage 1152 of the storage node 1150. Data is communicated to and from the storage node 1150 by a network interface controller ('NIC') 1202 in some embodiments. Each storage node 1150 has a CPU 1156, and one or more non-volatile solid state storage 1152, as discussed above. Moving down one level in FIG. 12C, each non-volatile solid state storage 1152 has a relatively fast non-volatile solid state memory, such as nonvolatile random access memory ('NVRAM') 1204, and flash memory 1206. In some embodiments, NVRAM 1204 may be a component that does not require program/erase cycles (DRAM, MRAM, PCM), and can be a memory that can support being written vastly more often than the memory is read from. Moving down another level in FIG. 12C, the NVRAM 1204 is implemented in one embodiment as high speed volatile memory, such as dynamic random access memory (DRAM) 1216, backed up by energy reserve 1218. Energy reserve 1218 provides sufficient electrical power to keep the DRAM 1216 powered long enough for contents to be transferred to the flash memory 1206 in the event of power failure. In some embodiments, energy reserve 1218 is a capacitor, supercapacitor, battery, or other device, that supplies a suitable supply of energy sufficient to enable the transfer of the contents of DRAM 1216 to a stable storage medium in the case of power loss. The flash memory 1206 is implemented as multiple flash dies 1222, which may be referred to as packages of flash dies 1222 or an array of flash dies 1222. It should be appreciated that the flash dies 1222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 1152 has a controller 1212 or other processor, and an input output (I/O) port 1210 coupled to the controller 1212. I/O port 1210 is coupled to the CPU 1156 and/or the network interface controller 1202 of the flash storage node 1150. Flash input output (I/O) port 1220 is coupled to the flash dies 1222, and a direct memory access unit (DMA) 1214 is coupled to the controller 1212, the DRAM 1216 and the flash dies 1222. In the embodiment shown, the I/O port 1210, controller 1212, DMA unit 1214 and flash I/O port 1220 are implemented on a programmable logic device ('PLD') 1208, e.g., an FPGA. In this embodiment, each flash die 1222 has pages, organized as sixteen kB (kilobyte) pages 1224, and a register 1226 through which data can be written to or read from the flash die 1222. In further embodiments, other types of solid-state memory are used in place of, or in addition to flash memory illustrated within flash die 1222.

Storage clusters 1161, in various embodiments as disclosed herein, can be contrasted with storage arrays in general. The storage nodes 1150 are part of a collection that creates the storage cluster 1161. Each storage node 1150 owns a slice of data and computing required to provide the data. Multiple storage nodes 1150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 1152 units described herein have multiple interfaces active simultaneously and serving multiple purposes. In some embodiments, some of the functionality of a storage node 1150 is shifted into a storage unit 1152, transforming the storage unit 1152 into a combination of storage unit 1152 and storage node 1150. Placing computing (relative to storage data) into the storage unit 1152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 1161, as described herein, multiple controllers in multiple non-volatile sold state storage 1152 units and/or storage nodes 1150 cooperate in various ways (e.g., for erasure coding, data sharding, metadata communication and redundancy, storage capacity expansion or contraction, data recovery, and so on).

Figure 12D:
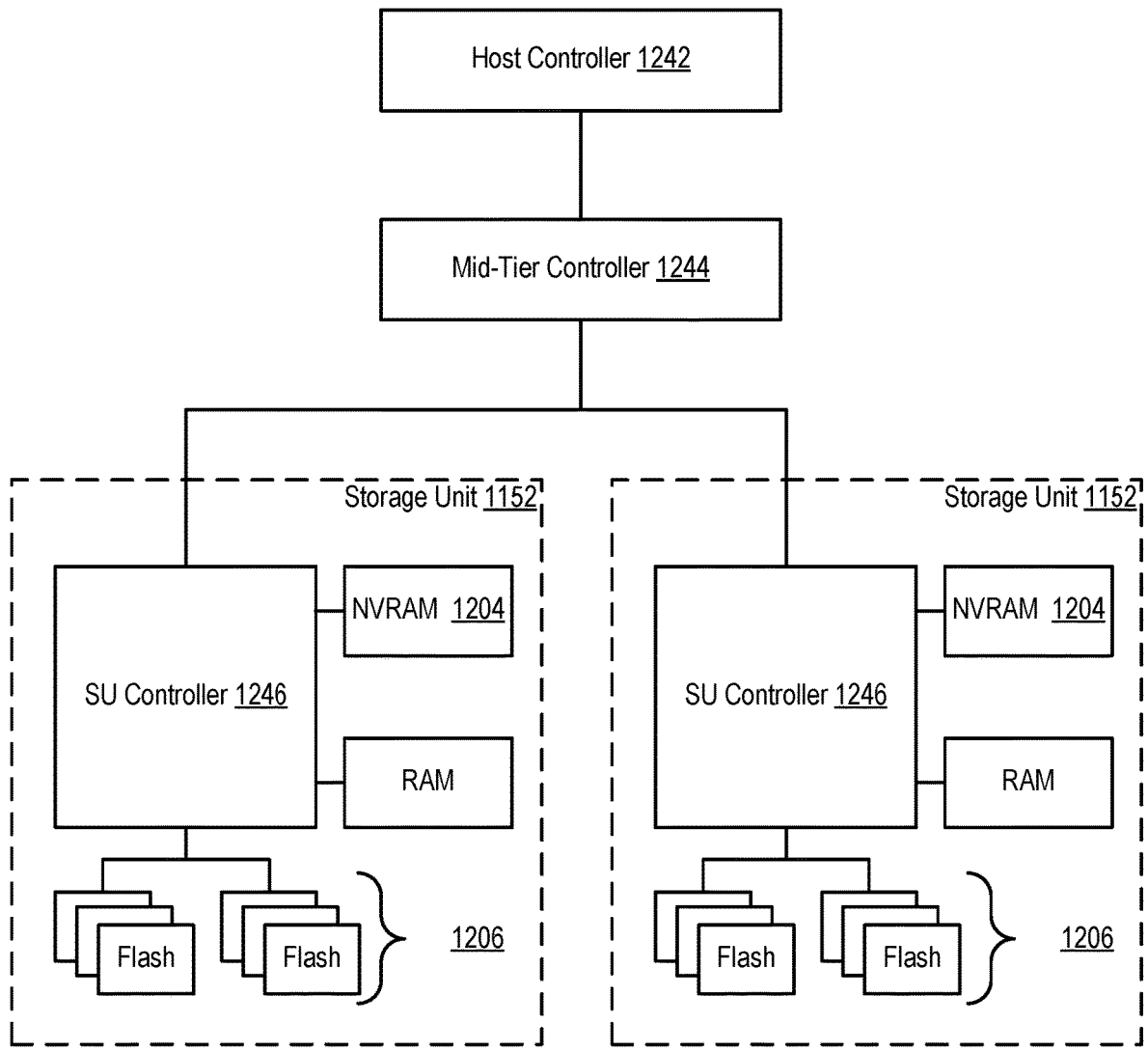
FIG. 12D shows a storage server environment, which uses embodiments of the storage nodes and storage units of some previous figures in accordance with some embodiments.

FIG. 12D shows a storage server environment, which uses embodiments of the storage nodes 1150 and storage 1152 units of FIGS. 12A-C. In this version, each non-volatile solid state storage 1152 unit has a processor such as controller 1212 (see FIG. 12C), an FPGA, flash memory 1206, and NVRAM 1204 (which is super-capacitor backed DRAM 1216, see FIGS. 12B and 12C) on a PCIe (peripheral component interconnect express) board in a chassis 1138 (see FIG. 12A). The non-volatile solid state storage 1152 unit may be implemented as a single board containing storage, and may be the largest tolerable failure domain inside the chassis. In some embodiments, up to two non-volatile solid state storage 1152 units may fail and the device will continue with no data loss.

The physical storage is divided into named regions based on application usage in some embodiments. The NVRAM 1204 is a contiguous block of reserved memory in the non-volatile solid state storage 1152 DRAM 1216, and is backed by NAND flash. NVRAM 1204 is logically divided into multiple memory regions written for two as spool (e.g., spool region). Space within the NVRAM 1204 spools is managed by each authority 1168 independently. Each device provides an amount of storage space to each authority 1168. That authority 1168 further manages lifetimes and allocations within that space. Examples of a spool include distributed transactions or notions. When the primary power to a non-volatile solid state storage 1152 unit fails, onboard super-capacitors provide a short duration of power hold up. During this holdup interval, the contents of the NVRAM 1204 are flushed to flash memory 1206. On the next power-on, the contents of the NVRAM 1204 are recovered from the flash memory 1206.

As for the storage unit controller, the responsibility of the logical "controller" is distributed across each of the blades containing authorities 1168. This distribution of logical control is shown in FIG. 12D as a host controller 1242, mid-tier controller 1244 and storage unit controller(s) 1246. Management of the control plane and the storage plane are treated independently, although parts may be physically co-located on the same blade. Each authority 1168 effectively serves as an independent controller. Each authority 1168 provides its own data and metadata structures, its own background workers, and maintains its own lifecycle.

FIG. 12E is a blade 1252 hardware block diagram, showing a control plane 1254, compute and storage planes 1256, 1258, and authorities 1168 interacting with underlying physical resources, using embodiments of the storage nodes 1150 and storage units 1152 of FIGS. 12A-C in the storage server environment of FIG. 12D. The control plane 1254 is partitioned into a number of authorities 1168 which can use the compute resources in the compute plane 1256 to run on any of the blades 1252. The storage plane 1258 is partitioned into a set of devices, each of which provides access to flash 1206 and NVRAM 1204 resources. In one embodiment, the compute plane 1256 may perform the operations of a storage array controller, as described herein, on one or more devices of the storage plane 1258 (e.g., a storage array).

In the compute and storage planes 1256, 258 of FIG. 12E, the authorities 1168 interact with the underlying physical resources (i.e., devices). From the point of view of an authority 1168, its resources are striped over all of the physical devices. From the point of view of a device, it provides resources to all authorities 1168, irrespective of where the authorities happen to run. Each authority 1168 has allocated or has been allocated one or more partitions 1260 of storage memory in the storage units 1152, e.g., partitions 1260 in flash memory 1206 and NVRAM 1204. Each authority 1168 uses those allocated partitions 1260 that belong to it, for writing or reading user data. Authorities can be associated with differing amounts of physical storage of the system. For example, one authority 1168 could have a larger number of partitions 1260 or larger sized partitions 1260 in one or more storage units 1152 than one or more other authorities 1168.

Figure 12F:
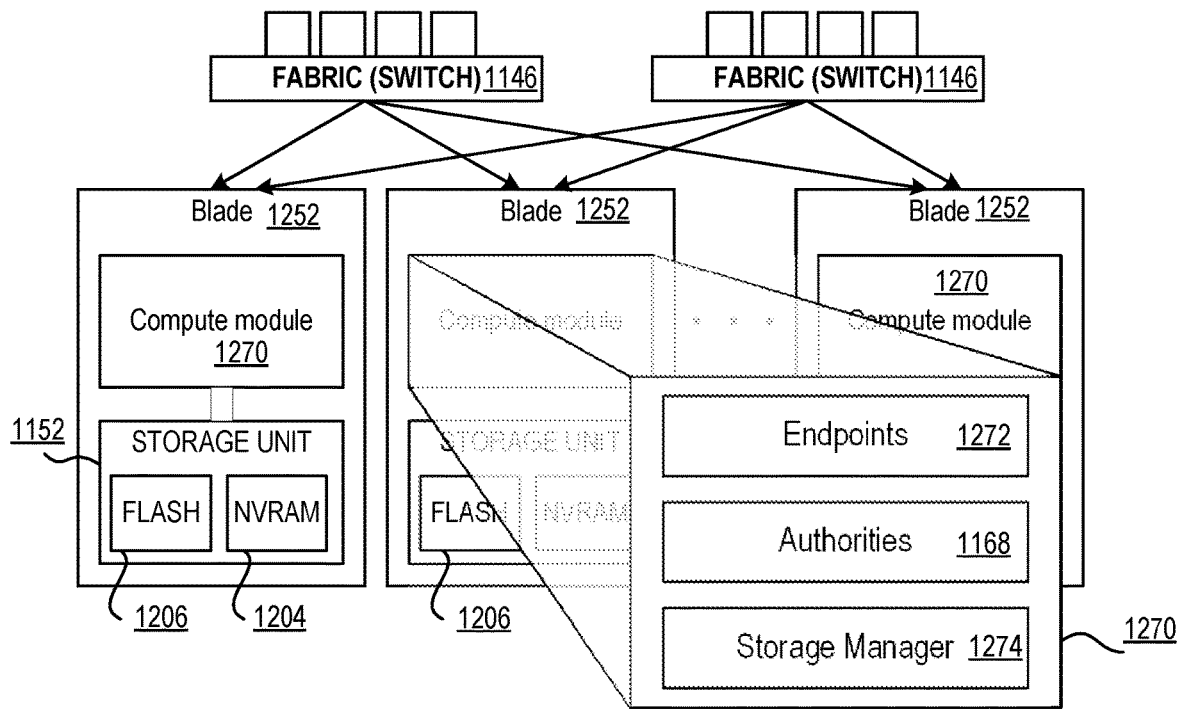
FIG. 12F depicts elasticity software layers in blades of a storage cluster, in accordance with some embodiments.

FIG. 12F depicts elasticity software layers in blades 1252 of a storage cluster, in accordance with some embodiments. In the elasticity structure, elasticity software is symmetric, i.e., each blade's compute module 1270 runs the three identical layers of processes depicted in FIG. 12F. Storage managers 1274 execute read and write requests from other blades 1252 for data and metadata stored in local storage unit 1152 NVRAM 1204 and flash 1206. Authorities 1168 fulfill client requests by issuing the necessary reads and writes to the blades 1252 on whose storage units 1152 the corresponding data or metadata resides. Endpoints 1272 parse client connection requests received from switch fabric 1146 supervisory software, relay the client connection requests to the authorities 1168 responsible for fulfillment, and relay the authorities' 1168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 12F, authorities 1168 running in the compute modules 1270 of a blade 1252 perform the internal operations required to fulfill client requests. One feature of elasticity is that authorities 1168 are stateless, i.e., they cache active data and metadata in their own blades' 1252 DRAMs for fast access, but the authorities store every update in their NVRAM 1204 partitions on three separate blades 1252 until the update has been written to flash 1206. All the storage system writes to NVRAM 1204 are in triplicate to partitions on three separate blades 1252 in some embodiments. With triple-mirrored NVRAM 1204 and persistent storage protected by parity and Reed-Solomon RAID checksums, the storage system can survive concurrent failure of two blades 1252 with no loss of data, metadata, or access to either.

Because authorities 1168 are stateless, they can migrate between blades 1252. Each authority 1168 has a unique identifier. NVRAM 1204 and flash 1206 partitions are associated with authorities' 1168 identifiers, not with the blades 1252 on which they are running in some. Thus, when an authority 1168 migrates, the authority 1168 continues to manage the same storage partitions from its new location. When a new blade 1252 is installed in an embodiment of the storage cluster, the system automatically rebalances load by: partitioning the new blade's 1252 storage for use by the system's authorities 1168, migrating selected authorities 1168 to the new blade 1252, starting endpoints 272 on the new blade 1252 and including them in the switch fabric's 1146 client connection distribution algorithm.

From their new locations, migrated authorities 1168 persist the contents of their NVRAM 1204 partitions on flash 1206, process read and write requests from other authorities 1168, and fulfill the client requests that endpoints 1272 direct to them. Similarly, if a blade 1252 fails or is removed, the system redistributes its authorities 1168 among the system's remaining blades 1252. The redistributed authorities 1168 continue to perform their original functions from their new locations.

Figure 12G:
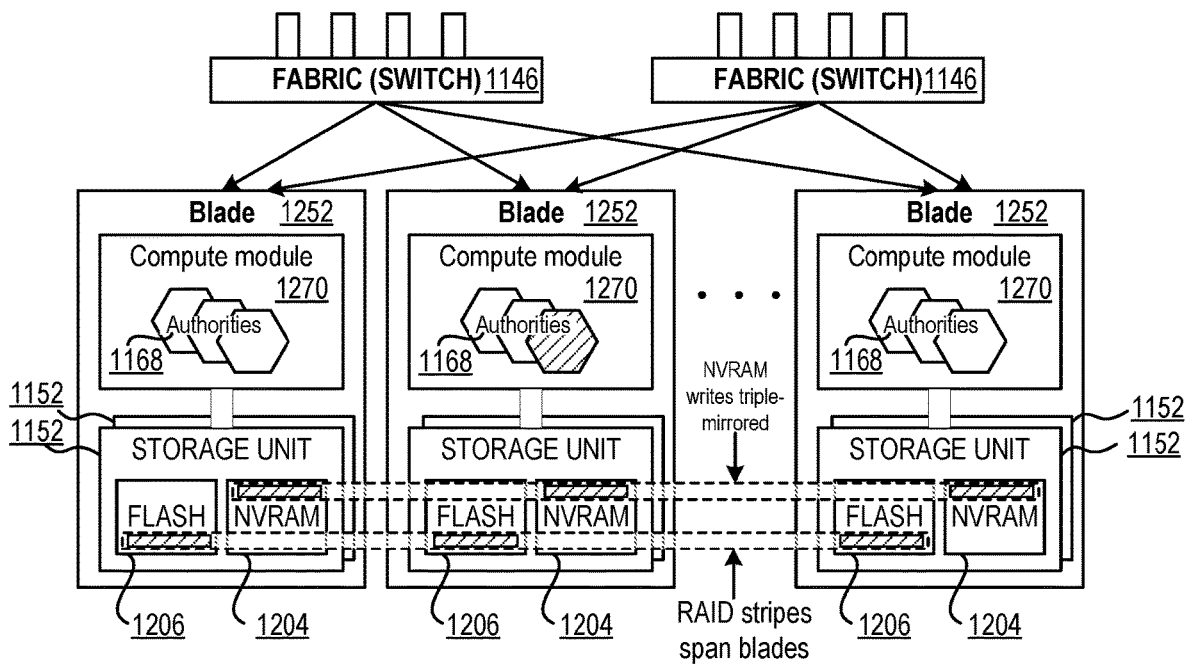
FIG. 12G depicts authorities and storage resources in blades of a storage cluster, in accordance with some embodiments.

FIG. 12G depicts authorities 1168 and storage resources in blades 1252 of a storage cluster, in accordance with some embodiments. Each authority 1168 is exclusively responsible for a partition of the flash 1206 and NVRAM 1204 on each blade 1252. The authority 1168 manages the content and integrity of its partitions independently of other authorities 1168. Authorities 1168 compress incoming data and preserve it temporarily in their NVRAM 1204 partitions, and then consolidate, RAID-protect, and persist the data in segments of the storage in their flash 1206 partitions. As the authorities 1168 write data to flash 1206, storage managers 1274 perform the necessary flash translation to optimize write performance and maximize media longevity. In the background, authorities 1168 "garbage collect," or reclaim space occupied by data that clients have made obsolete by overwriting the data. It should be appreciated that since authorities' 1168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 13A:
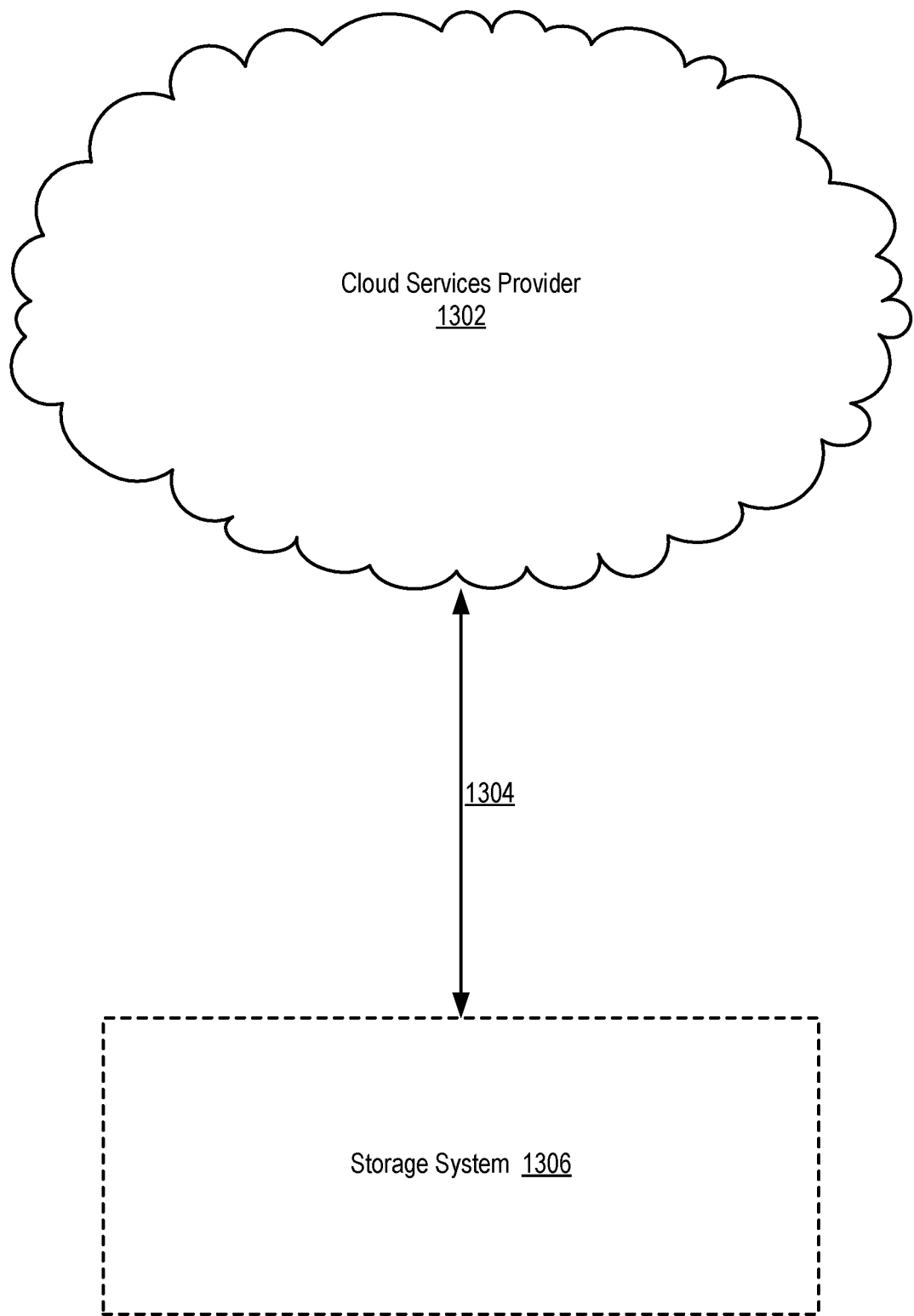
FIG. 13A sets forth a diagram of a storage system that is coupled for data communications with a cloud services provider in accordance with some embodiments of the present disclosure.

FIG. 13A sets forth a diagram of a storage system 1306 that is coupled for data communications with a cloud services provider 1302 in accordance with some embodiments of the present disclosure. Although depicted in less detail, the storage system 1306 depicted in FIG. 13A may be similar to the storage systems described above with reference to FIGS. 11A-11D and FIGS. 12A-12G. In some embodiments, the storage system 1306 depicted in FIG. 13A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 13A, the storage system 1306 is coupled to the cloud services provider 1302 via a data communications link 1304. The data communications link 1304 may be embodied as a dedicated data communications link, as a data communications pathway that is provided through the use of one or data communications networks such as a wide area network ('WAN') or LAN, or as some other mechanism capable of transporting digital information between the storage system 1306 and the cloud services provider 1302. Such a data communications link 1304 may be fully wired, fully wireless, or some aggregation of wired and wireless data communications pathways. In such an example, digital information may be exchanged between the storage system 1306 and the cloud services provider 1302 via the data communications link 1304 using one or more data communications protocols. For example, digital information may be exchanged between the storage system 1306 and the cloud services provider 1302 via the data communications link 1304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 1302 depicted in FIG. 13A may be embodied, for example, as a system and computing environment that provides a vast array of services to users of the cloud services provider 1302 through the sharing of computing resources via the data communications link 1304. The cloud services provider 1302 may provide on-demand access to a shared pool of configurable computing resources such as computer networks, servers, storage, applications and services, and so on. The shared pool of configurable resources may be rapidly provisioned and released to a user of the cloud services provider 1302 with minimal management effort. Generally, the user of the cloud services provider 1302 is unaware of the exact computing resources utilized by the cloud services provider 1302 to provide the services. Although in many cases such a cloud services provider 1302 may be accessible via the Internet, readers of skill in the art will recognize that any system that abstracts the use of shared resources to provide services to a user through any data communications link may be considered a cloud services provider 1302.

In the example depicted in FIG. 13A, the cloud services provider 1302 may be configured to provide a variety of services to the storage system 1306 and users of the storage system 1306 through the implementation of various service models. For example, the cloud services provider 1302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 1302 offers access to its storage infrastructure for use by the storage system 1306 and users of the storage system 1306, and so on. Readers will appreciate that the cloud services provider 1302 may be configured to provide additional services to the storage system 1306 and users of the storage system 1306 through the implementation of additional service models, as the service models described above are included only for explanatory purposes and in no way represent a limitation of the services that may be offered by the cloud services provider 1302 or a limitation as to the service models that may be implemented by the cloud services provider 1302.

In the example depicted in FIG. 13A, the cloud services provider 1302 may be embodied, for example, as a private cloud, as a public cloud, or as a combination of a private cloud and public cloud. In an embodiment in which the cloud services provider 1302 is embodied as a private cloud, the cloud services provider 1302 may be dedicated to providing services to a single organization rather than providing services to multiple organizations. In an embodiment where the cloud services provider 1302 is embodied as a public cloud, the cloud services provider 1302 may provide services to multiple organizations. In still alternative embodiments, the cloud services provider 1302 may be embodied as a mix of a private and public cloud services with a hybrid cloud deployment.

Although not explicitly depicted in FIG. 13A, readers will appreciate that a vast amount of additional hardware components and additional software components may be necessary to facilitate the delivery of cloud services to the storage system 1306 and users of the storage system 1306. For example, the storage system 1306 may be coupled to (or even include) a cloud storage gateway. Such a cloud storage gateway may be embodied, for example, as hardware-based or software-based appliance that is located on premise with the storage system 1306. Such a cloud storage gateway may operate as a bridge between local applications that are executing on the storage system 1306 and remote, cloud-based storage that is utilized by the storage system 1306. Through the use of a cloud storage gateway, organizations may move primary iSCSI or NAS to the cloud services provider 1302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 1302.

In order to enable the storage system 1306 and users of the storage system 1306 to make use of the services provided by the cloud services provider 1302, a cloud migration process may take place during which data, applications, or other elements from an organization's local systems (or even from another cloud environment) are moved to the cloud services provider 1302. In order to successfully migrate data, applications, or other elements to the cloud services provider's 1302 environment, middleware such as a cloud migration tool may be utilized to bridge gaps between the cloud services provider's 1302 environment and an organization's environment. Such cloud migration tools may also be configured to address potentially high network costs and long transfer times associated with migrating large volumes of data to the cloud services provider 1302, as well as addressing security concerns associated with sensitive data to the cloud services provider 1302 over data communications networks. In order to further enable the storage system 1306 and users of the storage system 1306 to make use of the services provided by the cloud services provider 1302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 13A, and as described briefly above, the cloud services provider 1302 may be configured to provide services to the storage system 1306 and users of the storage system 1306 through the usage of a SaaS service model, eliminating the need to install and run the application on local computers, which may simplify maintenance and support of the application. Such applications may take many forms in accordance with various embodiments of the present disclosure. For example, the cloud services provider 1302 may be configured to provide access to data analytics applications to the storage system 1306 and users of the storage system 1306. Such data analytics applications may be configured, for example, to receive vast amounts of telemetry data phoned home by the storage system 1306. Such telemetry data may describe various operating characteristics of the storage system 1306 and may be analyzed for a vast array of purposes including, for example, to determine the health of the storage system 1306, to identify workloads that are executing on the storage system 1306, to predict when the storage system 1306 will run out of various resources, to recommend configuration changes, hardware or software upgrades, workflow migrations, or other actions that may improve the operation of the storage system 1306.

The cloud services provider 1302 may also be configured to provide access to virtualized computing environments to the storage system 1306 and users of the storage system 1306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 13A illustrates the storage system 1306 being coupled for data communications with the cloud services provider 1302, in other embodiments the storage system 1306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 13B:
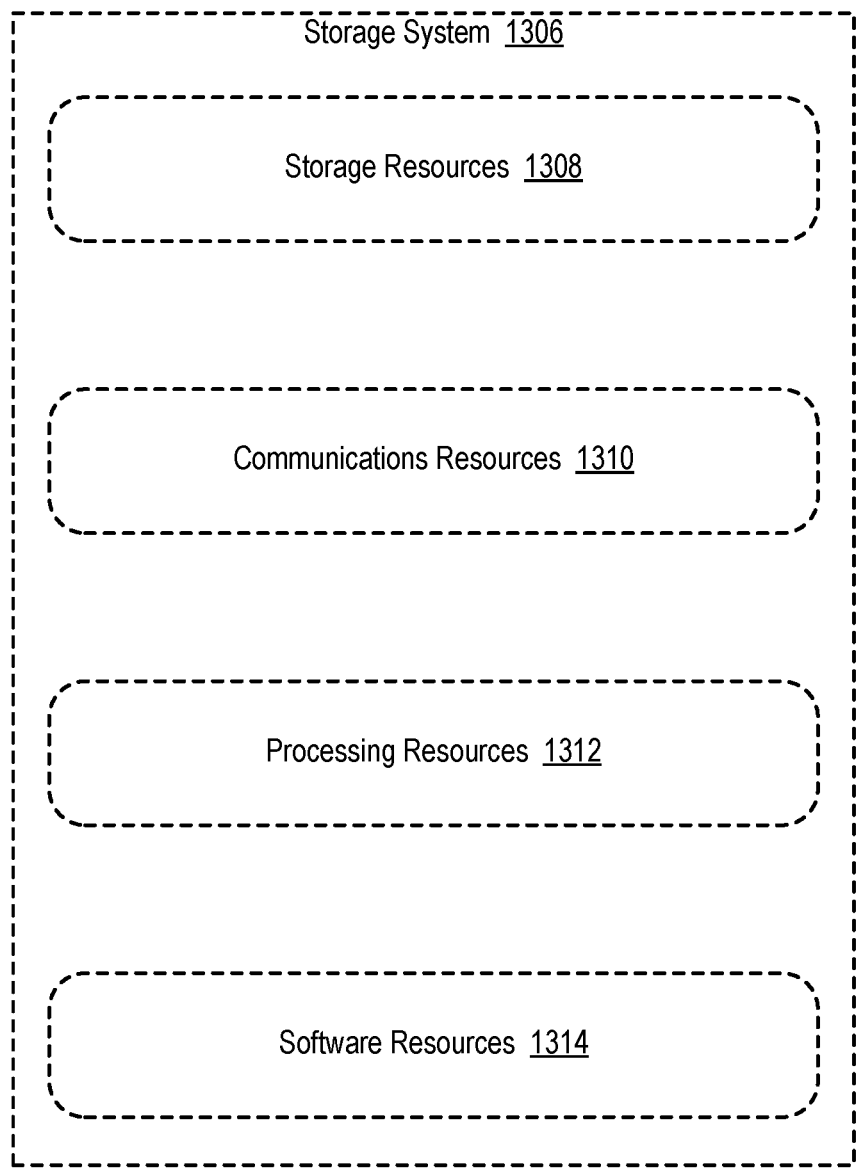
FIG. 13B sets forth a diagram of a storage system in accordance with some embodiments of the present disclosure.

For further explanation, FIG. 13B sets forth a diagram of a storage system 1306 in accordance with some embodiments of the present disclosure. Although depicted in less detail, the storage system 1306 depicted in FIG. 13B may be similar to the storage systems described above with reference to FIGS. 11A-11D and FIGS. 12A-12G as the storage system may include many of the components described above.

The storage system 1306 depicted in FIG. 13B may include a vast amount of storage resources 1308, which may be embodied in many forms. For example, the storage resources 1308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 1308 may include non-volatile magnetoresistive random-access memory ('MRAM'), including spin transfer torque ('STT') MRAM. The example storage resources 1308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 1308 depicted in FIG. 13A may be embodied in a variety of form factors, including but not limited to, dual in-line memory modules ('DIMMs'), non-volatile dual in-line memory modules ('NVDIMMs'), M.2, U.2, and others.

The storage resources 1308 depicted in FIG. 13B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 1308 depicted in FIG. 13B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 1306 depicted in FIG. 13B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 1306 depicted in FIG. 13B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 1306 depicted in FIG. 13B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 1306 depicted in FIG. 13B also includes communications resources 1310 that may be useful in facilitating data communications between components within the storage system 1306, as well as data communications between the storage system 1306 and computing devices that are outside of the storage system 1306, including embodiments where those resources are separated by a relatively vast expanse. The communications resources 1310 may be configured to utilize a variety of different protocols and data communication fabrics to facilitate data communications between components within the storage systems as well as computing devices that are outside of the storage system. For example, the communications resources 1310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 1310 can also include mechanisms for accessing storage resources 1308 within the storage system 1306 utilizing serial attached SCSI ('SAS'), serial ATA ('SATA') bus interfaces for connecting storage resources 1308 within the storage system 1306 to host bus adapters within the storage system 1306, internet small computer systems interface ('iSCSI') technologies to provide block-level access to storage resources 1308 within the storage system 1306, and other communications resources that that may be useful in facilitating data communications between components within the storage system 1306, as well as data communications between the storage system 1306 and computing devices that are outside of the storage system 1306.

The storage system 1306 depicted in FIG. 13B also includes processing resources 1312 that may be useful in useful in executing computer program instructions and performing other computational tasks within the storage system 1306. The processing resources 1312 may include one or more ASICs that are customized for some particular purpose as well as one or more CPUs. The processing resources 1312 may also include one or more DSPs, one or more FPGAs, one or more systems on a chip ('SoCs'), or other form of processing resources 1312. The storage system 1306 may utilize the storage resources 1312 to perform a variety of tasks including, but not limited to, supporting the execution of software resources 1314 that will be described in greater detail below.

The storage system 1306 depicted in FIG. 13B also includes software resources 1314 that, when executed by processing resources 1312 within the storage system 1306, may perform a vast array of tasks. The software resources 1314 may include, for example, one or more modules of computer program instructions that when executed by processing resources 1312 within the storage system 1306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 1314 may also include software that is useful in implementing software-defined storage ('SDS'). In such an example, the software resources 1314 may include one or more modules of computer program instructions that, when executed, are useful in policy-based provisioning and management of data storage that is independent of the underlying hardware. Such software resources 1314 may be useful in implementing storage virtualization to separate the storage hardware from the software that manages the storage hardware.

The software resources 1314 may also include software that is useful in facilitating and optimizing I/O operations that are directed to the storage system 1306. For example, the software resources 1314 may include software modules that perform various data reduction techniques such as, for example, data compression, data deduplication, and others. The software resources 1314 may include software modules that intelligently group together I/O operations to facilitate better usage of the underlying storage resource 1308, software modules that perform data migration operations to migrate from within a storage system, as well as software modules that perform other functions. Such software resources 1314 may be embodied as one or more software containers or in many other ways.

Figure 13C:
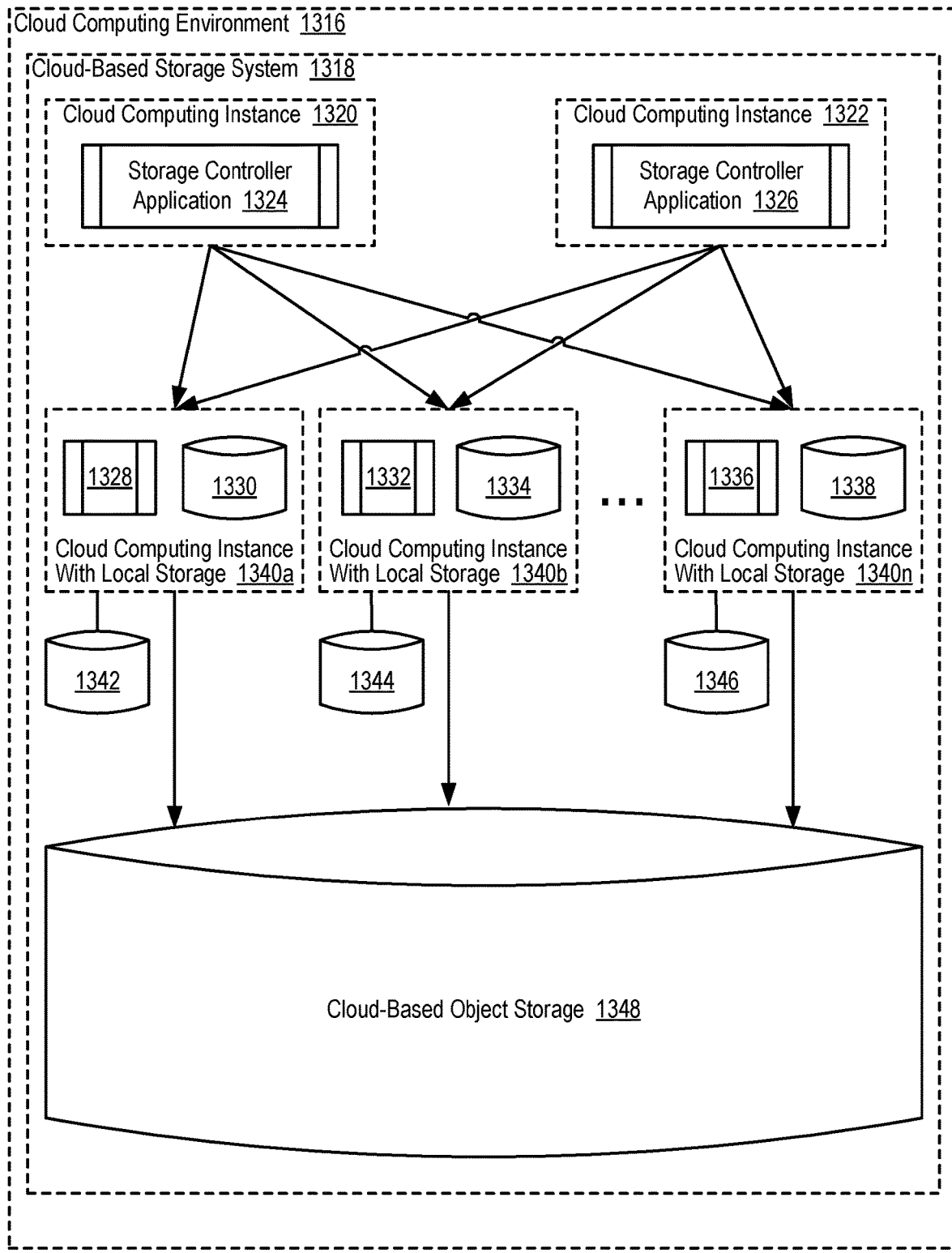
FIG. 13C sets forth an example of a cloud-based storage system in accordance with some embodiments of the present disclosure.

For further explanation, FIG. 13C sets forth an example of a cloud-based storage system 1318 in accordance with some embodiments of the present disclosure. In the example depicted in FIG. 13C, the cloud-based storage system 1318 is created entirely in a cloud computing environment 1316 such as, for example, Amazon Web Services ('AWS')™, Microsoft Azure™ Google Cloud Platform™, IBM Cloud™, Oracle Cloud™, and others. The cloud-based storage system 1318 may be used to provide services similar to the services that may be provided by the storage systems described above.

The cloud-based storage system 1318 depicted in FIG. 13C includes two cloud computing instances 1320, 1322 that each are used to support the execution of a storage controller application 1324, 1326. The cloud computing instances 1320, 1322 may be embodied, for example, as instances of cloud computing resources (e.g., virtual machines) that may be provided by the cloud computing environment 1316 to support the execution of software applications such as the storage controller application 1324, 1326. For example, each of the cloud computing instances 1320, 1322 may execute on an Azure VM, where each Azure VM may include high speed temporary storage that may be leveraged as a cache (e.g., as a read cache). In one embodiment, the cloud computing instances 1320, 1322 may be embodied as Amazon Elastic Compute Cloud ('EC2') instances. In such an example, an Amazon Machine Image (AMP) that includes the storage controller application 1324, 1326 may be booted to create and configure a virtual machine that may execute the storage controller application 1324, 1326.

In the example method depicted in FIG. 13C, the storage controller application 1324, 1326 may be embodied as a module of computer program instructions that, when executed, carries out various storage tasks. For example, the storage controller application 1324, 1326 may be embodied as a module of computer program instructions that, when executed, carries out the same tasks as the controllers 1110A, 1110B in FIG. 11A described above such as writing data to the cloud-based storage system 1318, erasing data from the cloud-based storage system 1318, retrieving data from the cloud-based storage system 1318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 1320, 1322 that each include the storage controller application 1324, 1326, in some embodiments one cloud computing instance 1320 may operate as the primary controller as described above while the other cloud computing instance 1322 may operate as the secondary controller as described above. Readers will appreciate that the storage controller application 1324, 1326 depicted in FIG. 13C may include identical source code that is executed within different cloud computing instances 1320, 1322 such as distinct EC2 instances.

The cloud-based storage system 1318 depicted in FIG. 13C includes cloud computing instances 1340a, 1340b, 1340n with local storage 1330, 1334, 1338. The cloud computing instances 1340a, 1340b, 1340n may be embodied, for example, as instances of cloud computing resources that may be provided by the cloud computing environment 1316 to support the execution of software applications. The cloud computing instances 1340a, 1340b, 1340n of FIG. 13C may differ from the cloud computing instances 1320, 1322 described above as the cloud computing instances 1340a, 1340b, 1340n of FIG. 13C have local storage 1330, 1334, 1338 resources whereas the cloud computing instances 1320, 1322 that support the execution of the storage controller application 1324, 1326 need not have local storage resources. The cloud computing instances 1340a, 1340b, 1340n with local storage 1330, 1334, 1338 may be embodied, for example, as EC2 M5 instances that include one or more SSDs, as EC2 R5 instances that include one or more SSDs, as EC2 I3 instances that include one or more SSDs, and so on. In some embodiments, the local storage 1330, 1334, 1338 must be embodied as solid-state storage (e.g., SSDs) rather than storage that makes use of hard disk drives.

In the example depicted in FIG. 13C, each of the cloud computing instances 1340a, 1340b, 1340n with local storage 1330, 1334, 1338 may also be coupled to block storage 1342, 1344, 1346 that is offered by the cloud computing environment 1316 such as, for example, as Amazon Elastic Block Store ('EBS') volumes. In such an example, the block storage 1342, 1344, 1346 that is offered by the cloud computing environment 1316 may be utilized in a manner that is similar to how the NVRAM devices described above are utilized, as the software daemon 1328, 1332, 1336 (or some other module) that is executing within a particular cloud comping instance 1340a, 1340b, 1340n may, upon receiving a request to write data, initiate a write of the data to its attached EBS volume as well as a write of the data to its local storage 1330, 1334, 1338 resources. In some alternative embodiments, data may only be written to the local storage 1330, 1334, 1338 resources within a particular cloud comping instance 1340a, 1340b, 1340n. In an alternative embodiment, rather than using the block storage 1342, 1344, 1346 that is offered by the cloud computing environment 1316 as NVRAM, actual RAM on each of the cloud computing instances 1340a, 1340b, 1340n with local storage 1330, 1334, 1338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

When a request to write data is received by a particular cloud computing instance 1340a, 1340b, 1340n with local storage 1330, 1334, 1338, the software daemon 1328, 1332, 1336 may be configured to not only write the data to its own local storage 1330, 1334, 1338 resources and any appropriate block storage 1342, 1344, 1346 resources, but the software daemon 1328, 1332, 1336 may also be configured to write the data to cloud-based object storage 1348 that is attached to the particular cloud computing instance 1340*a*, 1340*b*, 1340*n*. The cloud-based object storage 1348 that is attached to the particular cloud computing instance 1340*a*, 1340*b*, 1340*n* may be embodied, for example, as Amazon Simple Storage Service ('S3'). In other embodiments, the cloud computing instances 1320, 1322 that each include the storage controller application 1324, 1326 may initiate the storage of the data in the local storage 1330, 1334, 1338 of the cloud computing instances 1340*a*, 1340*b*, 1340*n* and the cloud-based object storage 1348. In other embodiments, rather than using both the cloud computing instances 1340*a*, 1340*b*, 1340*n* with local storage 1330, 1334, 1338 (also referred to herein as 'virtual drives') and the cloud-based object storage 1348 to store data, a persistent storage layer may be implemented in other ways. For example, one or more Azure Ultra disks may be used to persistently store data (e.g., after the data has been written to the NVRAM layer).

While the local storage 1330, 1334, 1338 resources and the block storage 1342, 1344, 1346 resources that are utilized by the cloud computing instances 1340*a*, 1340*b*, 1340*n* may support block-level access, the cloud-based object storage 1348 that is attached to the particular cloud computing instance 1340*a*, 1340*b*, 1340*n* supports only object-based access. The software daemon 1328, 1332, 1336 may therefore be configured to take blocks of data, package those blocks into objects, and write the objects to the cloud-based object storage 1348 that is attached to the particular cloud computing instance 1340*a*, 1340*b*, 1340*n*.

In some embodiments, all data that is stored by the cloud-based storage system 1318 may be stored in both: 1) the cloud-based object storage 1348, and 2) at least one of the local storage 1330, 1334, 1338 resources or block storage 1342, 1344, 1346 resources that are utilized by the cloud computing instances 1340*a*, 1340*b*, 1340*n*. In such embodiments, the local storage 1330, 1334, 1338 resources and block storage 1342, 1344, 1346 resources that are utilized by the cloud computing instances 1340*a*, 1340*b*, 1340*n* may effectively operate as cache that generally includes all data that is also stored in S3, such that all reads of data may be serviced by the cloud computing instances 1340*a*, 1340*b*, 1340*n* without requiring the cloud computing instances 1340*a*, 1340*b*, 1340*n* to access the cloud-based object storage 1348. Readers will appreciate that in other embodiments, however, all data that is stored by the cloud-based storage system 1318 may be stored in the cloud-based object storage 1348, but less than all data that is stored by the cloud-based storage system 1318 may be stored in at least one of the local storage 1330, 1334, 1338 resources or block storage 1342, 1344, 1346 resources that are utilized by the cloud computing instances 1340*a*, 1340*b*, 1340*n*. In such an example, various policies may be utilized to determine which subset of the data that is stored by the cloud-based storage system 1318 should reside in both: 1) the cloud-based object storage 1348, and 2) at least one of the local storage 1330, 1334, 1338 resources or block storage 1342, 1344, 1346 resources that are utilized by the cloud computing instances 1340*a*, 1340*b*, 1340*n*.

One or more modules of computer program instructions that are executing within the cloud-based storage system 1318 (e.g., a monitoring module that is executing on its own EC2 instance) may be designed to handle the failure of one or more of the cloud computing instances 1340*a*, 1340*b*, 1340*n* with local storage 1330, 1334, 1338. In such an example, the monitoring module may handle the failure of one or more of the cloud computing instances 1340*a*, 1340*b*, 1340*n* with local storage 1330, 1334, 1338 by creating one or more new cloud computing instances with local storage, retrieving data that was stored on the failed cloud computing instances 1340*a*, 1340*b*, 1340*n* from the cloud-based object storage 1348, and storing the data retrieved from the cloud-based object storage 1348 in local storage on the newly created cloud computing instances. Readers will appreciate that many variants of this process may be implemented.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 1314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 1314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 1314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the storage systems described in this disclosure may be useful for supporting various types of software applications. As an example of one type of application that may be supported by the storage systems describe herein, the storage system 1306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 13D:
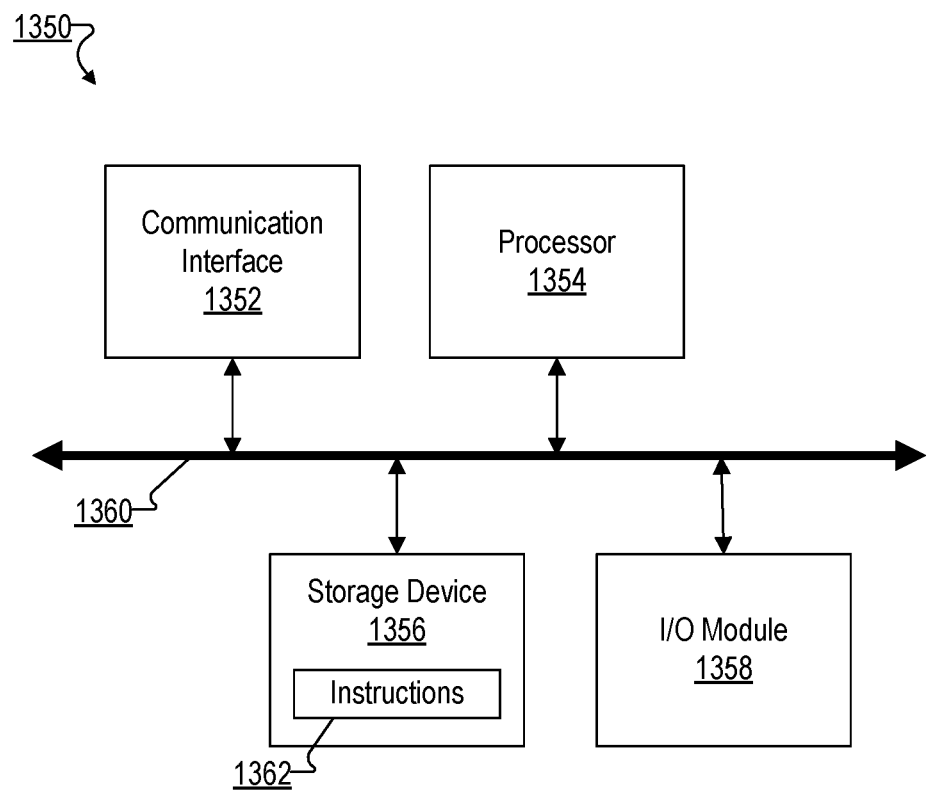
FIG. 13D illustrates an exemplary computing device that may be specifically configured to perform one or more of the processes described herein.

For further explanation, FIG. 13D illustrates an exemplary computing device 1350 that may be specifically configured to perform one or more of the processes described herein. As shown in FIG. 13D, computing device 1350 may include a communication interface 1352, a processor 1354, a storage device 1356, and an input/output ("I/O") module

1358 communicatively connected one to another via a communication infrastructure 1360. While an exemplary computing device 1350 is shown in FIG. 13D, the components illustrated in FIG. 13D are not intended to be limiting. Additional or alternative components may be used in other embodiments. Components of computing device 1350 shown in FIG. 13D will now be described in additional detail.

Communication interface 1352 may be configured to communicate with one or more computing devices. Examples of communication interface 1352 include, without limitation, a wired network interface (such as a network interface card), a wireless network interface (such as a wireless network interface card), a modem, an audio/video connection, and any other suitable interface.

Processor 1354 generally represents any type or form of processing unit capable of processing data and/or interpreting, executing, and/or directing execution of one or more of the instructions, processes, and/or operations described herein. Processor 1354 may perform operations by executing computer-executable instructions 1362 (e.g., an application, software, code, and/or other executable data instance) stored in storage device 1356.

Storage device 1356 may include one or more data storage media, devices, or configurations and may employ any type, form, and combination of data storage media and/or device. For example, storage device 1356 may include, but is not limited to, any combination of the non-volatile media and/or volatile media described herein. Electronic data, including data described herein, may be temporarily and/or permanently stored in storage device 1356. For example, data representative of computer-executable instructions 1362 configured to direct processor 1354 to perform any of the operations described herein may be stored within storage device 1356. In some examples, data may be arranged in one or more databases residing within storage device 1356.

I/O module 1358 may include one or more I/O modules configured to receive user input and provide user output. I/O module 1358 may include any hardware, firmware, software, or combination thereof supportive of input and output capabilities. For example, I/O module 1358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 1350.

Figure 13E:
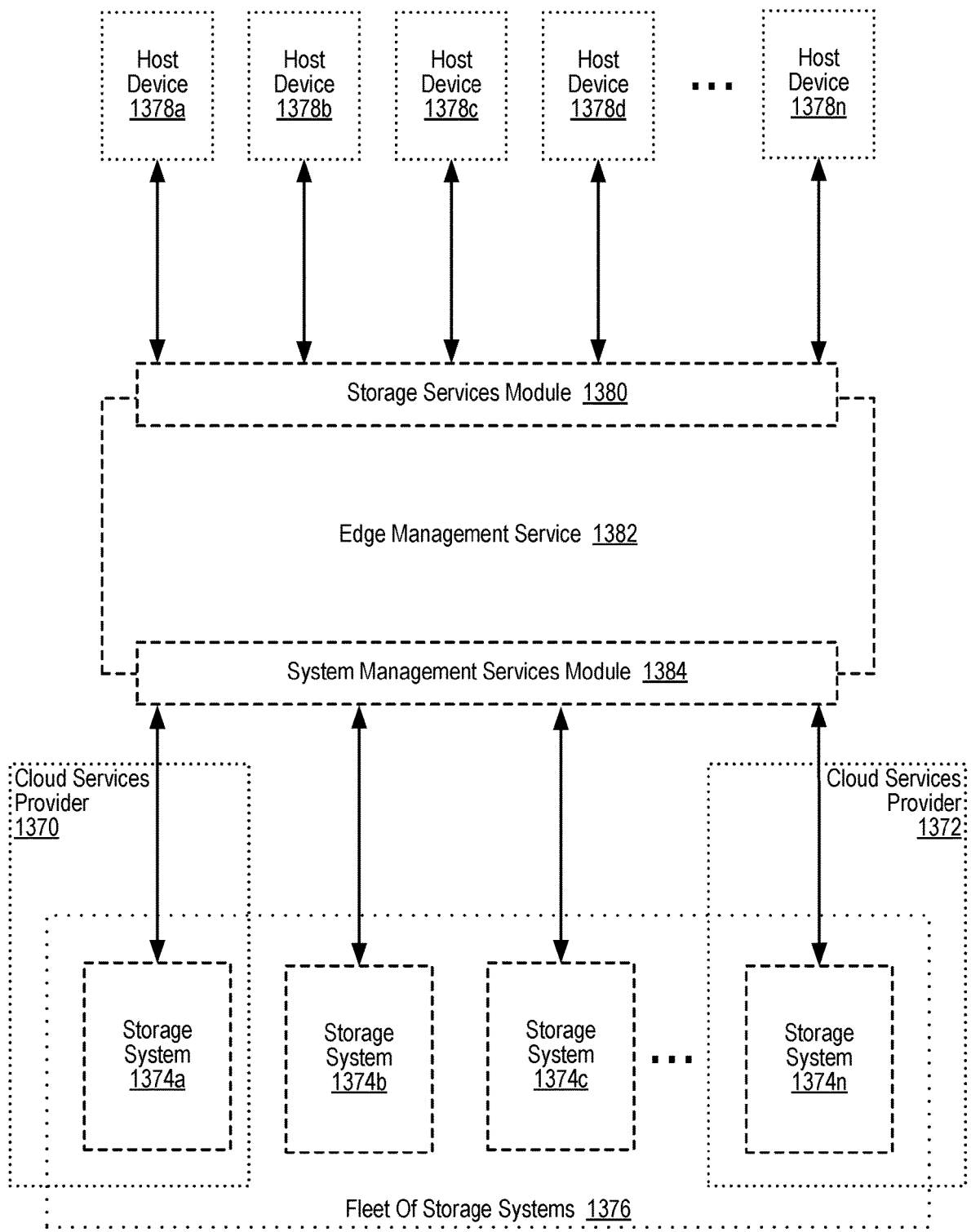
FIG. 13E illustrates an example of a fleet of storage systems for providing storage services (also referred to herein as 'data services') in accordance with some embodiments.

For further explanation, FIG. 13E illustrates an example of a fleet of storage systems 1376 for providing storage services (also referred to herein as 'data services'). The fleet of storage systems 1376 depicted in FIG. 3 includes a plurality of storage systems 1374a, 1374b, 1374c, 1374d, 1374n that may each be similar to the storage systems described herein. The storage systems 1374a, 1374b, 1374c, 1374d, 1374n in the fleet of storage systems 1376 may be embodied as identical storage systems or as different types of storage systems. For example, two of the storage systems 1374a, 1374n depicted in FIG. 13E are depicted as being cloud-based storage systems, as the resources that collectively form each of the storage systems 1374a, 1374n are provided by distinct cloud services providers 1370, 1372. For example, the first cloud services provider 1370 may be Amazon AWS' whereas the second cloud services provider 1372 is Microsoft Azure™, although in other embodiments one or more public clouds, private clouds, or combinations thereof may be used to provide the underlying resources that are used to form a particular storage system in the fleet of storage systems 1376.

The example depicted in FIG. 13E includes an edge management service 1382 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 1382 depicted in FIG. 13E may be embodied, for example, as one or more modules of computer program instructions executing on computer hardware such as one or more computer processors. Alternatively, the edge management service 1382 may be embodied as one or more modules of computer program instructions executing on a virtualized execution environment such as one or more virtual machines, in one or more containers, or in some other way. In other embodiments, the edge management service 1382 may be embodied as a combination of the embodiments described above, including embodiments where the one or more modules of computer program instructions that are included in the edge management service 1382 are distributed across multiple physical or virtual execution environments.

The edge management service 1382 may operate as a gateway for providing storage services to storage consumers, where the storage services leverage storage offered by one or more storage systems 1374a, 1374b, 1374c, 1374d, 1374n. For example, the edge management service 1382 may be configured to provide storage services to host devices 1378a, 1378b, 1378c, 1378d, 1378n that are executing one or more applications that consume the storage services. In such an example, the edge management service 1382 may operate as a gateway between the host devices 1378a, 1378b, 1378c, 1378d, 1378n and the storage systems 1374a, 1374b, 1374c, 1374d, 1374n, rather than requiring that the host devices 1378a, 1378b, 1378c, 1378d, 1378n directly access the storage systems 1374a, 1374b, 1374c, 1374d, 1374n.

The edge management service 1382 of FIG. 13E exposes a storage services module 1380 to the host devices 1378a, 1378b, 1378c, 1378d, 1378n of FIG. 13E, although in other embodiments the edge management service 1382 may expose the storage services module 1380 to other consumers of the various storage services. The various storage services may be presented to consumers via one or more user interfaces, via one or more APIs, or through some other mechanism provided by the storage services module 1380. As such, the storage services module 1380 depicted in FIG. 13E may be embodied as one or more modules of computer program instructions executing on physical hardware, on a virtualized execution environment, or combinations thereof, where executing such modules causes enables a consumer of storage services to be offered, select, and access the various storage services.

The edge management service 1382 of FIG. 13E also includes a system management services module 1384. The system management services module 1384 of FIG. 13E includes one or more modules of computer program instructions that, when executed, perform various operations in coordination with the storage systems 1374a, 1374b, 1374c, 1374d, 1374n to provide storage services to the host devices 1378a, 1378b, 1378c, 1378d, 1378n. The system management services module 1384 may be configured, for example, to perform tasks such as provisioning storage resources from the storage systems 1374a, 1374b, 1374c, 1374d, 1374n via one or more APIs exposed by the storage systems 1374a, 1374b, 1374c, 1374d, 1374n, migrating datasets or workloads amongst the storage systems 1374a, 1374b, 1374c, 1374d, 1374n via one or more APIs exposed by the storage systems 1374a, 1374b, 1374c, 1374d, 1374n, setting one or more tunable parameters (i.e., one or more configurable settings) on the storage systems 1374a, 1374b, 1374c, 1374d, 1374n via one or more APIs exposed by the storage systems 1374a, 1374b, 1374c, 1374d, 1374n, and so on. For example, many of the services described below relate to embodiments where the storage systems 1374a, 1374b, 1374c, 1374d, 1374n are configured to operate in some way. In such examples, the system management services module 1384 may be responsible for using APIs (or some other mechanism) provided by the storage systems 1374a, 1374b, 1374c, 1374d, 1374n to configure the storage systems 1374a, 1374b, 1374c, 1374d, 1374n to operate in the ways described below.

In addition to configuring the storage systems 1374a, 1374b, 1374c, 1374d, 1374n, the edge management service 1382 itself may be configured to perform various tasks required to provide the various storage services. Consider an example in which the storage service includes a service that, when selected and applied, causes personally identifiable information ('TIP') contained in a dataset to be obfuscated when the dataset is accessed. In such an example, the storage systems 1374a, 1374b, 1374c, 1374d, 1374n may be configured to obfuscate PII when servicing read requests directed to the dataset. Alternatively, the storage systems 1374a, 1374b, 1374c, 1374d, 1374n may service reads by returning data that includes the PII, but the edge management service 1382 itself may obfuscate the PII as the data is passed through the edge management service 1382 on its way from the storage systems 1374a, 1374b, 1374c, 1374d, 1374n to the host devices 1378a, 1378b, 1378c, 1378d, 1378n.

The storage systems 1374a, 1374b, 1374c, 1374d, 1374n depicted in FIG. 13E may be embodied as one or more of the storage systems described above with reference to FIGS. 11A-13D, including variations thereof. In fact, the storage systems 1374a, 1374b, 1374c, 1374d, 1374n may serve as a pool of storage resources where the individual components in that pool have different performance characteristics, different storage characteristics, and so on. For example, one of the storage systems 1374a may be a cloud-based storage system, another storage system 1374b may be a storage system that provides block storage, another storage system 1374c may be a storage system that provides file storage, another storage system 1374d may be a relatively high-performance storage system while another storage system 1374n may be a relatively low-performance storage system, and so on. In alternative embodiments, only a single storage system may be present.

The storage systems 1374a, 1374b, 1374c, 1374d, 1374n depicted in FIG. 13E may also be organized into different failure domains so that the failure of one storage system 1374a should be totally unrelated to the failure of another storage system 1374b. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 1382 and the second gateway may be a second instance of the edge management service 1382, including embodiments where each instance is distinct, or each instance is part of a distributed edge management service 1382.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 1374a, 1374b, 1374c, 1374d, 1374n in the fleet of storage systems 1376 may be managed collectively, for example, by one or more fleet management modules. The fleet management modules may be part of or separate from the system management services module 1384 depicted in FIG. 13E. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 1374a, 1374b, 1374c, 1374d, 1374n may be coupled to each other via one or more data communications links in order to exchange data between the storage systems 1374a, 1374b, 1374c, 1374d, 1374n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Storage devices using zoned namespaces may be used in combination with the previously described examples. A zoned name space is a storage interface in which a storage device presents a logical address space divided into zones, which are typically fixed in size. There may be multiple zoned namespaces for a storage device and each zoned namespace may have different sized zones. For example, a storage device may present some erase blocks as a SLC zoned namespace and other erase blocks as a QLC zoned namespace with the size of the SLC zones being one fourth the size of the QLC zones. In some examples, data within each zone is written sequentially. The following terms and definitions will be used in the following description for efficient use of zones in a storage system.

An "active zone" is a zone that that has remaining space within the zone that may be written to. The active zone may be allocated when the active zone is first opened causing an available resource such as an erased erase block to be attached to the active zone, or an available resource may be reserved when the zone is opened and not allocated until a write is received or required to be stored. The zone may remain active until the zone runs out of remaining space or until some other fault or issue caused the zone to enter a read only or offline state. The active zone may be closed and reopened for additional writes to any remaining space within the zone.

An "address-specific write command" is a write command, write zeroes command, write uncorrectable command, or copy command. Address-specific write commands specify a specific logical block range of addresses in command parameters as part of a Submission Queue Entry or in data structures pointed to by the command parameters to be written.

An "open zone" is a zone that associated open resources. The open zone has an active write pointer and is currently being written to or can be written to without changing from a closed or empty state.

A "read operation" is an operation initiated by a read, compare, verify, or copy command.

A "write operation" is an operation initiated by a write, write zeroes, write uncorrectable, copy, or zone append command, and applies to an open zone or causes a zone to become open.

A "zone" is contiguous range of logical block addresses that is managed as a single unit.

A "zone descriptor" is a data structure that contains information about a zone.

A "zone descriptor extension" is a small amount host defined data that can be associated with a non-empty zone.

A "zoned namespace" is a namespace that is divided into zones and is associated with a zoned namespace command set.

A "frontier zone" is defined as a zone that the storage system assigns for near term writes. After writing to the frontier zone is complete, the storage system may unassign the zone.

A "frontier set" is defined as a set of zones comprising the frontier zones.

A "frontier set list" is defined as a data structure identifying the set of zones comprising the frontier zones.

In some examples, a zone descriptor comprises information describing a zone type, information describing a zone state, and information describing a write pointer. The following description is described in relation to a sequential write required zone type, although other zone types may be used in place of a sequential write required zone type. In a zone namespace, a write pointer may be maintained for each zone that indicates the next writeable logical block address in that zone. In some examples, a zone may have six states including empty, opened, closed, full, read only, and offline. A zone in an empty, opened, or closed state may have a valid write pointer indicating that the zone may be written to. A zone in an empty state may have no existing stored data and thus the write point may point to the first logical block of the zone. The empty zone may not be allocated to physical capacity on a disk and may be allocated after the zone is first opened, or when the zone is first written to. After a zone is written to the zone moves out of the empty state, but in some examples, the zone may be returned to an empty state by resetting the zone.

The initial state of a zone may be empty if the write pointer is valid and the write pointer points to the lowest LBA in the zone, closed if the write pointer is valid and does not point to the lowest LBA in the zone, full if the most recent state was full, read only if read only was the most recent state, or offline if the most recent state was offline.

Figure 14:
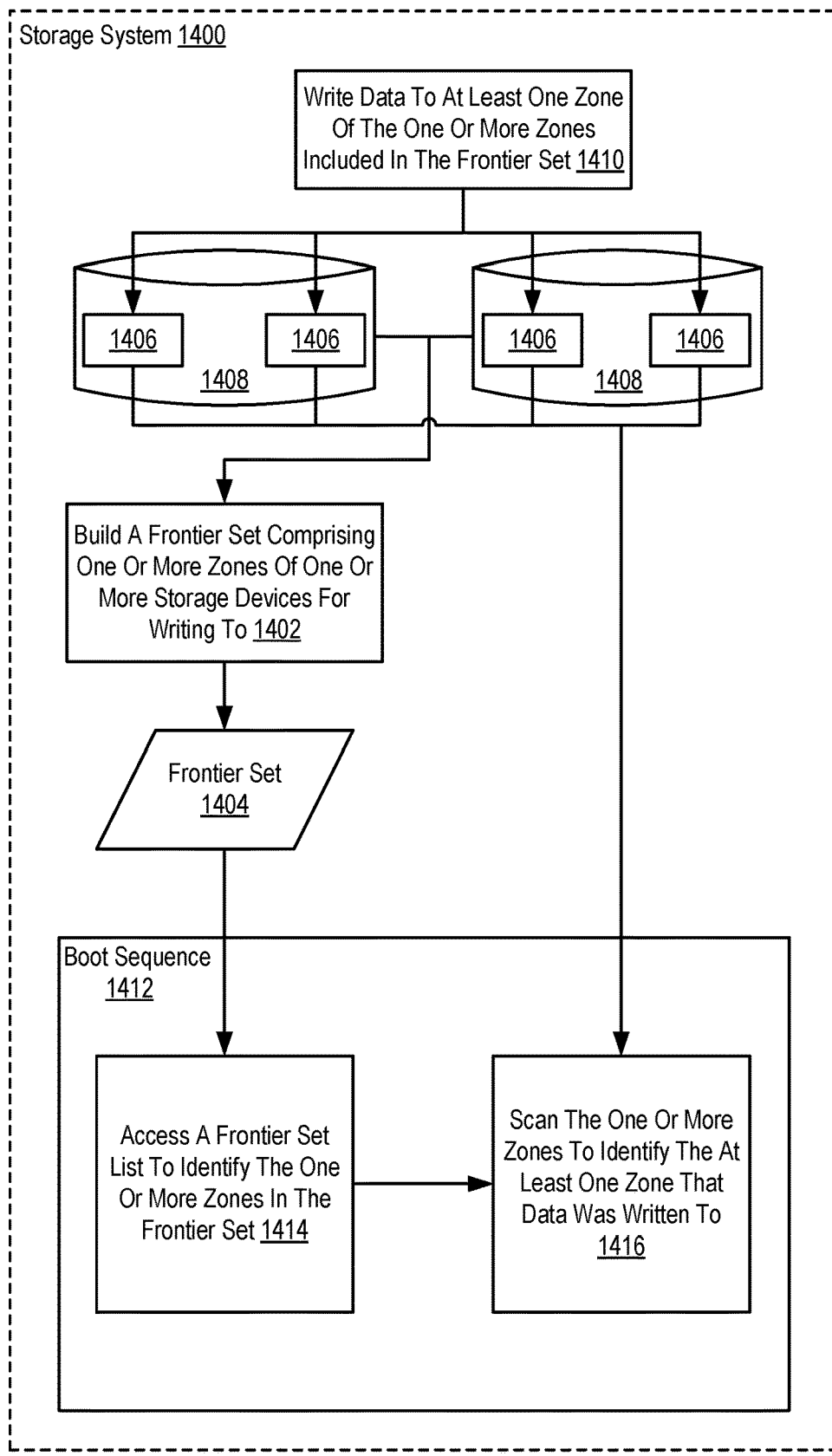
FIG. 14 sets forth a flowchart illustrating an example method for efficient use of zones in a storage system in accordance with some embodiments of the present disclosure.

For further explanation, FIG. 14 sets forth a flow chart illustrating an example method for efficient use of zones in a storage system according to embodiments of the present disclosure. The method of FIG. 14 includes building 1402 a frontier set comprising one or more zones 1406 of one or more storage devices 1408 for writing to. Building 1402 a frontier set may be carried out by specifying a number of frontier zones that will be sufficient for near term writes to the storage device, identifying zones that are in a usable state for writing to assign to the frontier set of each storage device 1408, and adding the zones to the frontier set 1404. The storage 1400 system may maintain a frontier set list 1404 to record the zones in the frontier set. In some examples, the usable state for writing to is the empty state. The frontier set does not include all zones in the one or more storage devices 1408 that are in a usable state, but instead includes usable zones that are assigned by the storage system to be written to in the near future as frontier zones. As zones 1406 in the frontier set are written to during normal operation of the storage system, the storage system may remove zones 1406 from the frontier set after the zones are persisted or meet some other condition. The storage system may also add zones to the frontier set as new frontier zones are needed. The frontier set list 1404 may be updated as new zones are either assigned or unassigned as frontier zones such that the frontier set list 1404 identifies the current frontier zones in the frontier set. Although the examples described herein relate to embodiments where the described techniques are applied to frontier sets, in other embodiments the described techniques may be applied to other groupings of zones that may be used for efficient use of zone during a recovery operation.

A zone 1406 within a storage device 1408 can be designated by the storage system 1400 as available for future use as long the zone 1406 is in an empty state. A zone 1406 in an empty state may be a zone 1406 that is either from a fresh storage device or a zone 1406 that was previously reset to an empty state. Because a storage device 1408 may be limited to a number of open zones that is smaller than the number included in the frontier set, the frontier set may include more zones than the maximum number of open zones for the storage device. For example, the storage system 1400 may open the maximum number of zones for writing to and then close a zone 1406 in order to open another zone 1406 in the frontier set. Thus, a new zone 1406 from the frontier set may be opened when an open zone 1406 in the frontier set is closed or full.

The method of FIG. 14 also includes writing 1410 data to at least one zone 1406 of the one or more zones 1406 included in the frontier set. Writing 1410 data to at least one zone 1406 of the one or more zones 1406 included in the frontier set may be carried out by performing storage operations directed to the one or more zones 1406. For example, a storage controller of the storage system 1400 may receive data and store the data in a zone 1406 of the frontier set. In some examples, the storage controller may first open a zone 1406 before writing to the zone 1406. For example, a zone 1406 may initially be closed and the storage controller may open the zone 1406 before writing to it. Or in another example, a zone 1406 may be in an open state and the storage controller may write data to the zone 1406 without opening the zone 1406.

The method of FIG. 14 also includes, during a boot sequence 1412, accessing 1414 a frontier set list 1404 to identify the one or more zones 1406 in the frontier set. A boot sequence 1412 as used herein refers to a process of connecting to the one or more storage devices 1408. For example, the boot sequence 1412 may be a storage controller starting up after a power failure, crash, or other interruption of the storage controller. Or in another example the boot sequence 1412 may be the process of reconnecting to a storage device after a communication failure. Accessing 1414 a frontier set list to identify the one or more zones 1406 may be carried out by loading the frontier set list 1404 into memory of a computing device. For example, a storage controller may load the frontier set list 1404 from a set of reserved addresses of a storage device. The storage device storing the frontier set list 1404 may be one of the one or more storage devices 1408 containing the zones in the frontier set list 1404, or in other examples the storage controller may load the frontier set list 1404 from a separate storage device. In some examples, the separate storage device may store additional information related to the boot sequence 1412. In another example, a storage controller may load the frontier set list 1404 from a network location separate from the storage devices 1408 having the zones. Thus, storage of the frontier set list 1404 may be independent from the devices containing zones in the frontier set.

In some examples, the set of reserved addresses may be a reserved set of zones that are cycled through in some fashion. For example, the storage system may reserve a circular buffer of three zones. The storage system may initially write the frontier set list 1404 to the first zone. The storage system may then write updates to the frontier list incrementally to the first zones 1406 until the first zone 1406 is full at which point the updates may be written to a second zone. The storage system may continue to write updates to the frontier set list 1404 until the second zone 1406 is full and further updates may be written to a third zone. The storage system may write further updates to third zone 1406 and, once the third zone 1406 is full, the storage system may switch back to the first zone 1406 for further updates, after first resetting it, overwriting the existing data. The pattern can be repeated in a circular fashion with each zone reset before starting to write to it again. Thus, by cycling through a reserved set of zones, the same three zones may be used to store a frontier set list 1404 that may be continuously changing. Because the drive handles issues related to erase block lifetimes, the same reserved zones may be written to without concern to lifetime issues. While this example illustrates a circular buffer with three zones it is possible to use more zones. The frontier set list identifies the entire current frontier set and may be structured as lists of zone additions and removals described in the current non-reset zones within the reserved set of zones. The same technique can be extended to include more zones, and could include writing to multiple zones in parallel if there is a performance advantage in doing so, as long as the non-reset zones from the reserved set collectively store the entire frontier set and as long as zones are reset before being reused to store frontier additional updates.

The method of FIG. 14 also includes, during the boot sequence 1412, scanning 1416 the one or more zones 1406 to identify the at least one zone 1406 that data was written to. Scanning 1416 the one or more zones 1406 to identify the at least one zone 1406 may be carried out by scanning a zone descriptor for each zone 1406 identified in the frontier set list 1404 to determine the zones current state. For example, if a zone 1406 identified in the frontier set list 1404 is still in an empty state it is likely that no data was written to the zone. If the zone 1406 is found in an opened state, a closed state, or a full state it is possible that data was written to the respective zone. The frontier set identified by the frontier set list 1404 represents the potentially persisted elements of stored content that may require some level of recovery to ensure consistency of the content of the storage system 1400. For example, a RAID stripe might be partially written, requiring either that writing the RAID stripe be completed, or the partially written content abandoned. Or the deletion of some structure might have to be reflected in multiple stored elements but the process of updating those multiple elements might be interrupted by a crash. The frontier set and the frontier set list 1404 may enable a computing device, such a storage controller, to boot after a fault in an efficient manner since only updates written to zones in the frontier set, which are the only zones that were potentially recently written to in ways that might require reconciliation, need to be considered for reconciliation of inconsistencies during the recovery boot process.

In contrast, if the frontier set list 1404 were not present the computing device could be required to consider all of the zones of a storage device during a recovery boot process. Thus, the frontier set list 1404 allows the computing device to only consider, such as for reconciliation purposes, zones that were potentially in the process of being written to, or that may have been part of a larger set of updates at the time of a failure, when the fault occurred.

Figure 15:
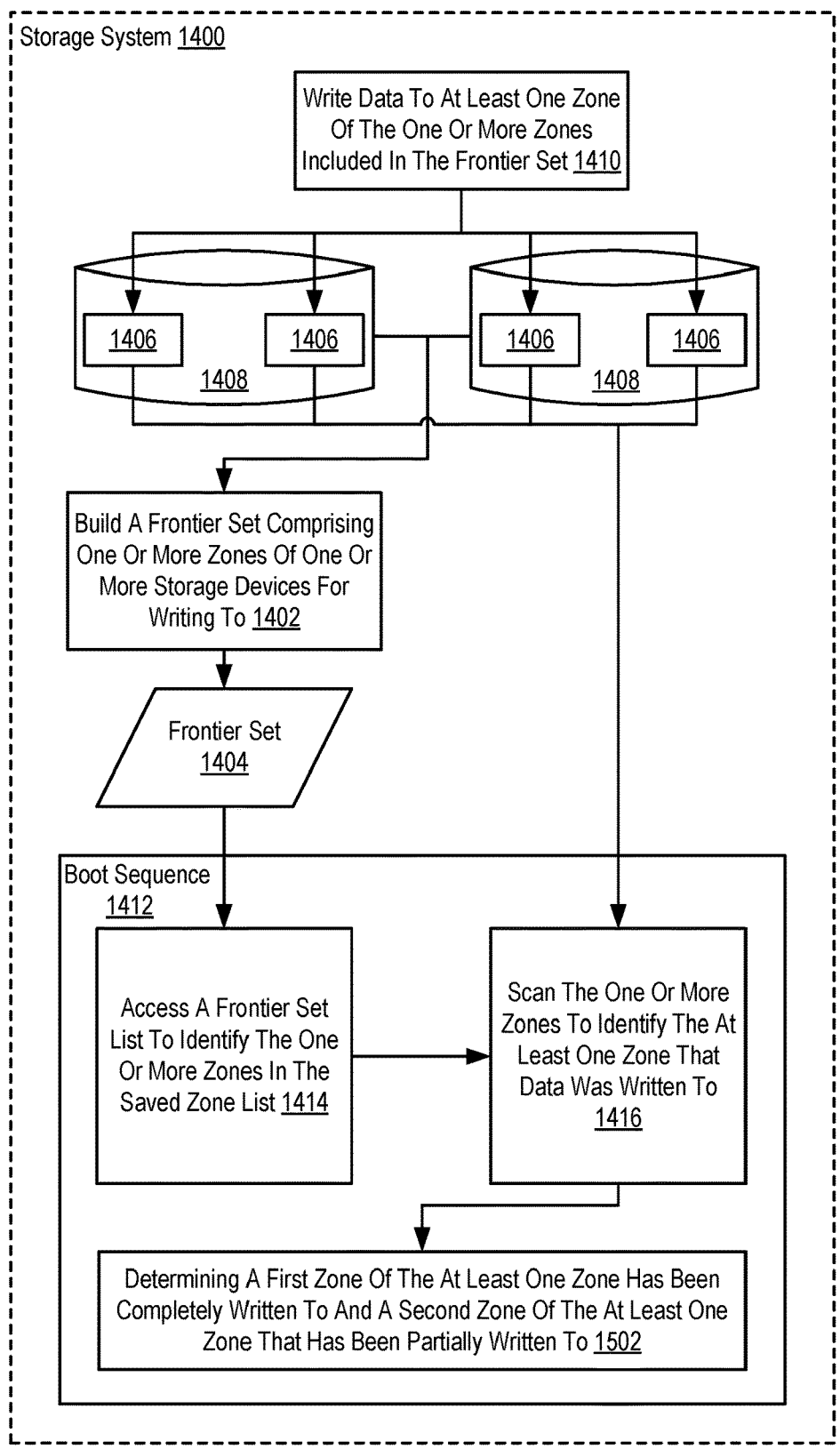
FIG. 15 sets forth a flowchart illustrating an example method for efficient use of zones in a storage system in accordance with some embodiments of the present disclosure.

For further explanation, the method of FIG. 15 sets forth a flow chart illustrating another example method for efficient use of zones in a storage system according to embodiments of the present disclosure. The method of FIG. 15 is similar to the method of FIG. 14 in that the method of FIG. 15 also includes: building 1402 a frontier set comprising one or more zones 1406 of one or more storage devices 1408 for writing to; writing 1410 data to at least one zone 1406 of the one or more zones 1406 identified in the frontier set; and during a bootup sequence 1412: accessing 1414 a frontier set list 1404 to identify the one or more zones 1406 in the frontier set list 1404; and scanning 1416 the one or more zones 1406 to identify the at least one zone 1406 that data was written to.

The method of FIG. 15 differs from the method of FIG. 14 in that, the method of FIG. 15 also includes determining 1502 a first zone 1406 of the at least one zone 1406 has been completely written to and a second zone 1406 of the at least one zone 1406 has been partially written to. Determining 1502 a first zone 1406 of the at least one zone 1406 has been completely written to and a second zone 1406 of the at least one zone 1406 has been partially written to may be carried out by examining the characteristics of a zone. For example, if a zone 1406 does not have a valid write pointer, the zone 1406 may be identified as being completely written. If a zone 1406 has a valid write pointer, further investigation may determine whether the write pointer is at the beginning of the zone 1406 indicating that no data was written, or offset from the beginning of the zone 1406 indicating that the zone 1406 was written too, but is not full. In other examples, analysis of the data in the zone 1406 may suggest that the data is completely written. Analyzing the data in the zone 1406 may include reading the data to determine if it is valid, calculating a checksum for comparison to a known checksum, performing a hashing function on the data to determine if the data matches a known hash, or other techniques For further explanation, the method of FIG. 16 sets forth a flow chart illustrating another example method for efficient use of zones in a storage system according to embodiments of the present disclosure. The method of FIG. 16 is similar to the method of FIG. 15 in that the method of FIG. 16 also includes: building 1402 a frontier set comprising one or more zones 1406 of one or more storage devices 1408 for writing to; writing 1410 data to at least one zone 1406 of the one or more zones 1406 included in the frontier set; and during a bootup sequence 1412: accessing 1414 a frontier set list 1404 to identify the one or more zones 1406 in the frontier set; scanning 1416 the one or more zones 1406 to identify the at least one zone 1406 that data was written to; and determining 1502 a first zone 1406 of the at least one zone 1406 has been completely written to and a second zone 1406 of the at least one zone 1406 that has been partially written to.

Figure 16:
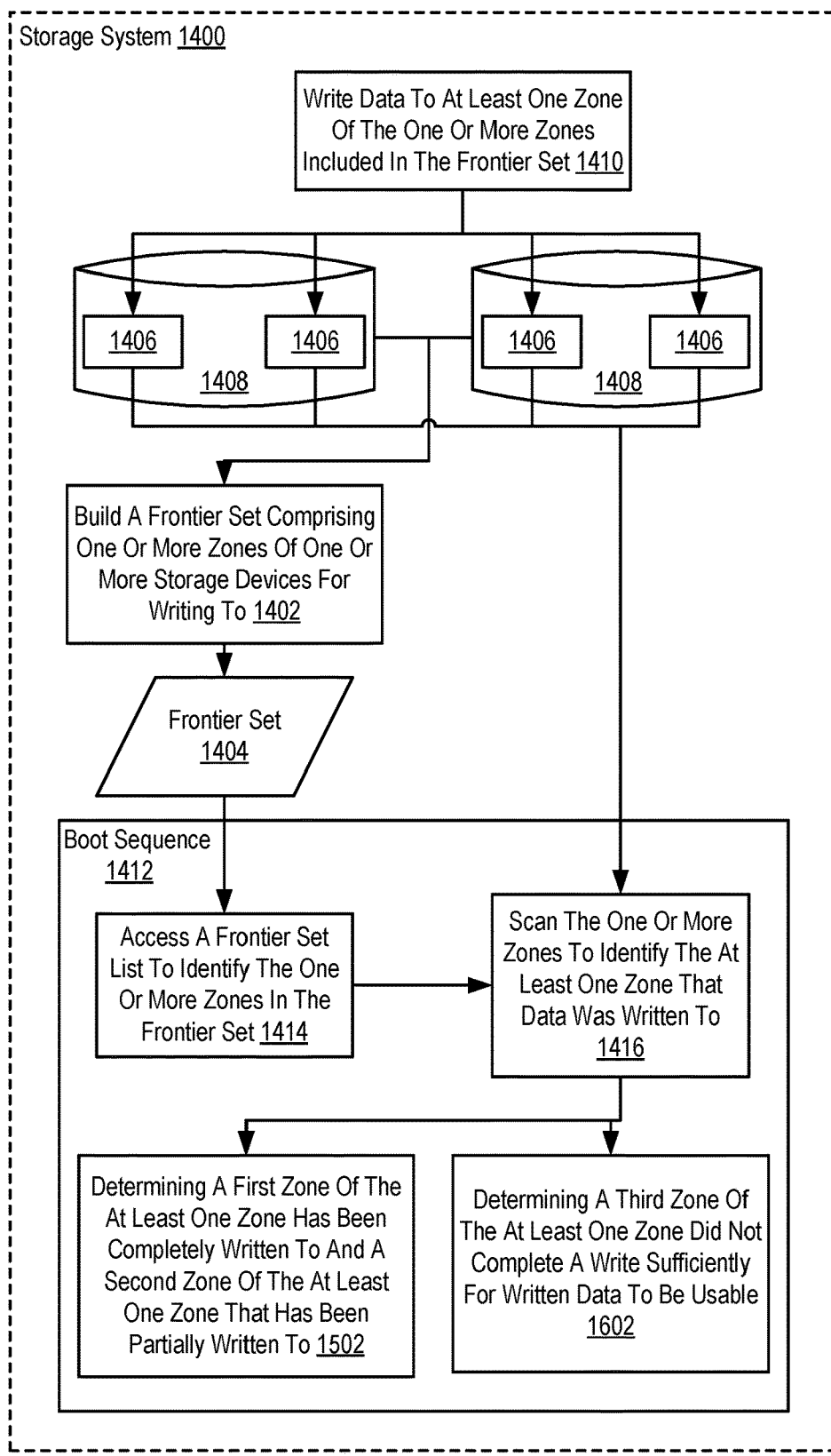
FIG. 16 sets forth a flowchart illustrating an example method for efficient use of zones in a storage system in accordance with some embodiments of the present disclosure.

The method of FIG. 16 differs from the method of FIG. 15 in that, the method of FIG. 16 also includes determining 1602 a third zone 1406 of the at least one zone 1406 did not complete a write sufficiently for written data to be usable. Determining 1602 a third zone 1406 of the at least one zone 1406 did not complete a write sufficiently for written data to be usable 1602 may be carried out by finding a zone 1406 that was partially written to as described above. Each zone 1406 that is determined to have been partially written to may then be analyzed to determine if the data is usable. In some examples, analyzing a zone 1406 may include reading the data to determine if it is valid, calculating a checksum for comparison to a known checksum, performing a hashing function on the data to determine if the data matches a known hash, or other techniques.

Figure 17:
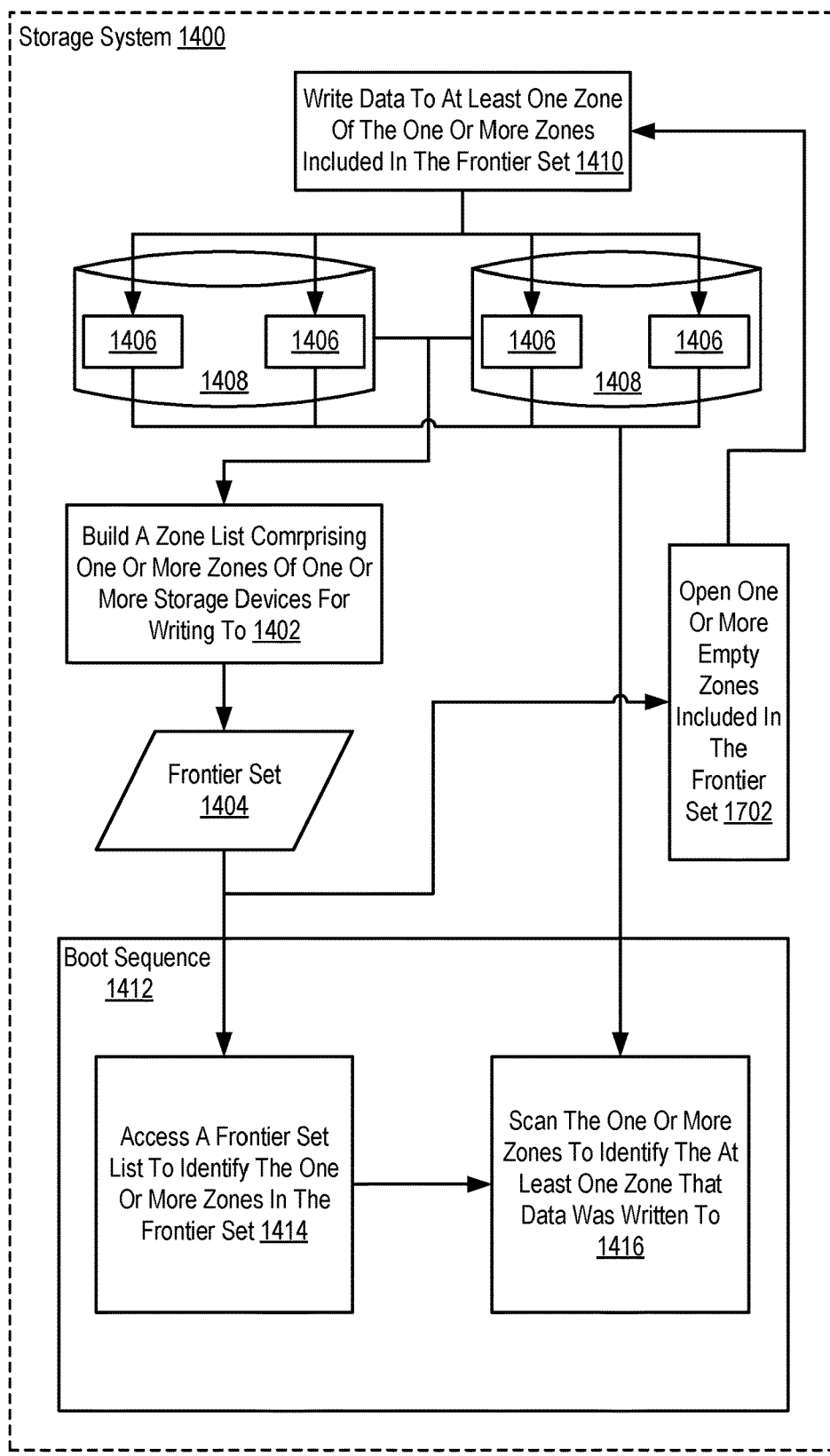
FIG. 17 sets forth a flowchart illustrating an example method for efficient use of zones in a storage system in accordance with some embodiments of the present disclosure.

For further explanation, the method of FIG. 17 sets forth a flow chart illustrating another example method for efficient use of zones in a storage system according to embodiments of the present disclosure. The method of FIG. 17 is similar to the method of FIG. 14 in that the method of FIG. 17 also includes: building 1402 a frontier set comprising one or more zones 1406 of one or more storage devices 1408 for writing to; writing 1410 data to at least one zone 1406 of the one or more zones 1406 included in the frontier set; and during a bootup sequence 1412: accessing 1414 a frontier set list 1404 to identify the one or more zones 1406 in the frontier set; and scanning 1416 the one or more zones 1406 to identify the at least one zone 1406 that data was written to.

The method of FIG. 17 differs from the method of FIG. 14 in that, the method of FIG. 17 also includes opening 1702 one or more empty zones 1406 included in the frontier set. Opening 1702 one or more empty zones 1406 included in the frontier set may be carried out by issuing a command to a storage device 1408 to open an empty zone. The storage device 1408 may require that a zone 1406 be opened prior to being written too. Additionally, if the number of zones in a frontier set exceeds the number of zones that can be open at any given time, a zone 1406 may be included in the frontier set but not opened. Thus, an open zone 1406 may be closed and an empty zone 1406 may then be opened to keep the total number of open zones below the maximum for the storage device 1406. In some examples, a zone 1406 may be written to until it is full, at which point a new empty zone 1406 in the frontier set may be opened for additional writes. In another example, the zones may be written to in a balanced manner such that a zone 1406 may be written to and closed so that another zone 1406 can be written to prior to the zone 1406 becoming full.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A computing system comprising:
one or more solid-state storage devices comprising a plurality of zones; and
a storage controller operatively coupled to the one or more storage devices, wherein the storage controller is configured to:
store, using a reserved set of zones, a list of a frontier set comprising one or more zones of the plurality of zones to which data is being written, including cycling through the reserved set of zones for storing the list;
write data to at least one zone of the one or more zones included in the frontier set;
in response to a fault, identify the one or more zones in the frontier set using the list; and
scan the one or more zones to identify the at least one zone that data was written to.

2. The system as recited in claim 1, wherein the storage controller is further configured to determine a first zone of the at least one zone has been completely written to and a second zone of the at least one zone has been partially written to.

3. The system as recited in claim 2, wherein the storage controller is further configured to determine a third zone of the at least one zone did not complete a write sufficiently for written data to be usable.

4. The system as recited in claim 1, wherein the storage controller is further configured to open one or more empty zones included in the frontier set.

5. The system as recited in claim 1, wherein the storage controller is further configured to store the frontier set list to a set of reserved addresses.

6. The system as recited in claim 5, wherein the set of reserved addresses identifies zones that are reused in a cyclical pattern.

7. The system as recited in claim 1, wherein at least one zone of the one or more zones included in the frontier set is in an empty state.

8. A method, comprising:
store, using a reserved set of zones, a list of a frontier set comprising one or more zones of the plurality of zones to which data is being written, including cycling through the reserved set of zones for storing the list;
write data to at least one zone of the one or more zones included in the frontier set;
in response to a fault, identify the one or more zones in the frontier set using the list; and
scan the one or more zones to identify the at least one zone that data was written to. the one or more zones to identify the at least one zone that data was written to.

9. The method of claim 8, further comprising determining a first zone of the at least one zone has been completely written to and a second zone of the at least one zone that has been partially written to.

10. The method as recited in claim 9, further comprising determining a third zone of the at least one zone did not complete a write sufficiently for written data to be usable.

11. The method as recited in claim 8, further comprising opening one or more empty zones included in the frontier set.

12. The method as recited in claim 8, wherein the method further comprises storing the frontier set list to a set of reserved addresses.

13. The method as recited in claim 12, wherein the set of reserved addresses is a circular buffer of zones.

14. The method of claim 8, wherein at least one zone of the one or more zones included in the frontier set is in an empty state.

15. A non-transitory computer readable storage medium storing program instructions executable by a processor to:
store, using a reserved set of zones, a list of a frontier set comprising one or more zones of the plurality of zones to which data is being written, including cycling through the reserved set of zones for storing the list;
write data to at least one zone of the one or more zones included in the frontier set;
in response to a fault, identify the one or more zones in the frontier set using the list; and
scan the one or more zones to identify the at least one zone that data was written to.

16. The non-transitory computer readable storage medium as recited in claim 15, wherein the program instructions are further executable to determine a first zone of the at least one zone has been completely written to and a second zone of the at least one zone that has been partially written to.

17. The non-transitory computer readable storage medium as recited in claim 16, wherein the program instructions are further executable to determine a third zone of the at least one zone did not complete a write sufficiently for written data to be usable.

18. The non-transitory computer readable storage medium as recited in claim 15, wherein the instructions are further executable to open one or more empty zones included in the frontier set.

19. The non-transitory computer readable storage medium as recited in claim 15, wherein the instructions are further executable to store the frontier set list to a set of reserved addresses.

20. The non-transitory computer readable storage medium as recited in claim 19, wherein the set of reserved addresses identifies zones that are reused in a cyclical pattern.

* * * * *